US012551450B2

(12) United States Patent
Wise et al.

(10) Patent No.: US 12,551,450 B2
(45) Date of Patent: Feb. 17, 2026

(54) SUPRAPARTICLE FORMULATIONS

(71) Applicants: THE BIONICS INSTITUTE OF AUSTRALIA, East Melbourne (AU); The University of Melbourne, Melbourne (AU)

(72) Inventors: Andrew Wise, East Melbourne (AU); Yutian Ma, East Melbourne (AU); Frank Caruso, Melbourne (AU); Mattias Björnmalm, East Melbourne (AU)

(73) Assignees: THE BIONICS INSTITUTE OF AUSTRALIA, East Melbourne (AU); THE UNIVERSITY OF MELBOURNE, Melbourne (AU)

( * ) Notice: Subject to any disclaimer, the term of this patent is extended or adjusted under 35 U.S.C. 154(b) by 616 days.

(21) Appl. No.: 17/437,442

(22) PCT Filed: Mar. 19, 2020

(86) PCT No.: PCT/AU2020/050260
§ 371 (c)(1),
(2) Date: Sep. 9, 2021

(87) PCT Pub. No.: WO2020/186304
PCT Pub. Date: Sep. 24, 2020

(65) Prior Publication Data
US 2022/0168228 A1 Jun. 2, 2022

(30) Foreign Application Priority Data
Mar. 19, 2019 (AU) .................. 2019900910

(51) Int. Cl.
*A61K 9/50* (2006.01)
*A61K 9/16* (2006.01)
*A61K 38/18* (2006.01)

(52) U.S. Cl.
CPC .......... *A61K 9/5052* (2013.01); *A61K 9/1611* (2013.01); *A61K 9/5036* (2013.01); *A61K 9/5089* (2013.01); *A61K 38/185* (2013.01)

(58) Field of Classification Search
CPC .. A61K 9/5052; A61K 9/1611; A61K 9/5036; A61K 9/5089; A61K 38/185
See application file for complete search history.

(56) References Cited

U.S. PATENT DOCUMENTS

| 4,434,153 | A | 2/1984 | Urquhart et al. |
| 4,468,498 | A | 8/1984 | Kowalski et al. |
| 5,157,084 | A | 10/1992 | Lee et al. |
| 5,521,253 | A | 5/1996 | Lee et al. |
| 2020/0000879 | A1 | 1/2020 | Wise et al. |

FOREIGN PATENT DOCUMENTS

| JP | H11-509167 A | 8/1999 | |
| JP | 2010-516246 A | 5/2010 | |
| WO | WO-1996/013253 A1 | 5/1996 | |
| WO | WO-2006/037160 A1 | 4/2006 | |
| WO | WO-2008/087607 A2 | 7/2008 | |
| WO | WO-2018013928 A1 * | 1/2018 | .......... A61L 17/005 |
| WO | WO-2019/056062 A1 | 3/2019 | |

OTHER PUBLICATIONS

Rahim et al.; Metal-Phenolic Supramolecular Gelation; GDCh; Angew. Chem. Int. Ed. 2016, 55, 13803-13807 and supporting information (Year: 2016).*
Cui et al.; Engineering Poly(ethylene glycol) Particles for Improved Biodistribution; ACS; ACS Nano, vol. 9 ' No. 2 ' 1571-1580 ' 2015 (Year: 2015).*
Gombotz et al.; Protein release from alginate matrices; Elsevier; Advanced Drug Delivery Reviews 64 (2012) 194-205 (Year: 2012).*
Maina et al.; Mold-Templated Inorganic-Organic Hybrid Supraparticles for Codelivery of Drugs; ACS; Biomacromolecules 2014, 15, 4146-4151 (Year: 2014).*
Li et al.; Alginate-based polysaccharide beads for cationic contaminant sorption from water; CrossMark; Polym. Bull. (2017) 74:1267-1281 (Year: 2017).*
Lee et al.; Alginate: Properties and biomedical applications; Elsevier; Progress in Polymer Science 37 (2012) 106-126 (Year: 2012).*
Nedovic et al.; Electrostatic generation of alginate microbeads loaded with brewing yeast; Elsevier; Process Biochemistry 37 (2001) 17-22 (Year: 2001).*
Wang et al.; Mesoporous Silica Supraparticles for Sustained Inner-Ear Drug Delivery; Wiley; small 2014, 10, No. 21, 4244-4248 (Year: 2014).*
Gelatin; https://chembam.com/resources-for-students/the-chemistry-of/gelatin/ (site accessed Mar. 2024) (Year: 2020).*
Ma et al.; Gel-Mediated Electrospray Assembly of Silica Supraparticles for Sustained Drug Delivery; ACS Publications; ACS Appl. Mater. Interfaces 2018, 10, 31019-31031 and supporting information (Year: 2018).*
Clark et al., Surgery for an improved multiple-channel cochlear implant, Ann. Otol. Rhinol. Laryngol., 93(3 Pt 1):204-7 (1984).
Clark et al., Surgical and safety considerations of multichannel cochlear implants in children, Ear Hear., 12(4 Suppl):15S-24S (1991).
Cui et al., Engineering poly(ethylene glycol) particles for improved biodistribution, ACS Nano, 9(2):1571-80 (2015).
International Application No. PCT/AU2020/050260, International Search Report and Written Opinion, mailed Apr. 8, 2020.
Jaworek, Micro- and nanoparticle production by electrospraying, Powder Technology, 176(1):18-35 (2007).

(Continued)

*Primary Examiner* — Robert A Wax
*Assistant Examiner* — John W Lippert, III
(74) *Attorney, Agent, or Firm* — MARSHALL, GERSTEIN & BORUN LLP

(57) ABSTRACT

The present disclosure relates to supraparticles loaded with high levels of payload and having controlled payload release profiles. In particular, supraparticles made of mesoporous silica nanoparticles and elecrosprayed with alginic acid which is then coated or formulated with biodegradable materials is disclosed. Such supraparticles may be used in a range of therapeutic applications.

20 Claims, 37 Drawing Sheets

(56) References Cited

OTHER PUBLICATIONS

Figure 1:
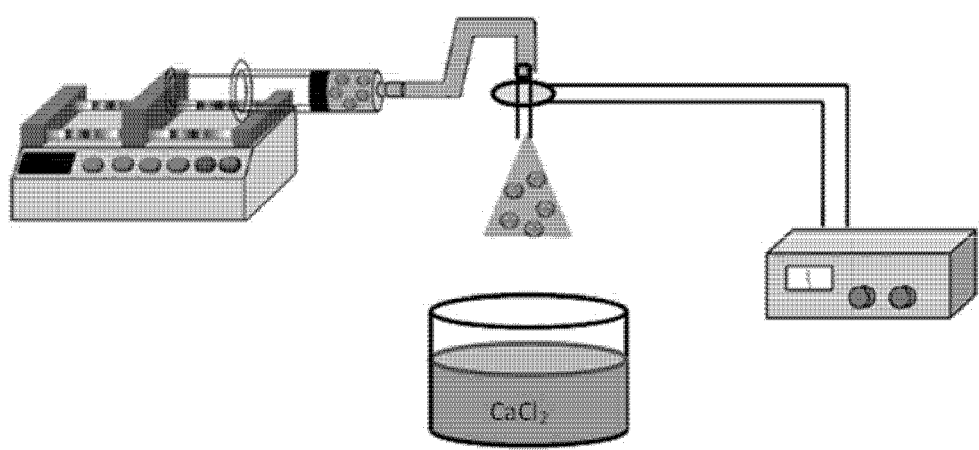

Langer, New methods of drug delivery, Science, 249(4976):1527-33 (1990).

Ma et al., Engineering Biocoatings To Prolong Drug Release from Supraparticles, Biomacromolecules, 20(9):3425-34 (2019).

Ma et al., Gel-Mediated Electrospray Assembly of Silica Supraparticles for Sustained Drug Delivery, ACS Appl. Mater. Interfaces, 10(37):31019-31 (2018).

Maina et al., Mold-templated inorganic-organic hybrid supraparticles for codelivery of drugs, Biomacromolecules, 15(11):4146-51 (2014).

Tan et al., Nanoporous peptide particles for encapsulating and releasing neurotrophic factors in an animal model of neurodegeneration, Adv. Mater., 24(25):3362-6 (2012).

Wang et al., Hollow Carved Single-Crystal Mesoporous Silica Templated by Mesomorphous Polyelectrolyte-Surfactant Complexes, Chem. Mater., 22(13):3829-31 (2010).

Wang et al., Nanoporous colloids: building blocks for a new generation of structured materials, J. Mater. Chem., 19:6451-64 (2009).

Yang et al., Reservoir-based polymer drug delivery systems, J. Lab. Autom., 17(1):50-8 (Feb. 2012).

Wang et al., Nanoporous polyelectrolyte spheres prepared by sequentially coating sacrificial mesoporous silica spheres, 44(19):2888-92 (May 2006).

Wise et al., Improved Auditory Nerve Survival with Nanoengineered Supraparticles for Neurotrophin Delivery into the Deafened Cochlea, PLoS One, 11(10):e0164867 (Oct. 2016).

First Office Action for JP Application No. 2021-556581 mailed Feb. 5, 2024.

Samal et al., Fibrin-based microsphere reservoirs for delivery of neurotrophic factors to the brain, Nanomedicine (Lond.), 10(5), pp. 765-783 (2015).

Maiolo et al., Bioreducible Hydrophobin-Stabilized Supraparticles for Selective Intracellular Release, ACS Nano, 11(9):9413-23 (Sep. 2017).

* cited by examiner

SUPRAPARTICLE FORMULATIONS

GOVERNMENT SUPPORT CLAUSE

This invention was made with government support under Grant No. W81XWH-18-1-0276, awarded by the Medical Research and Development Command. The government has certain rights in the invention.

CROSS-REFERENCE TO RELATED APPLICATIONS

This application is a U.S. National Phase of International Patent Application No. PCT/AU2020/050260, filed on Mar. 19, 2020, which claims priority under 35 USC § 119 from application No. 2019900910, filed on Mar. 19, 2019, in Australia.

FIELD OF THE INVENTION

The present disclosure relates to supraparticles loaded with high levels of payload and having controlled payload release profiles. Such supraparticles may be used in a range of therapeutic applications.

BACKGROUND OF THE INVENTION

Mesoporous silica's are porous materials with extremely high surface areas which have been widely used to encapsulate various compounds and for the template synthesis of diverse nanostructured materials. While, porous materials of this type are of interest in a diverse range of applications such as drug delivery, various issues remain unresolved. For example, high initial release profile or burst release behaviour is a challenge. In some cases, it may be necessary to control release and/or reduce initial burst release to achieve outcomes such as enhanced efficiency of therapeutic drug delivery, reduced dosing frequency and/or reduced potential side effects from the initial release of high levels of the therapeutic. Various approaches have been investigated to achieve these outcomes, including modification of the structure of nanocarriers and conjugating drug and nanocarriers via covalent bonds.

It would be desirable to provide new porous materials with extremely high surface areas, as it would be expected that the new materials may have a number of interesting properties.

Accordingly, improved supraparticles are required.

SUMMARY OF THE INVENTION

A current challenge for the temporal control of payload release from supraparticles is the initial rapid release of payload (i.e., "burst" release) that limits sustained release, leading to higher dosing frequency and reduced long-term efficacy of the drug. Burst release may also cause toxicity issues in a subject due to rapid increases in bioavailability of payload. Toxicity issues may be magnified when supraparticles are loaded with high levels of payload. The present inventors have surprisingly identified that coating supraparticles with a biodegradable coating can drastically reduce the initial burst release of a payload from the supraparticles even when they are loaded with high levels of payload. Accordingly, in a first aspect, the present disclosure relates to a composition comprising a supraparticle, wherein the supraparticle comprises at least 1.5 µg of payload and is coated with a biodegradable coating. In an example, the supraparticle is directly coated. In another example, the present disclosure relates to a composition comprising a biodegradable formulation and a supraparticle which comprises at least 1.5 µg of payload, wherein the supraparticle is dispersed in a biodegradable formulation.

In an example, the supraparticle comprises at least 2 µg of payload. In another example, the supraparticle comprises 1.5 µg to 10 µg of payload. In another example, the supraparticle comprises pores having a diameter of at least 60 nm. In another example, the supraparticle comprises pores having a diameter of at least 50-100 nm. In another example, the supraparticles have a disordered pore structure. In another example, the supraparticle is comprised of nanoparticles having a bimodal pore structure. In an example, the nanoparticles bimodal pore structure has a large pore diameter greater than 30 nm.

In an example, the biodegradable formulation or coating is a gel or a foam. In another example, the biodegradable formulation or coating comprises a proteinaceious fluid. In another example, the proteinaceious fluid comprises fibrin or a precursor thereof. In an example, the precursor thereof is fibrinogen. In an example, compositions comprising a precursor can further comprise an enzyme catalyst which catalyses conversion of the precursor to a biodegradable coating or part thereof. Accordingly, in an example, compositions disclosed herein can comprise a thrombin. In an example, a composition encompassed by the present disclosure encompasses fibrinogen and a thrombin.

In an example, the payload is a neurotrophic factor. For example, the neurotrophic factor may be a neurotrophin. In an example, the neurotrophin is BDNF or NT-3. In an example, the neurotrophin is BDNF. In another example, the neurotrophin is NT-3. In another example, the supraparticle comprises at least two payloads, one payload being a neurotrophic factor.

In another example, compositions disclosed herein comprise at least two, at least three, at least four, at least five, at least six, at least seven, at least eight, at least nine, at least 10 supraparticles. In this example, the supraparticles may be loaded with different payloads.

In another example, supraparticles encompassed by the present disclosure have a sustained release profile. In another example, supraparticles encompassed by the present disclosure have a substantially linear release profile. In another example, supraparticles encompassed by the present disclosure have a linear release profile.

In another example, supraparticles encompassed by the present disclosure are dispersed in a biodegradable formulation as a solid emersion. In this example, the biodegradable formulation coats the supraparticles.

In another example, supraparticles are coated with fibrin or chitosan.

The present inventors have also identified that coated supraparticles according to the present disclosure can be combined with hydrogel systems to improve the ease of surgical delivery of the supraparticles and/or further control drug release kinetics. Accordingly, in an example, the present disclosure encompasses a composition comprising a coated supraparticle disclosed herein and a hydrogel or slow release system. In an example, the supraparticle is directly coated. In an example the slow release system comprises alginate. In an example, the slow release system comprises alginate hydrogel. For example, the alginate hydro gel may be alg-CaCO3 hydrogel. In another example, the slow release system comprises a titanium-polyphenol gel or fibrin glue.

In an example, supraparticles are manufactured by electrospraying a composition comprising nanoparticles and Alginic acid or a polysaccharide derivative thereof into a di-cationic aqueous solution. In an example, the Alginic acid is $[(C_6H_8O_6)_n]$ or a polysaccharide derivative thereof. In another example, the Alginic acid sodium salt $[Na(C_6H_8O_6)_n]$ or a polysaccharide derivative thereof.

In another example, the present disclosure relates to use of a supraparticle or composition disclosed herein in the manufacture of a medicament for treating a disease or disorder. In an example, the disorder is hearing loss. In an example, the hearing loss is characterised as sensorineural hearing loss (SNHL), presbycusis or noise induced.

In another example, the present disclosure relates to a kit comprising a supraparticle or composition disclosed herein when used for treating a disease or disorder disclosed herein. In an example, the disorder is hearing loss. In another example, the kit further comprises a cochlear implant.

Any example herein shall be taken to apply mutatis mutandis to any other example unless specifically stated otherwise.

The present disclosure is not to be limited in scope by the specific examples described herein, which are intended for the purpose of exemplification only. Functionally-equivalent products, compositions and methods are clearly within the scope of the disclosure, as described herein.

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

The disclosure is hereinafter described by way of the following non-limiting Examples and with reference to the accompanying drawings.

BRIEF DESCRIPTION OF THE ACCOMPANYING DRAWINGS

FIG. 1. Example procedure of making MS—SPs.

Figure 2:
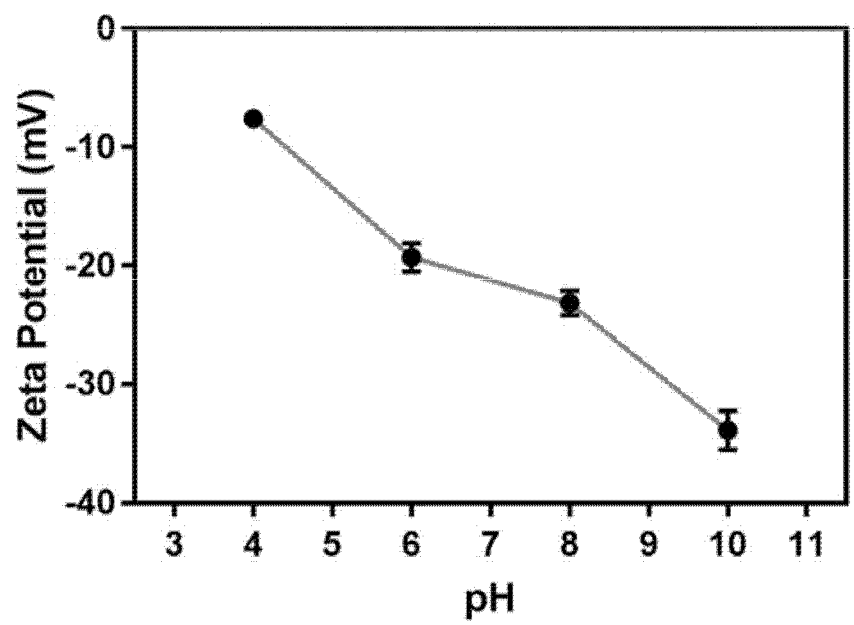

FIG. 2. Zeta potential of MS—SPs as a function of different pH values. Zeta potential measurements were carried out in 10 mM sodium acetate buffer (pH 4), 10 mM phosphate buffer (pH 6), 10 mM HEPES buffer (pH 8) and 10 mM sodium bicarbonate buffer (pH 10).

Figure 3:
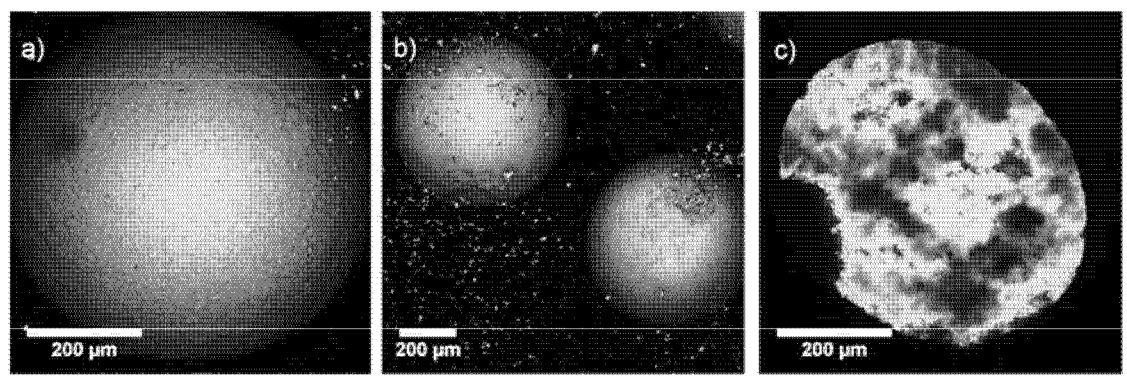

FIG. 3. Confocal microscopy images of MS—SPs loaded with FITC-lysozyme (green). a, b) MS—SPs at different magnifications. c) Inside of a fragmented MS—SP loaded with FITC-lysozyme.

Figure 4:
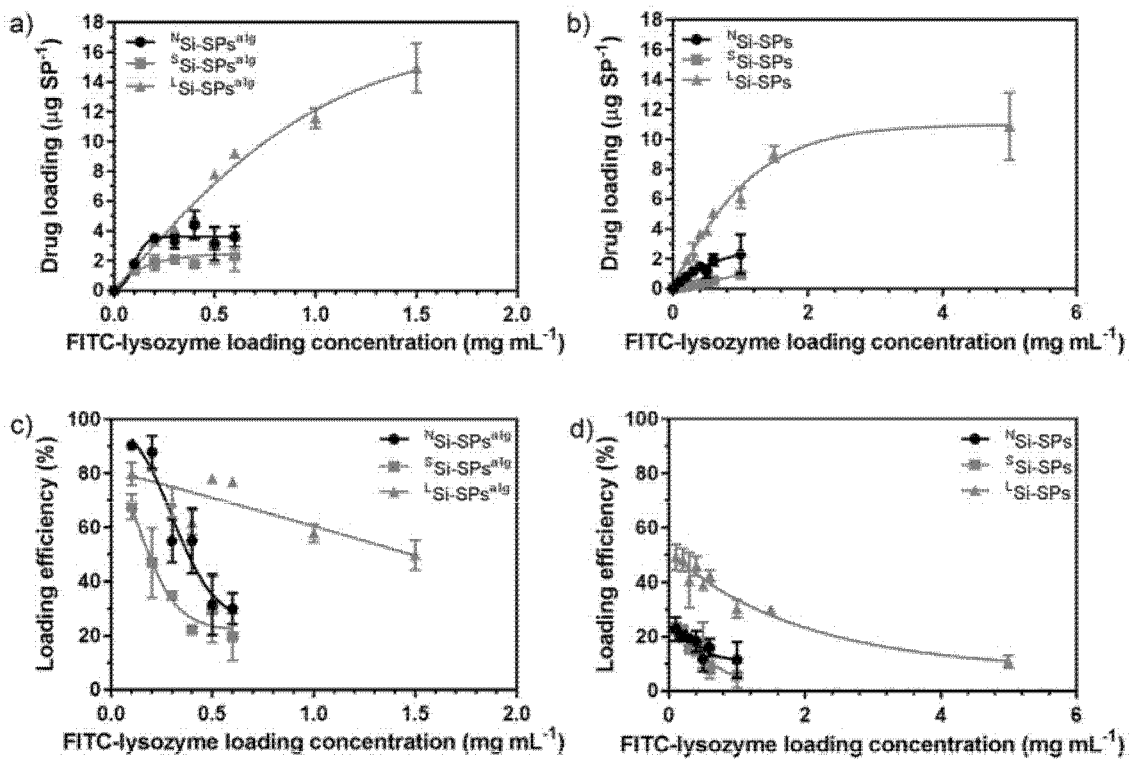

FIG. 4. Drug loading after 3 days (72 h) incubation time using different FITC-lysozyme loading concentration. a) The adsorbed amount of FITC-lysozyme into non-porous MS—SPs$^{alg}$ (black circles), small pore MS—SPs$^{alg}$ (blue squares) and MS—SPs$^{alg}$ (red triangles) versus the FITC-lysozyme loading concentration. b) The adsorbed amount of FITC-lysozyme into non-porous MS—SPs (black circles), small pore MS—SPs (blue squares) and MS—SPs (red triangles) versus the FITC-lysozyme loading concentration. c) The FITC-lysozyme loading efficiency in MS—SPs$^{alg}$ and d) MS—SPs. Data presented is average of three replicates, each using five SPs, and error bars represent standard deviation.

Figure 5:
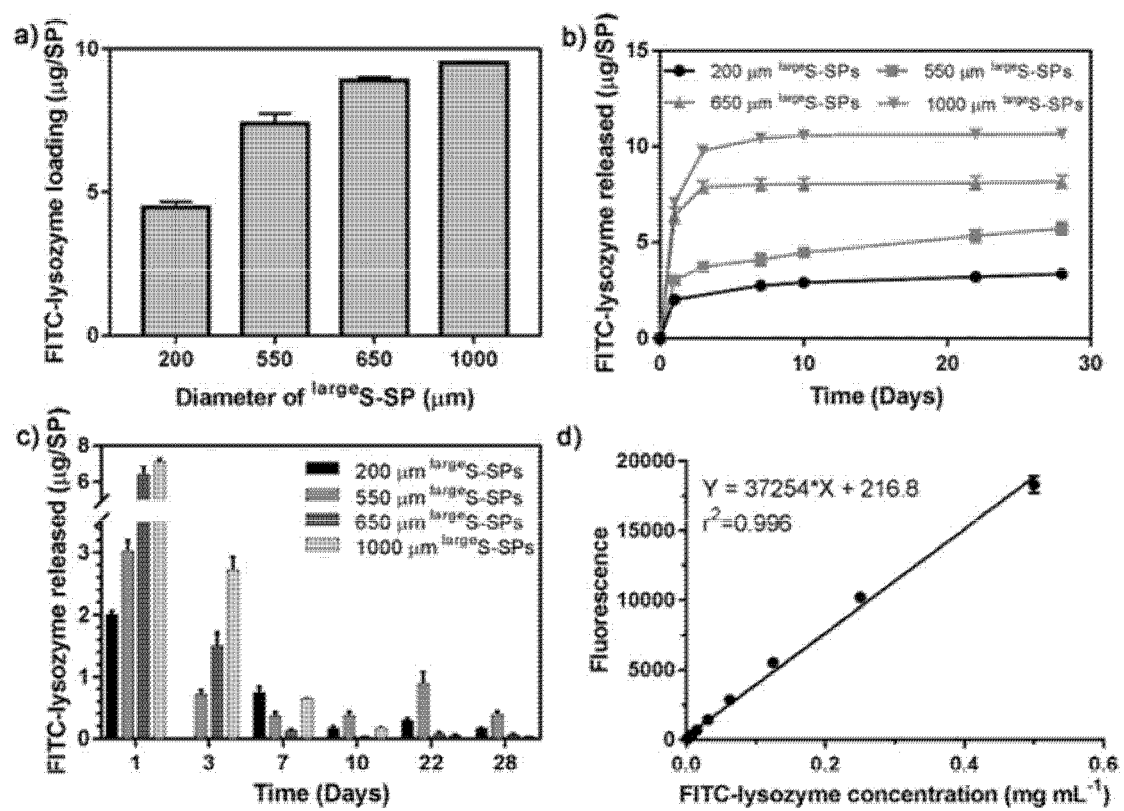

FIG. 5. FITC-lysozyme loading and release behaviour from MS—SPs with different diameters. a) FITC-lysozyme loading amount, b) In-vitro FITC-lysozyme release profile, c) the value of FITC-lysozyme released at each individual time point, d) In-vitro FITC-lysozyme release standard curve from MS—SPs with the diameter of 200, 550, 650, 1000 μm.

Figure 6:
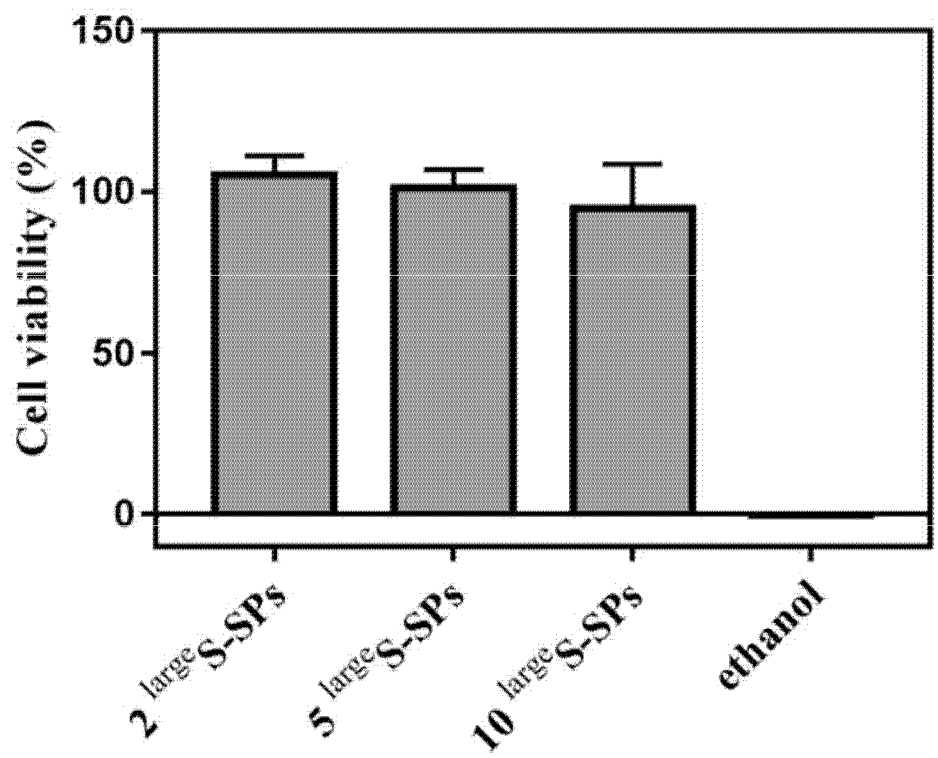

FIG. 6. Cell viability of human brain glioblastoma cells (U87MG cell line) incubated with different numbers of MS—SPs for 48 h. Ethanol added to cells with inserts was prepared as negative (cytotoxic) control and untreated cells represent 100% viability. Data presented is average of four samples, and error bars represent standard deviation.

Figure 7:
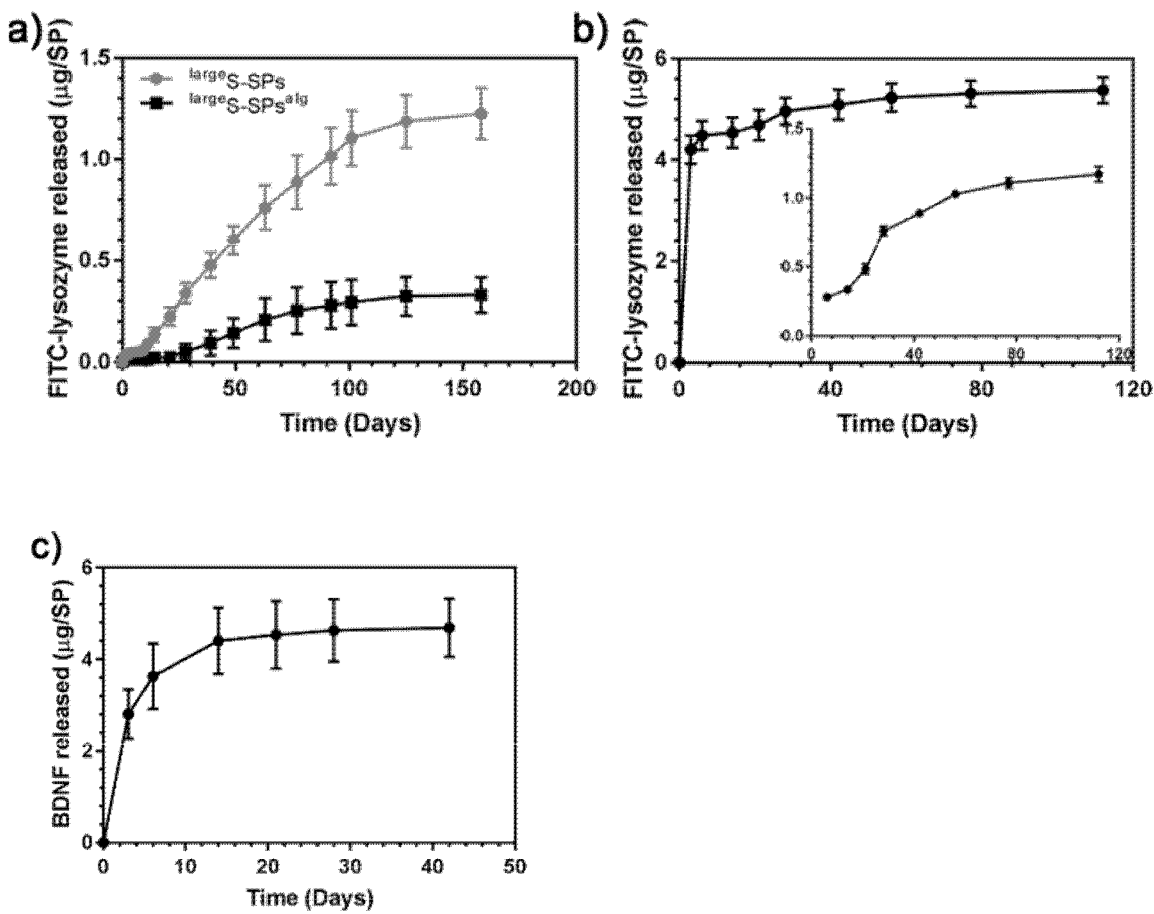

FIG. 7. In-vitro cumulative drug release profile. a). In-vitro FITC-lysozyme (0.2 mg mL$^{-1}$, drug loading for 3 days) release from MS—SPs (red circle), and MS—SPs$^{alg}$ (black triangle). Data presented is average of three replicates, each using ten SPs, and error bars represented standard deviation. b) In-vitro FITC-lysozyme (1.0 mg mL$^{-1}$, drug loading for 3 days) release from MS—SPs. The inset in (b) is the in-vitro FITC-lysozyme release profile starting from 6 days. c) In-vitro BDNF release from MS—SPs (1.0 mg mL$^{-1}$, drug loading for 3 days). BDNF ELISA (Abeam) was used for the measurement of BDNF concentration.

Figure 8:
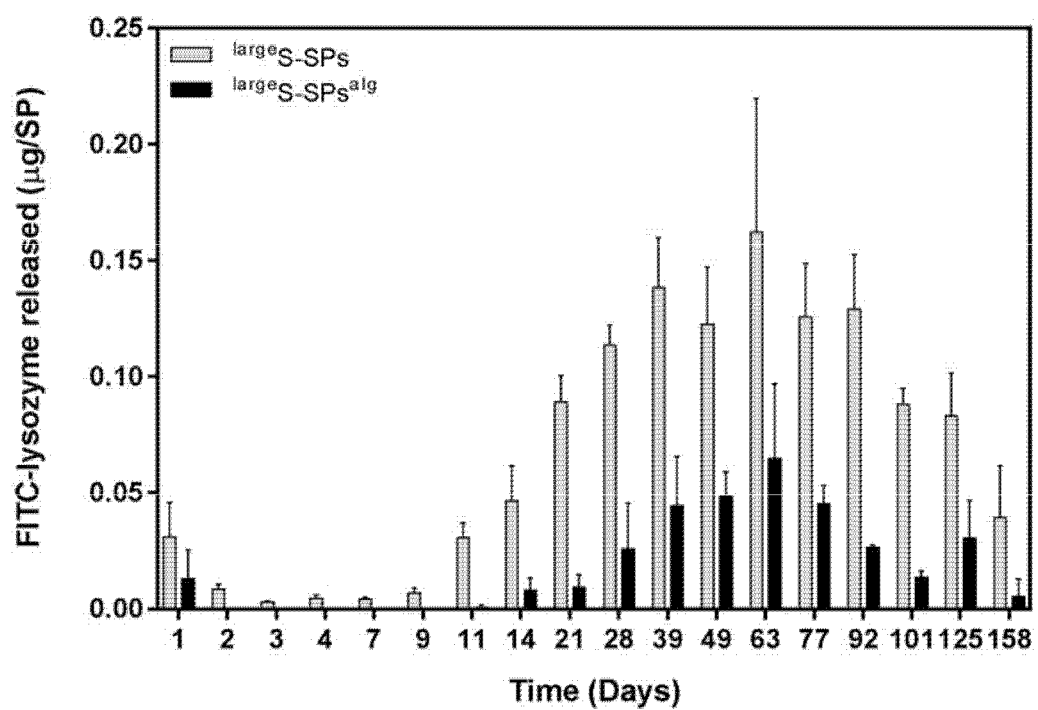

FIG. 8. The value of FITC-lysozyme released in each individual time point for MS—SPs$^{alg}$ and MS—SPs (loading conditions: 100 μL of 0.2 mg mL$^{-1}$ of FITC-lysozyme loaded, 3 days loading time). Data presented is average of three replicates, each using ten supraparticles, and error bars represent standard deviation.

Figure 9:
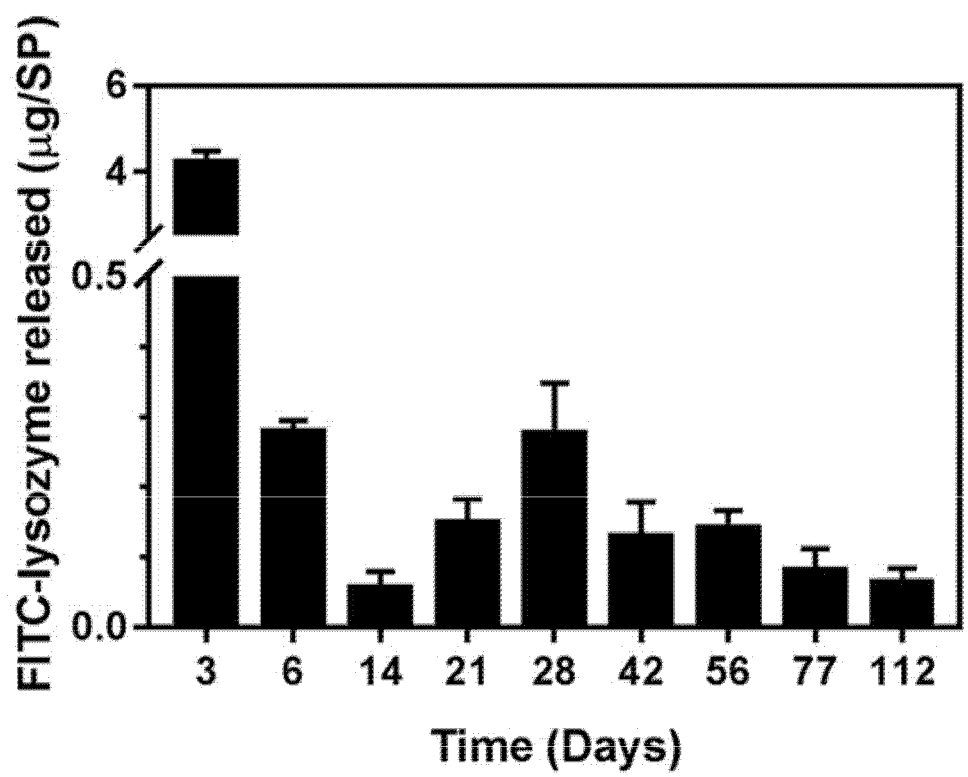

FIG. 9. The value of FITC-lysozyme released in each individual time point for MS—SPs (loading conditions: 100 μL of 1.0 mg mL$^{-1}$ of FITC-lysozyme loaded over 3 days). Drug loading was 6.49±0.48 μg per supraparticle. Data presented is average of three replicates, each using ten MS—SPs, and error bars represent standard deviation.

Figure 10:
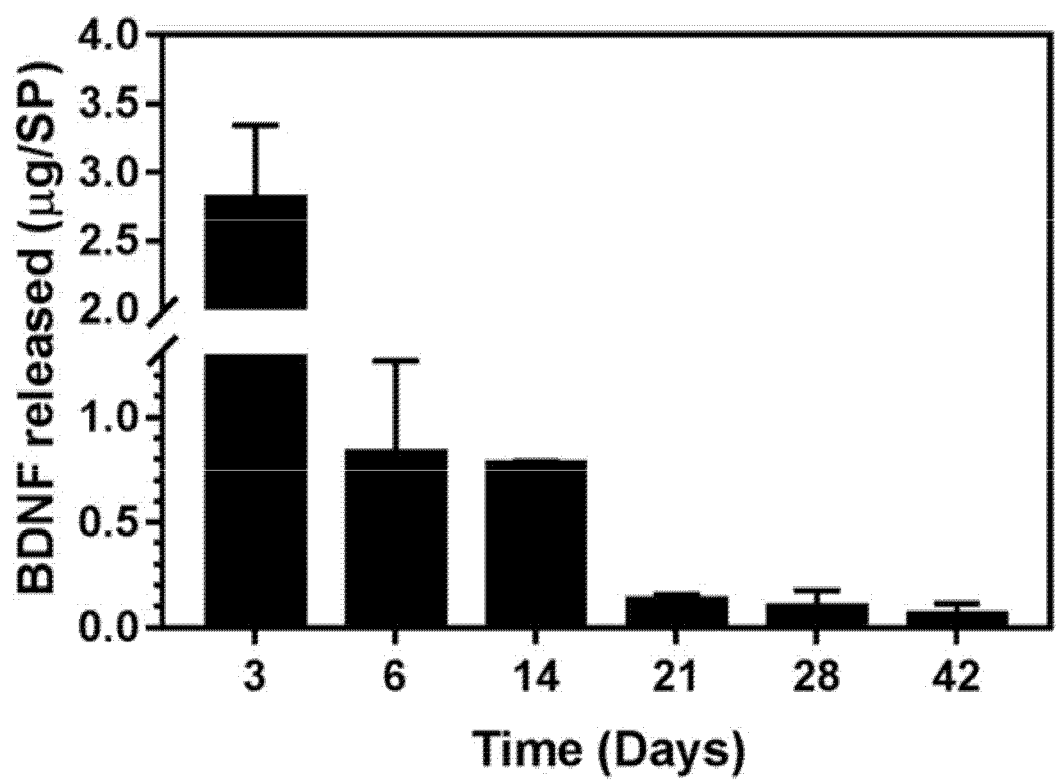

FIG. 10. The absolute value in each individual time points for in-vitro BDNF drug studies (loading conditions: 1.0 mg mL$^{-1}$ BDNF loaded over 3 days). Data presented is average of three replicates, each using one MS—SP, and error bars represent standard deviation.

Figure 11:
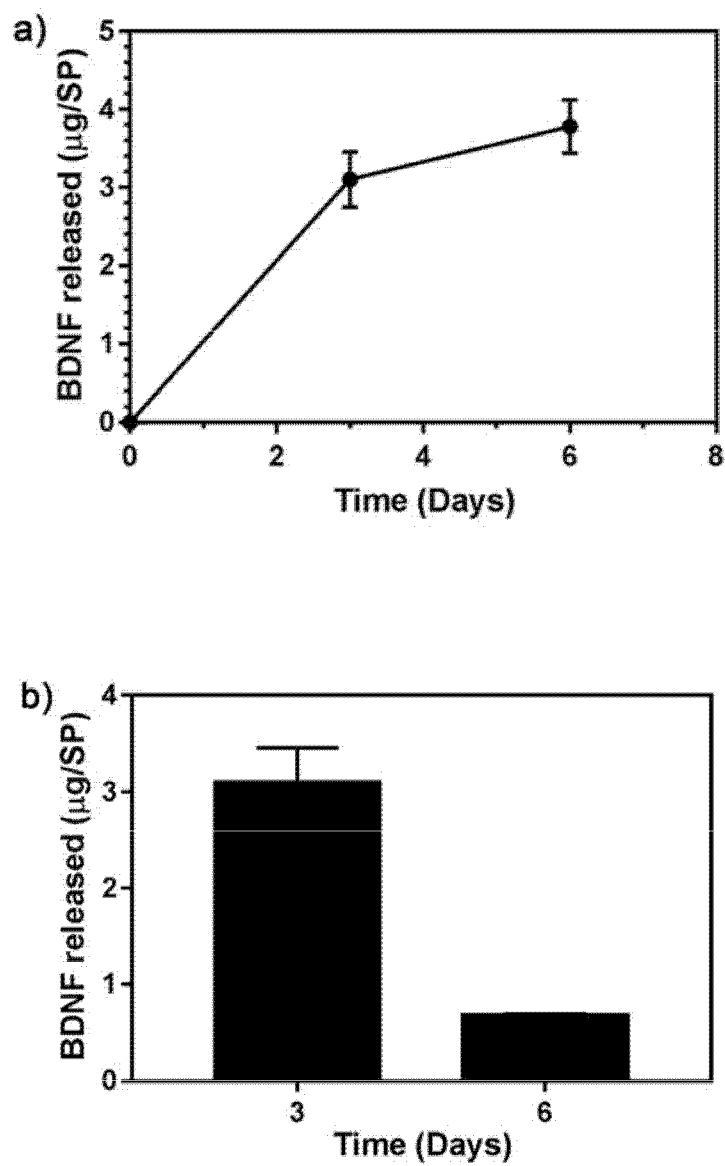

FIG. 11. a) MicroBCA assay for the measurement of BDNF from MS—SPs. b) The value of BDNF released at each individual time point of using MS—SPs. Drug loading is 6.82 μg per supraparticle. Data presented is average of three replicates, and error bars represent standard deviation.

Figure 12:
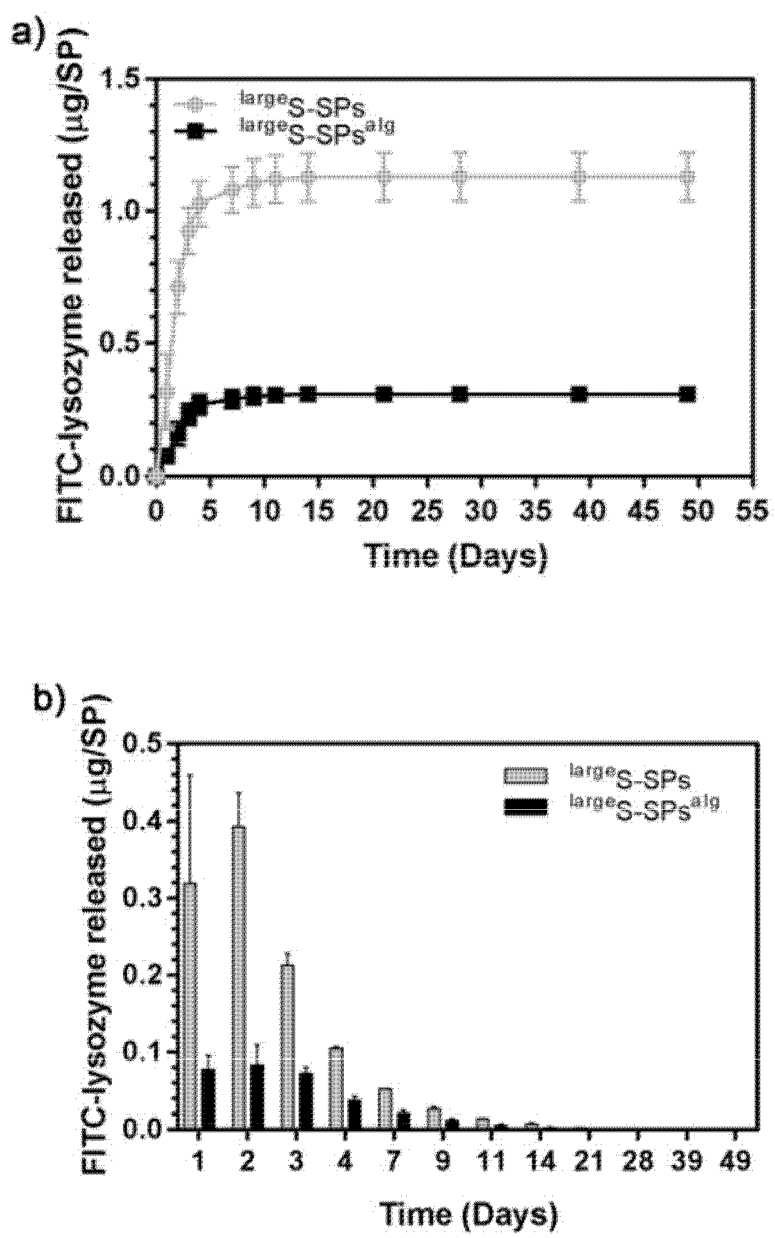

FIG. 12. a) In-vitro FITC-lysozyme release profile of MS—SPs (red circle), and MS—SPs$^{alg}$ (black square) in PF127 hydrogel system. b) The value of FITC-lysozyme released at each individual time point for figure (a) (100 μL of 0.2 mg mL$^{-1}$ FITC-lysozyme loaded). Drug loading is 1.89±0.08 μg per supraparticle and 1.93±0.03 μg per supraparticle in MS—SPs and MS—SPs$^{alg}$ respectively. Data presented is average of three replicates, each using ten supraparticles, and error bars represent standard deviation.

Figure 13:
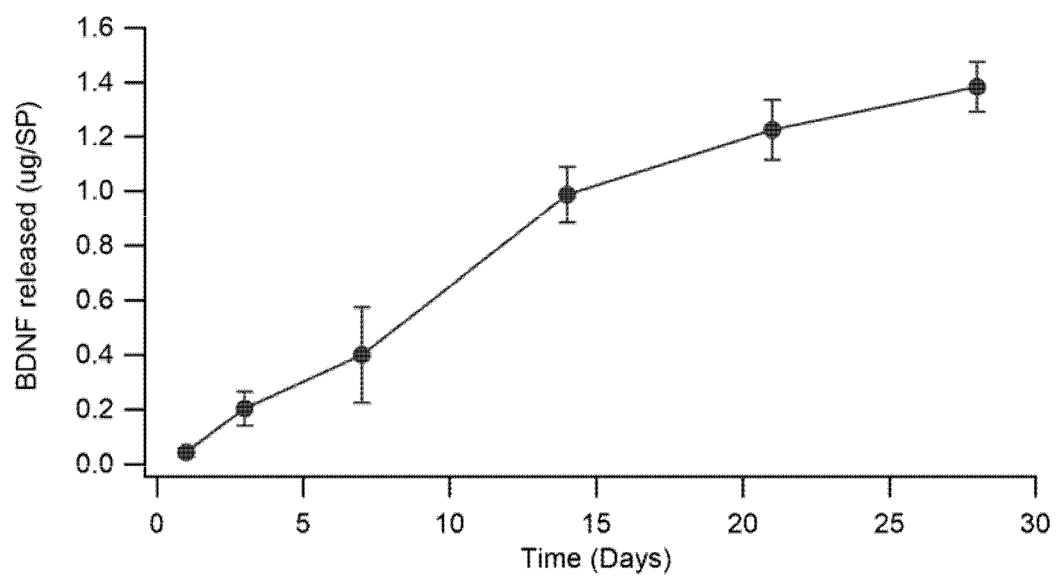

FIG. 13. In-vitro release profile when 50% loaded (3.65 μg/SP)

Figure 14:
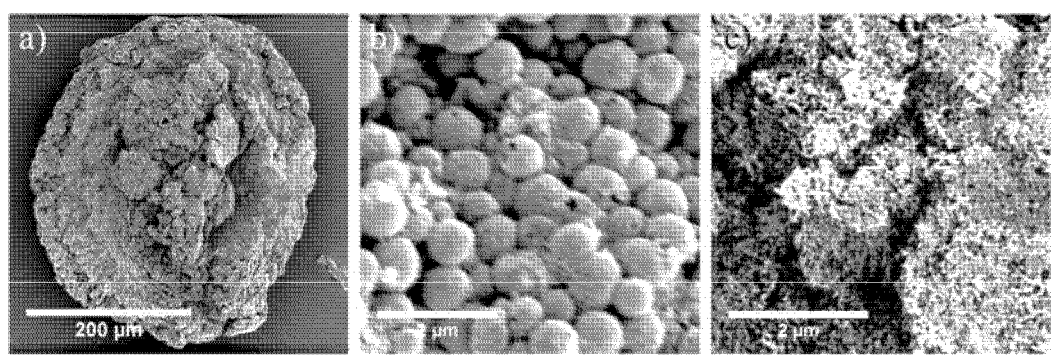

FIG. 14. Degradation of MS—SPs after 150 days of in-vitro drug release studies. a) SEM image of MS—SPs after 150 days of incubation in PBS (pH 7.4) at 37° C. b, c) SEM images of the surface structure of MS—SPs after 150 days of incubation in PBS (pH 7.4) at 37° C.

Figure 15:
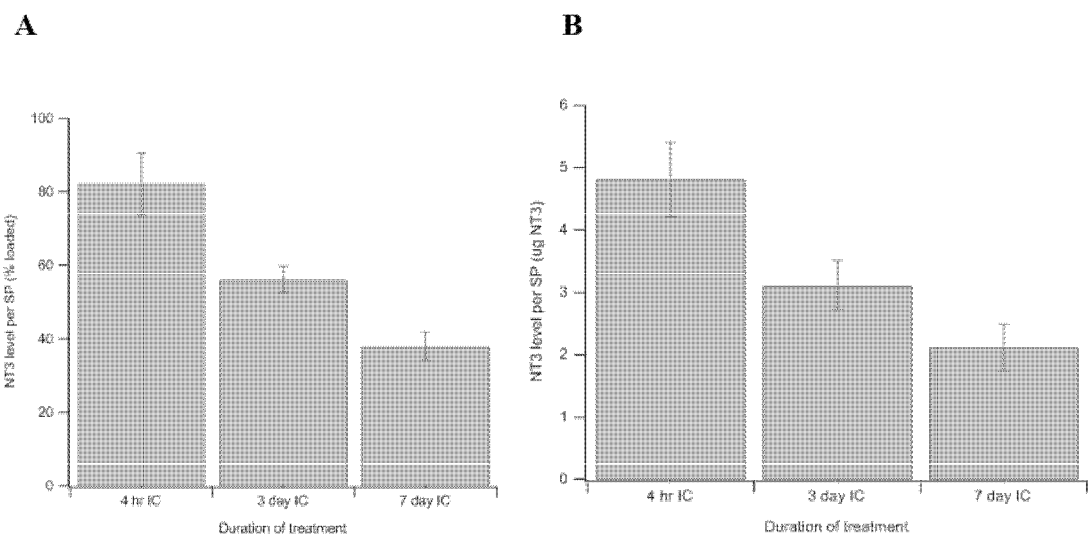

FIG. 15. Amount of neurotrophin-3 (% of loaded) and the total in μg is shown. After 1 week of implantation within the inner ear of a subject each SP contained ~2 ug of neurotrophin-3 (~40%) of initial loaded amount.

Figure 16:
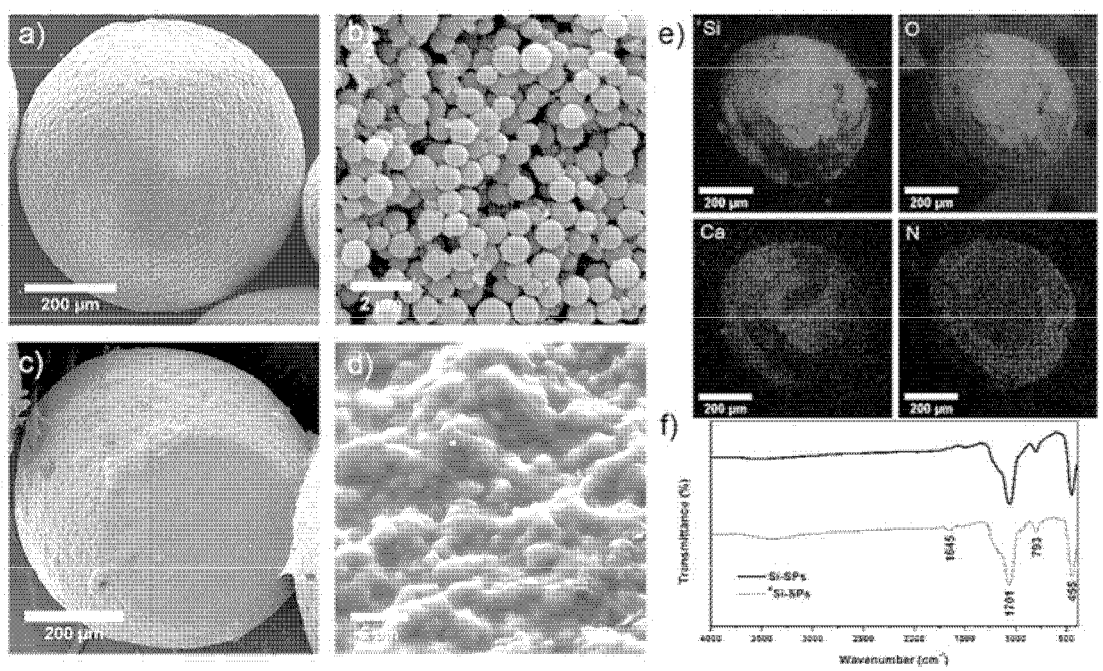

FIG. 16. Characterization of Si—SPs and $^F$Si—SPs. (a) SEM image of a Si—SP. (b) high-resolution SEM displaying the surface of a Si—SP. (c) SEM image of a $^F$Si—SP. (d)

high-resolution SEM displaying the surface of a $^F$Si—SP. (e) Elemental distribution of a $^F$Si—SP. (f) FTIR spectra of Si—SP and $^F$Si—SP.

Figure 17:
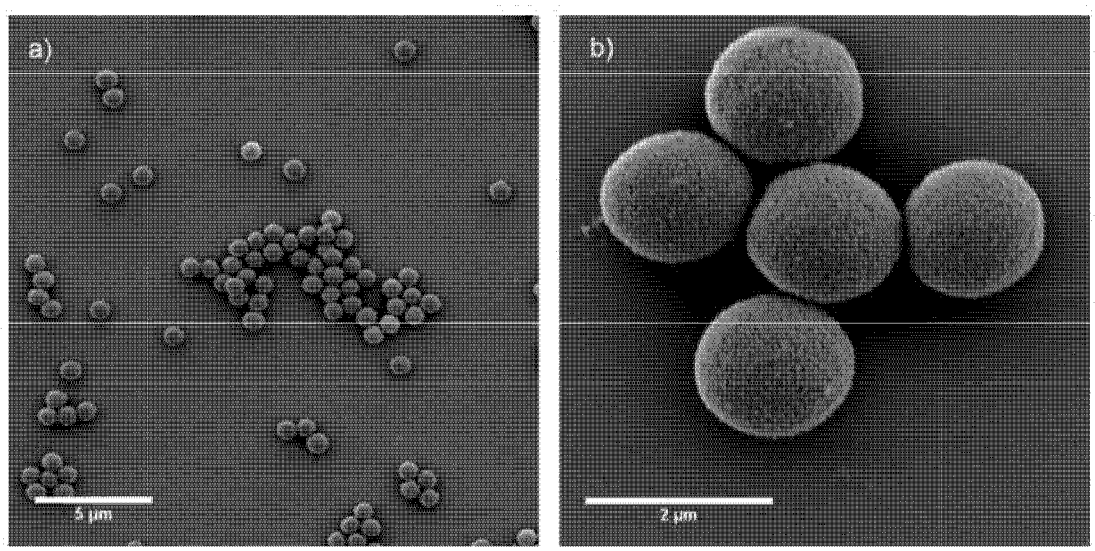

FIG. 17. SEM images of CaCO$_3$ particles at (a) low magnification and (b) high magnification.

Figure 18:
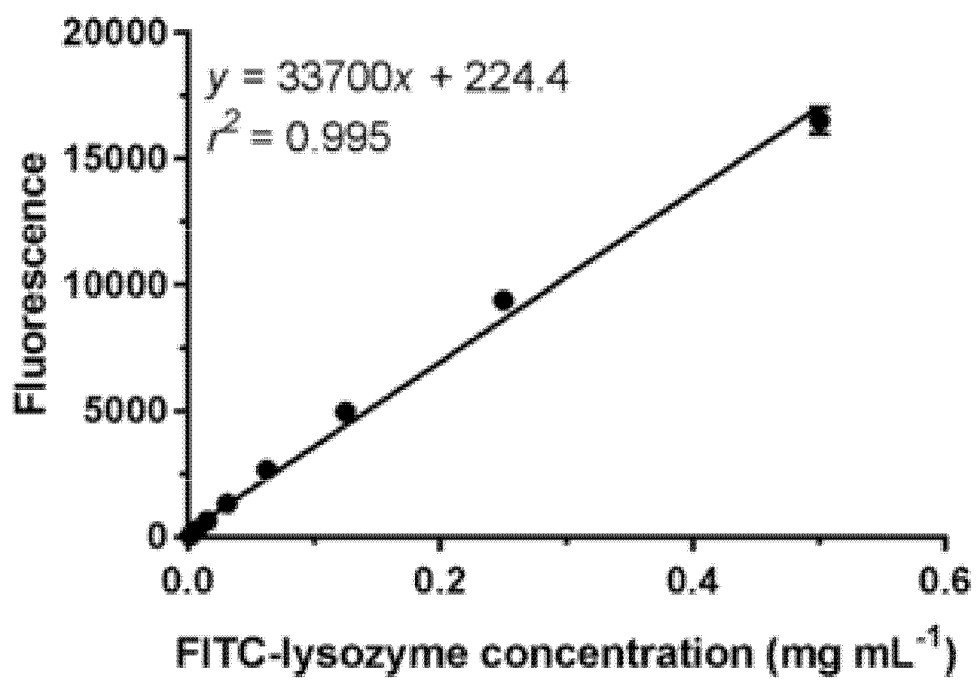

FIG. 18. In-vitro drug release standard curves for in-vitro FITC-lysozyme release profile of $^F$Si—SPs in FIG. 2a and b.

Figure 19:
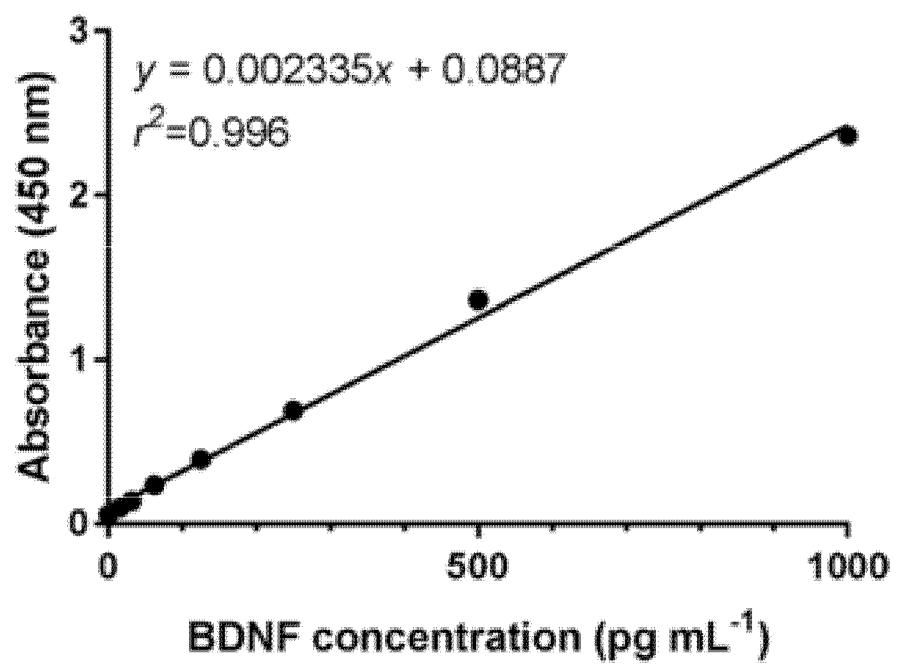

FIG. 19. In-vitro release standard curve for BDNF.

Figure 20:
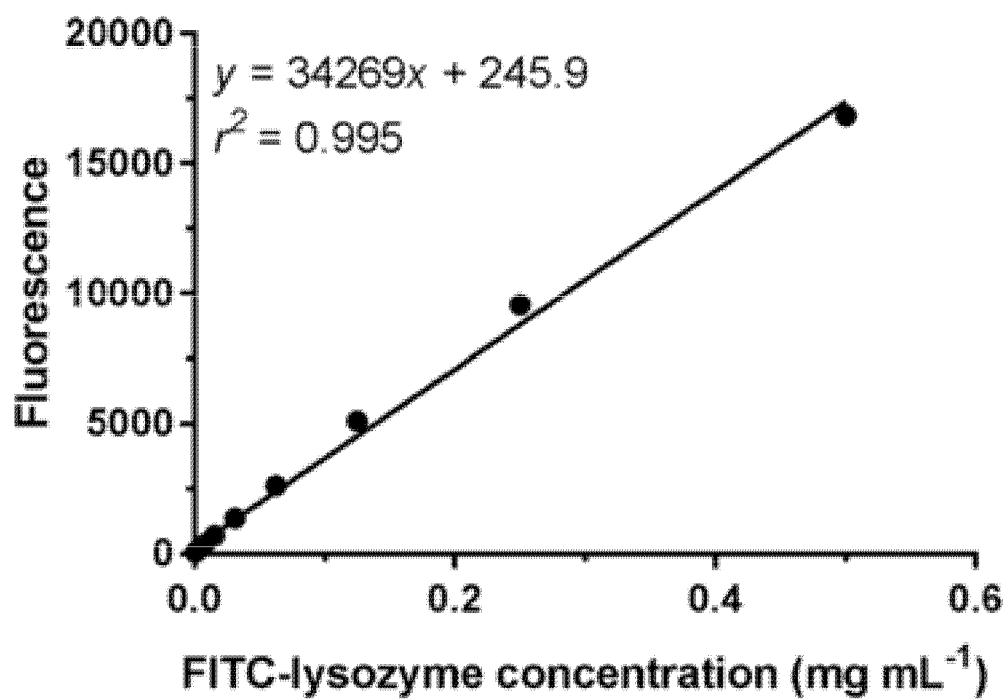

FIG. 20. In-vitro drug release standard curves for in-vitro FITC-lysozyme release profile of $^F$Si—SPs in alg-CaCO$_3$ hydrogel.

Figure 21:
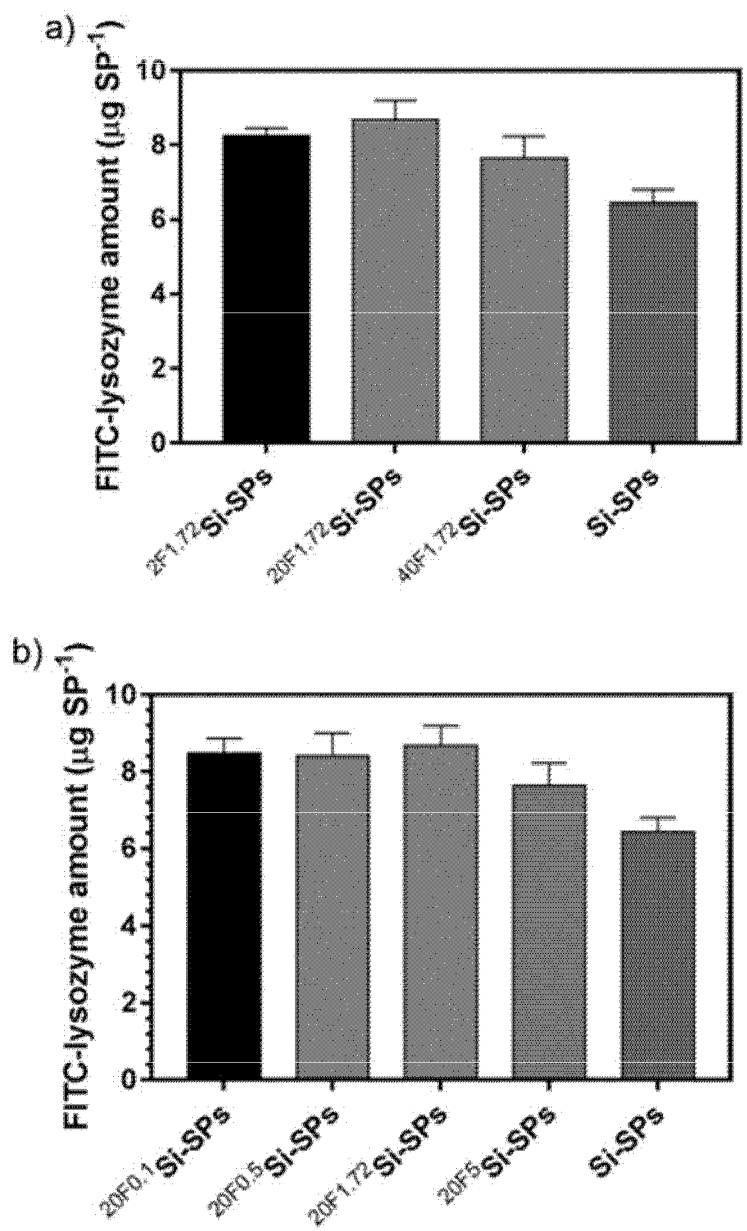

FIG. 21. Drug loading amount of FITC-lysozyme in Si—SPs before coating with different concentrations of fibrinogen and thrombin.

Figure 22:
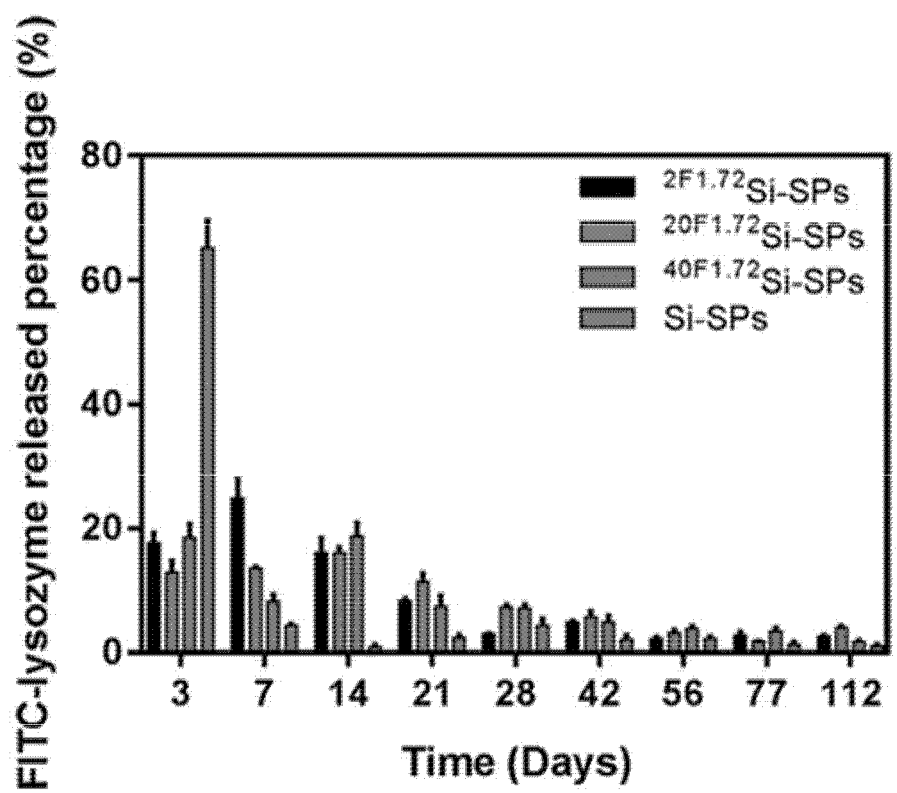

FIG. 22. Percentage of FITC-lysozyme released from Si—SPs and $^F$Si—SPs coated with fibrin at different concentrations of fibrinogen (2 mg mL$^{-1}$, 20 mg mL$^{-1}$ and 40 mg mL$^{-1}$ with 1.72 mg mL$^{-1}$ of thrombin denoted as $^{2F1.72}$Si—SPs, $^{20F1.72}$Si—SPs and $^{40F1.72}$Si—SPs, respectively) at a given time point. Data presented are averages of triplicates with error bars indicating standard deviation, each using 10 SPs.

Figure 23:
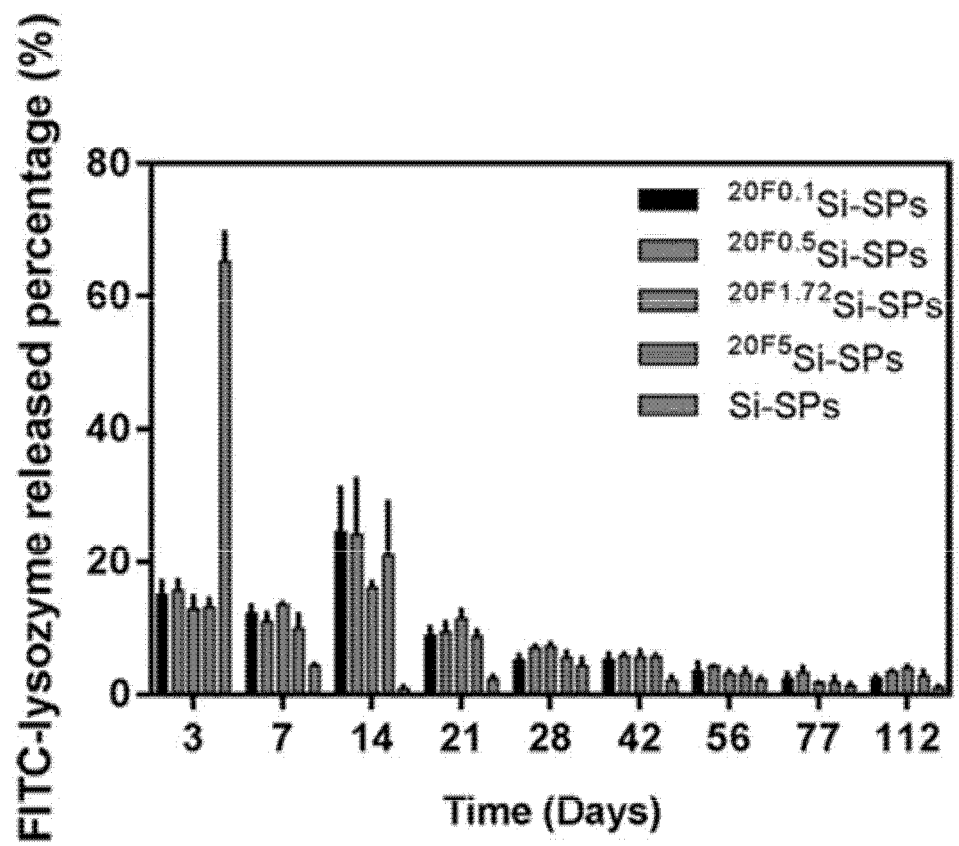

FIG. 23. Percentage of FITC-lysozyme released from Si—SPs and $^F$Si—SPs coated with fibrin at different concentrations of thrombin (0.1 mg mL$^{-1}$, 0.5 mg mL$^{-1}$, 1.72 mg mL$^{-1}$ and 5 mg mL$^{-1}$ with 20 mg mL$^{-1}$ of fibrinogen and denoted as $^{20F0.1}$Si—SPs, $^{20F0.5}$Si—SPs, $^{20F1.72}$Si—SPs and $^{20F5}$Si—SPs, respectively. Data presented are averages of triplicates with error bars indicating standard deviation, each using 10 SPs.

Figure 24:
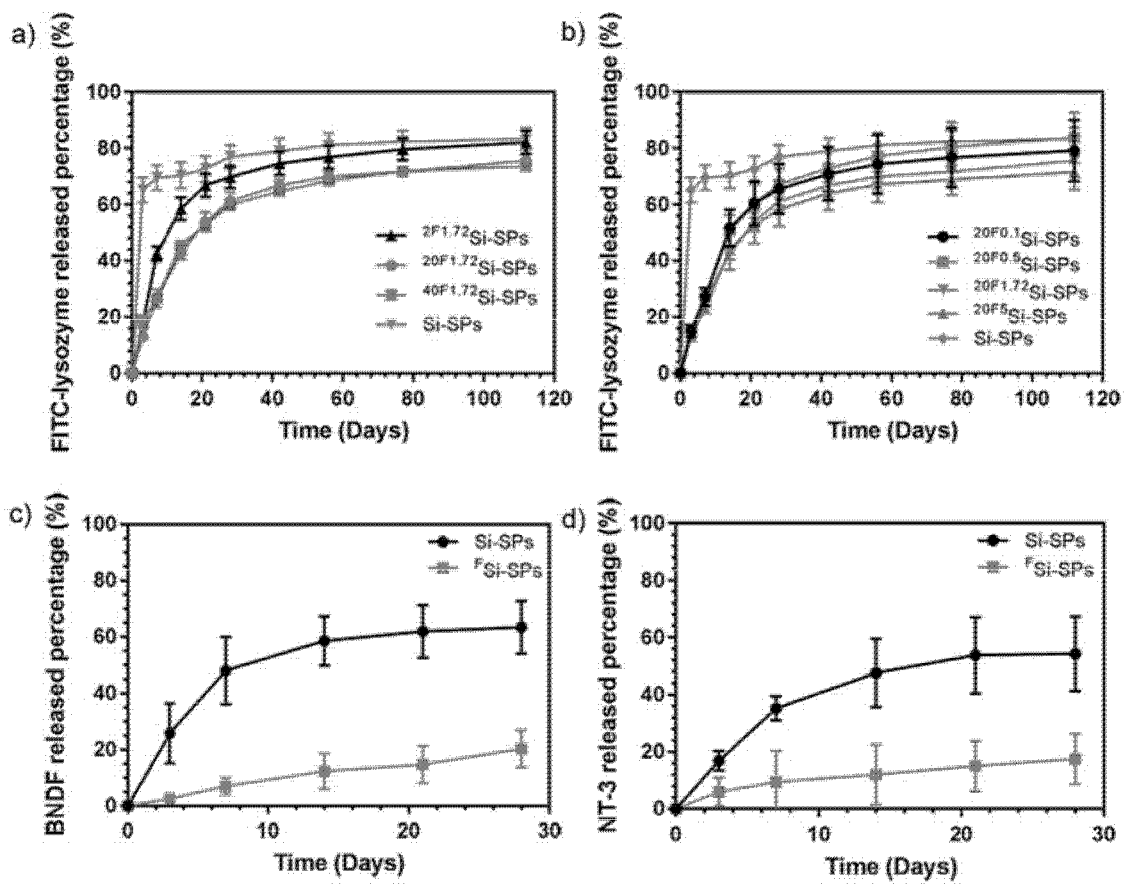

FIG. 24. In-vitro cumulative release profiles. (a). FITC-lysozyme release from Si—SPs and $^F$Si—SPs coated with fibrin at different concentrations of fibrinogen (2 mg mL$^{-1}$, 20 mg mL$^{-1}$ and 40 mg mL$^{-1}$ at 1.72 mg mL$^{-1}$ of thrombin denoted as $^{2F1.72}$Si—SPs, $^{20F1.72}$Si—SPs and $^{40F1.72}$Si—SPs, respectively). (b). FITC-lysozyme release from Si—SPs and $^F$Si—SPs coated with fibrin at different concentrations of thrombin (0.1 mg mL$^{-1}$, 0.5 mg mL$^{-1}$, 1.72 mg mL$^{-1}$ and 5 mg mL$^{-1}$ at 20 mg mL$^{-1}$ of fibrinogen and denoted as $^{20F0.1}$Si—SPs, $^{20F0.5}$Si—SPs, $^{20F1.72}$Si—SPs and $^{20F5}$Si—SPs, respectively). Release profile of (c) BDNF and (d) NT-3 from Si—SPs and $^F$Si—SPs. Data presented in (a-d) are averages of triplicates with error bars indicating standard deviation, each measuring release from 10 SPs in (a) and (b) and 1 SP in (c) and (d).

Figure 25:
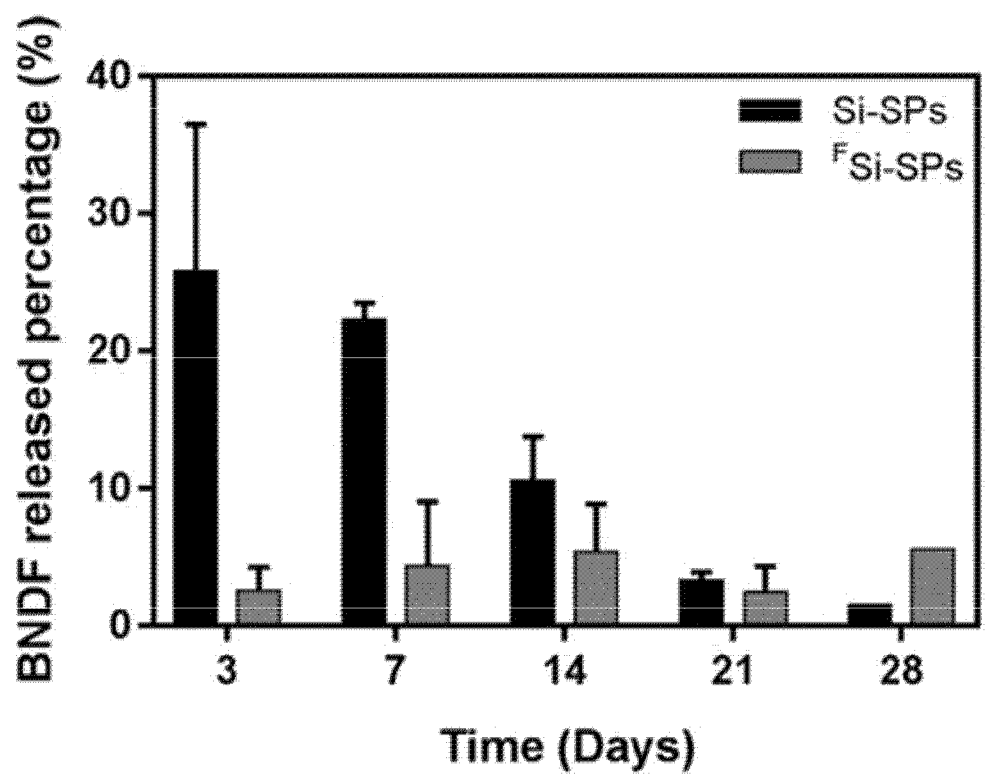

FIG. 25. Percent of BDNF released from Si—SPs and $^F$Si—SPs at a given time point, as measured using ELISA. Data presented are averages of triplicates with error bars indicating standard deviation, each using 1 SPs.

Figure 26:
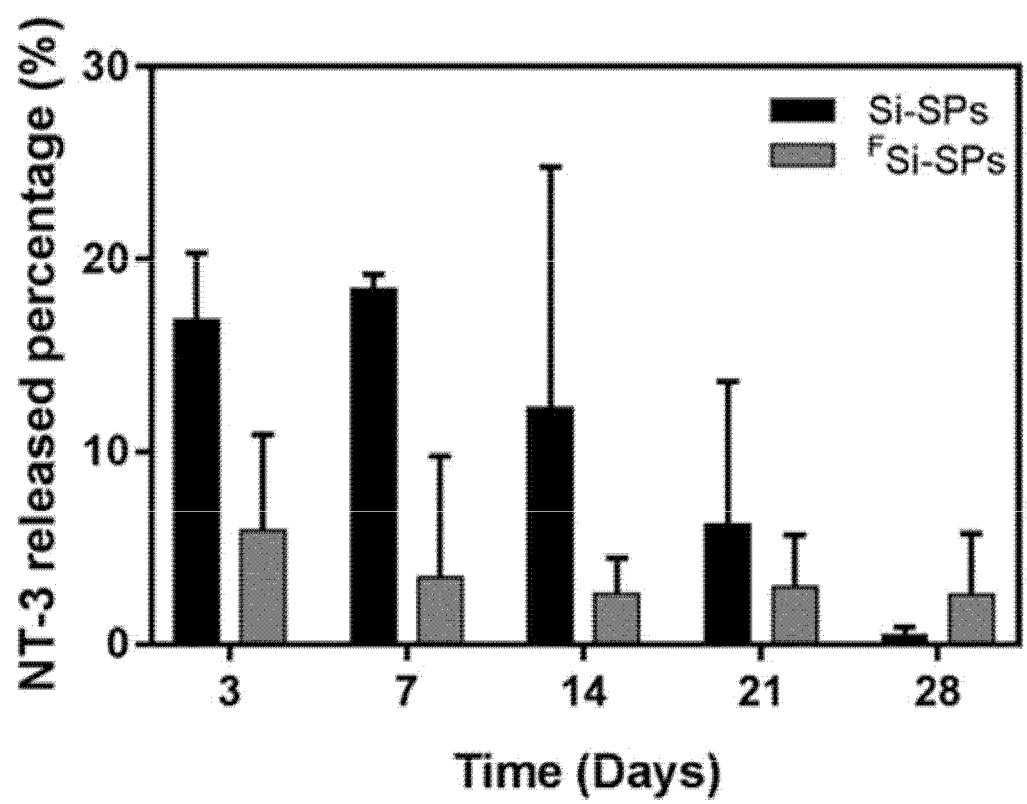

FIG. 26. Percent of NT-3 released from Si—SPs and $^F$Si—SPs at a given time point, as measured using ELISA. Data presented are averages of triplicates with error bars indicating standard deviation, each using 1 SPs.

Figure 27:
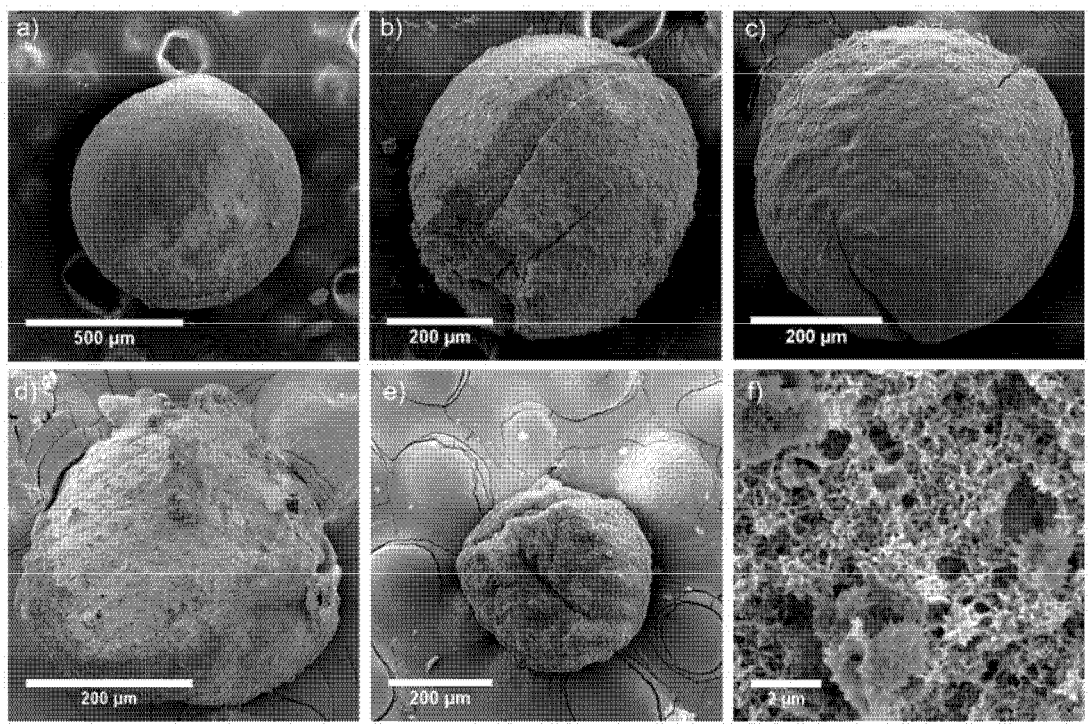

FIG. 27. SEM images of Si—SPs after degradation in PBS (pH 7.4) at 37° C. for (a) 3 d, (b) 2 w, (c) 3 w, (d) 6 w, (e) 10 w. (f) shows the surface structure of Si—SPs after 10 weeks' incubation in PBS (pH 7.4) at 37° C. By comparing FIG. 16b with (f) here, drastic changes are observed.

Figure 28:
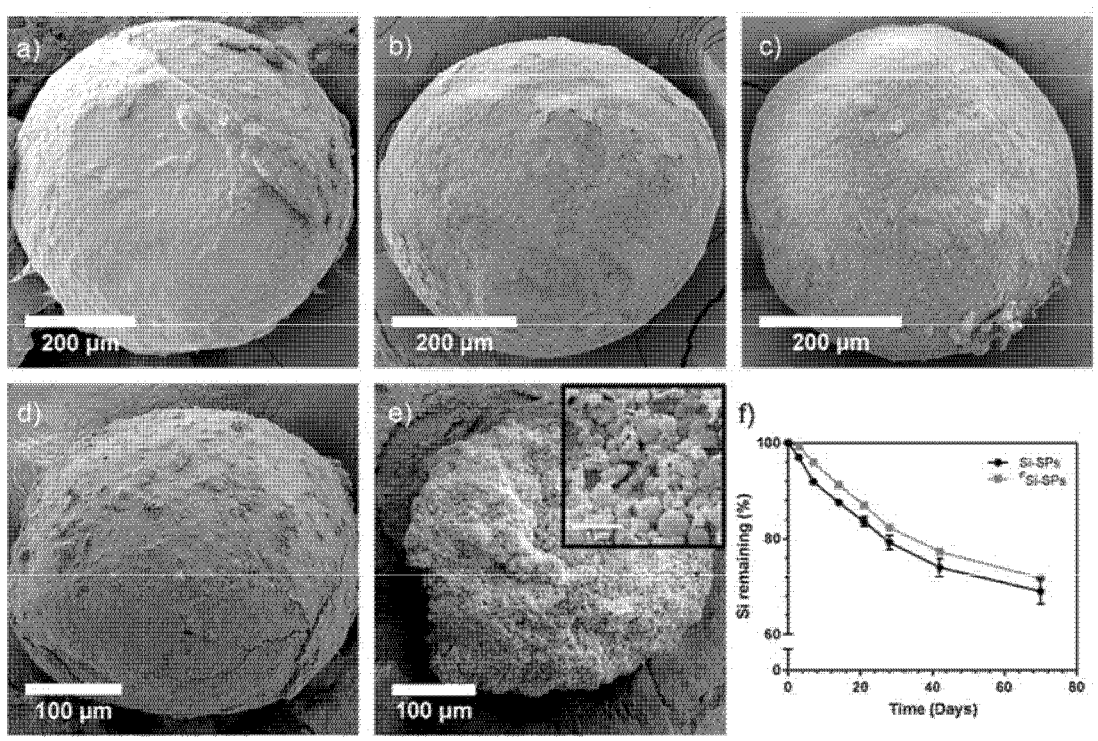

FIG. 28. SEM images of $^F$Si—SPs after incubation in PBS (pH 7.4) at 37° C. for (a) 3 d, (b) 2 w, (c) 3 w, (d) 6 w, and (e) 10 w. Inset in (e) shows the surface structure of $^F$Si—SPs after 10 weeks incubation in PBS (pH 7.4) at 37° C. Representative images of $^F$Si—SPs before incubation appear in FIG. 16 and images of degraded Si—SPs are shown in FIG. 27. (f) ICP-OES analysis to quantify the Si released from Si—SPs and $^F$Si—SPs over 10 weeks. $^F$Si—SPs were prepared using 20 mg mL$^{-1}$ of fibrinogen and 1.72 mg mL$^{-1}$ of thrombin.

Figure 29:
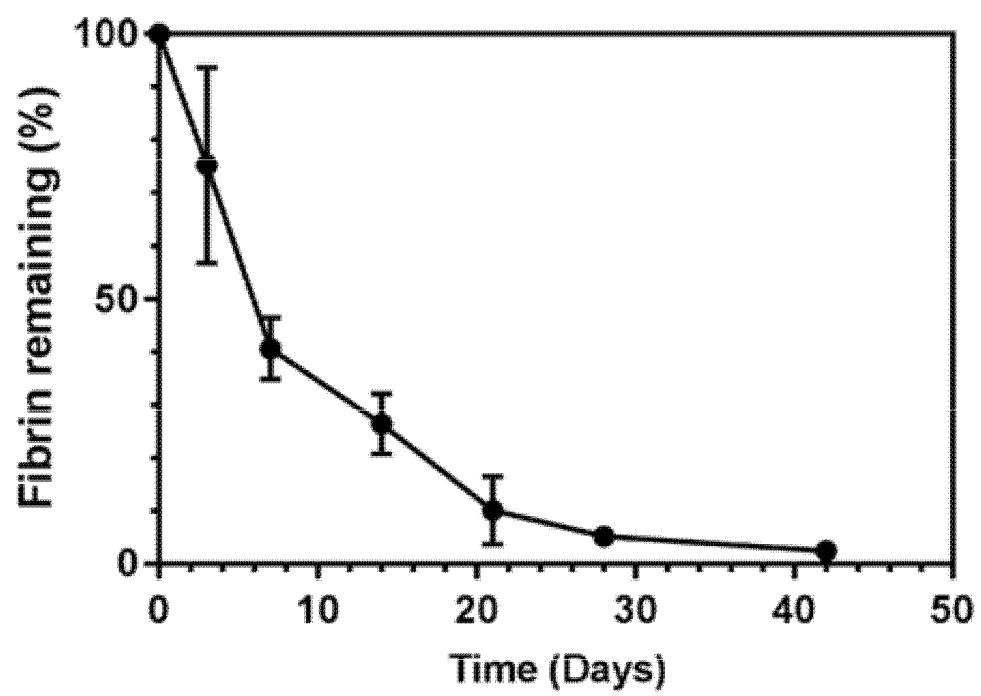

FIG. 29. In-vitro accumulative degradation percentage of fibrin from $^F$Si—SPs (20 mg mL$^{-1}$ fibrinogen and 1.72 mg mL$^{-1}$ was used for fibrin coating). The amount of fibrin was measured using a MicroBCA protein assay kit.

Figure 30:
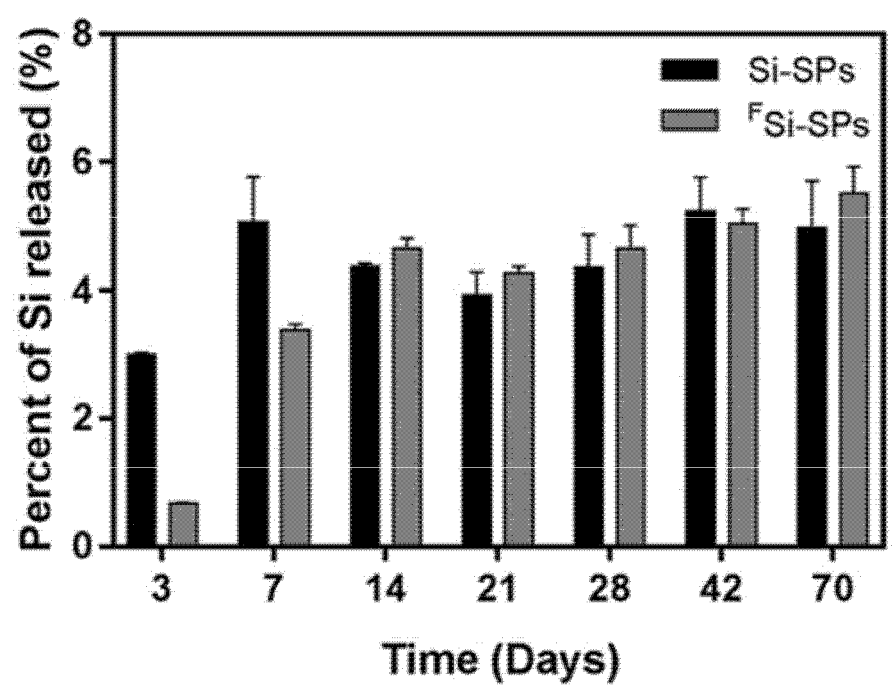

FIG. 30. Measured released of Si at each time point as percentage of starting amount of Si in the supraparticles.

Figure 31:
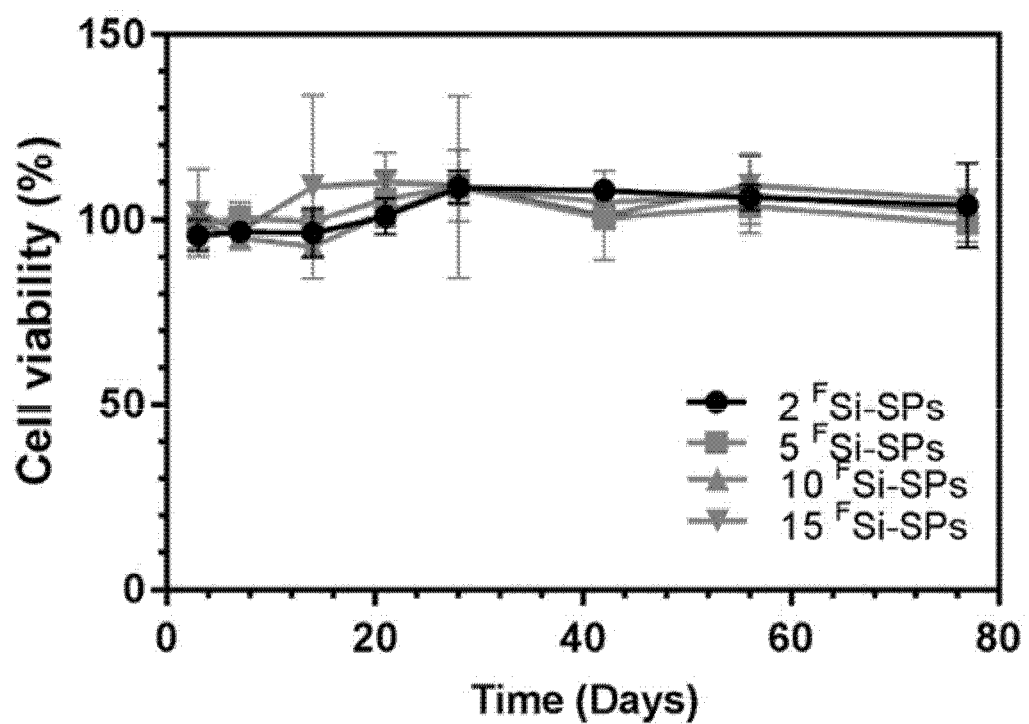

FIG. 31. Cell viability of human brain glioblastoma cells after 48 h exposure to cell media containing degradation products from 2, 5, 10 or 15 $^F$Si—SPs, incubated in cell media for up to 77 days under sterile conditions. Each point represents the average of triplicate wells with error bars indicating the standard deviation. Untreated cells (i.e., cells exposed only to standard culture media) were used to define 100% viability.

Figure 32:
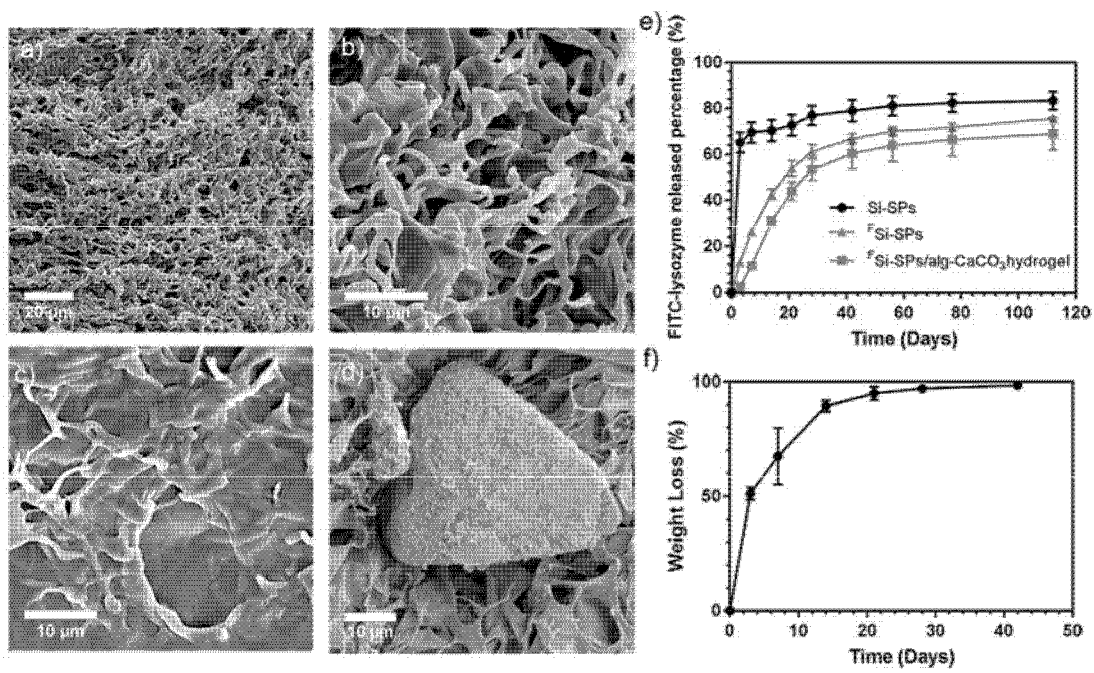

FIG. 32. SEM images of the cross-section of freeze-dried alg-CaCO$_3$ hydrogel (synthesized using 2 wt % of alginate solution and 1.5 mg CaCO$_3$ particles) at (a) low magnification and (b) high magnification. (c). SEM image of the surface structure of freeze-dried alg-CaCO$_3$ hydrogel. (d). A fragment of $^F$Si—SPs within freeze-dried alg-CaCO$_3$ hydrogel. (e). In-vitro FITC-lysozyme release percentage from Si—SPs, $^F$Si—SPs and $^F$Si—SPs in alg-CaCO$_3$ hydrogel ($^F$Si—SPs were synthesized by using 20 mg mL$^{-1}$ of fibrinogen and 20 mg mL$^{-1}$ of thrombin for the fibrin coating). (f). The degradation of alg-CaCO$_3$ hydrogel in PBS (pH 7.4) at 37° C. over 42 days. Data presented are averages of triplicates with error bars representing standard deviation.

Figure 33:
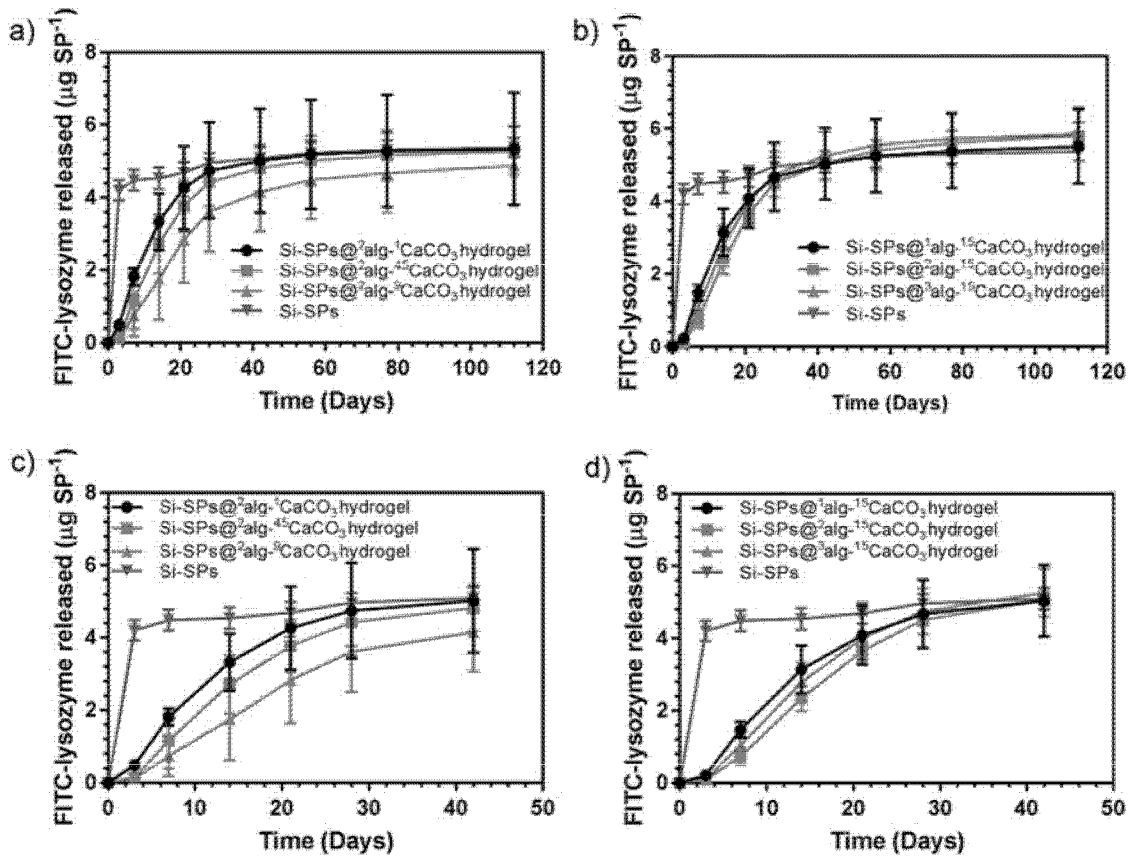

FIG. 33. In-vitro FITC-lysozyme release profile of (a). Si—SPs in alg-CaCO$_3$ hydrogel prepared with different amount of CaCO$_3$ particles: 1 mg, 4.5 mg or 9 mg with 2 wt % of alginate solution and denoted as Si—SPs@$^2$alg-$^1$CaCO$_3$ hydrogel, Si—SPs@$^2$alg-$^{4.5}$CaCO$_3$ hydrogel and Si—SPs@$^2$alg-$^9$CaCO$_3$ hydrogel, respectively. The green line is the in-vitro Si—SPs release profile without hydrogel. (b) Si—SPs in alg-CaCO$_3$ hydrogel prepared with different concentration of alginate solution: 1 wt %, 2 wt % or 3 wt % with 1.5 mg of CaCO$_3$ particles and denoted as Si—SPs@$^1$alg-$^{1.5}$CaCO$_3$ hydrogel, Si—SPs@$^2$alg-$^{1.5}$CaCO$_3$ hydrogel and Si—SPs@$^3$alg-$^{1.5}$CaCO$_3$ hydrogel, respectively. The green line is the Si—SPs release profile without hydrogel. (c) The in-vitro drug release profile from (a) in first 42 days, (d) The in-vitro drug release profile from (b) in first 42 days. Figure c and d show that the alg-CaCO$_3$ hydrogel can retard the burst release of FITC-lysozyme from Si—SPs to 28 days.

Figure 34:
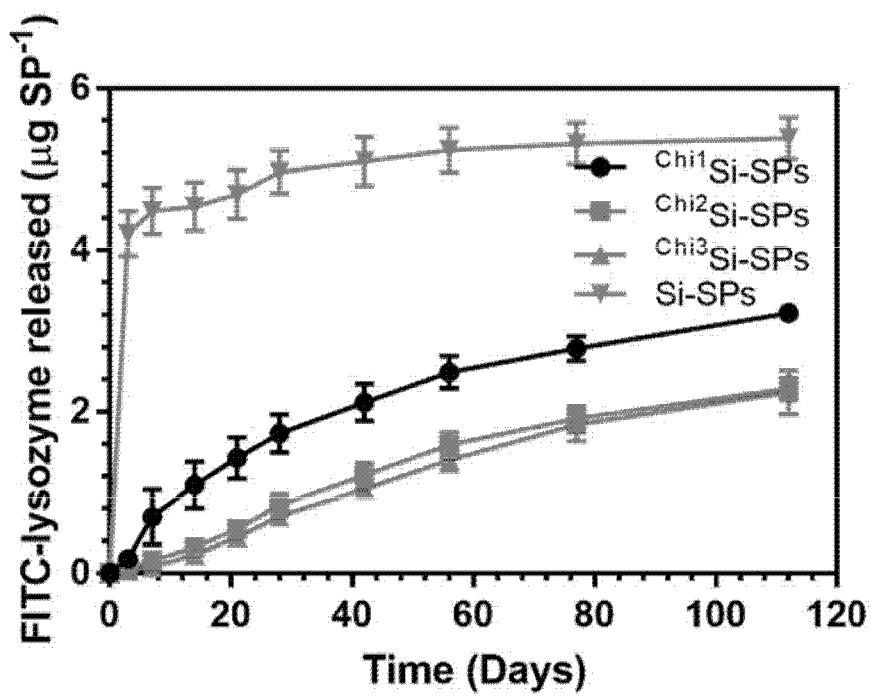

FIG. 34. In-vitro FITC-lysozyme release profile from $^{Chi}$Si—SPs (0.1 wt % of chitosan and alginate solution to coat Si—SPs. Si—SPs have been coated into 1, 2 or 3 layers of chitosan and alginate).

Figure 35:
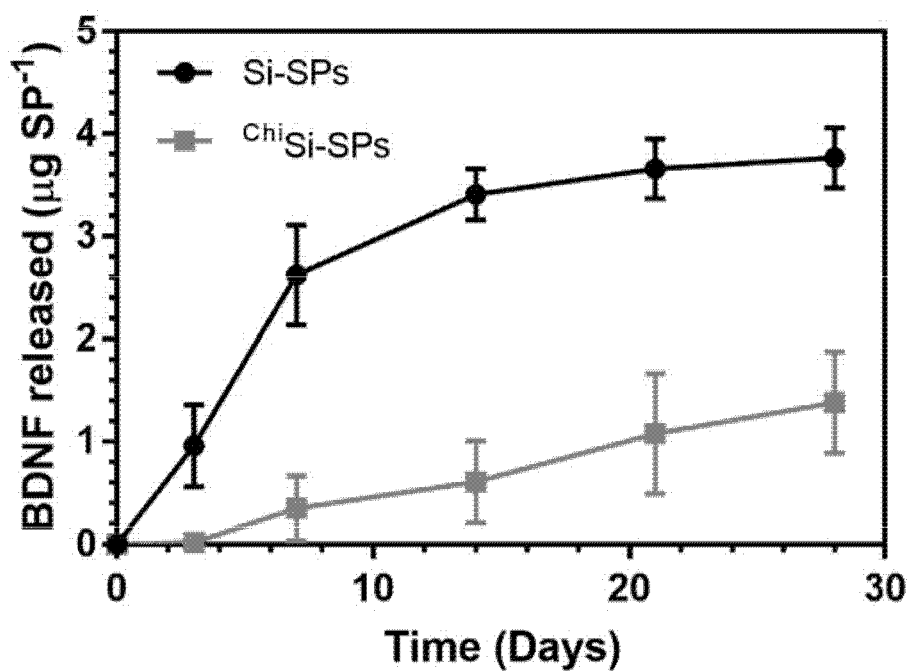

FIG. 35. In-vitro BDNF release profile from Si—SPs and $^{Chi}$Si—SPs (0.1 wt % of chitosan and alginate solution in 2 cycles coat on Si—SPs).

Figure 36:
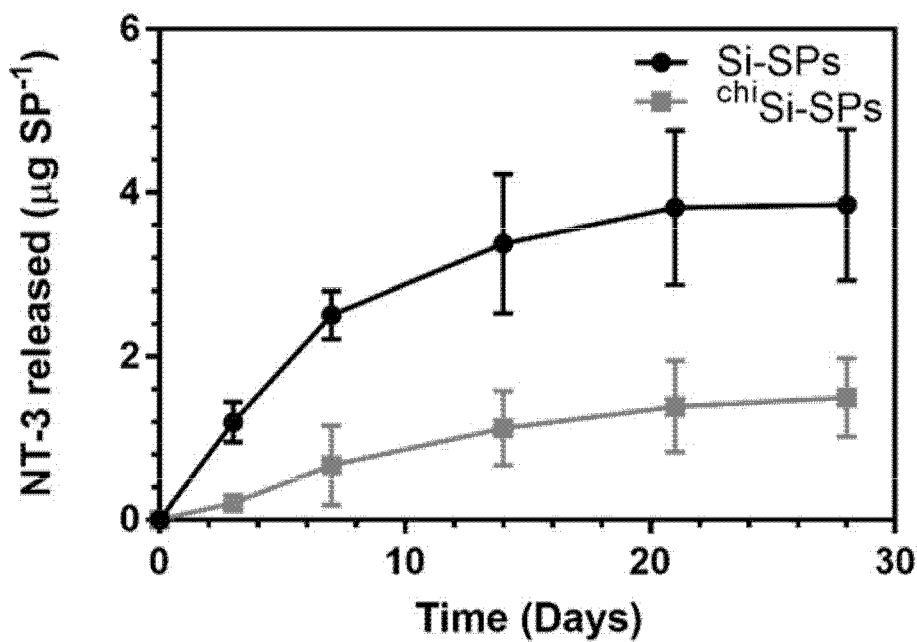

FIG. 36. In-vitro NT-3 release profile from Si—SPs and $^{Chi}$Si—SPs (0.1 wt % of chitosan and alginate solution in 2 cycles coat on Si—SPs).

Figure 37:
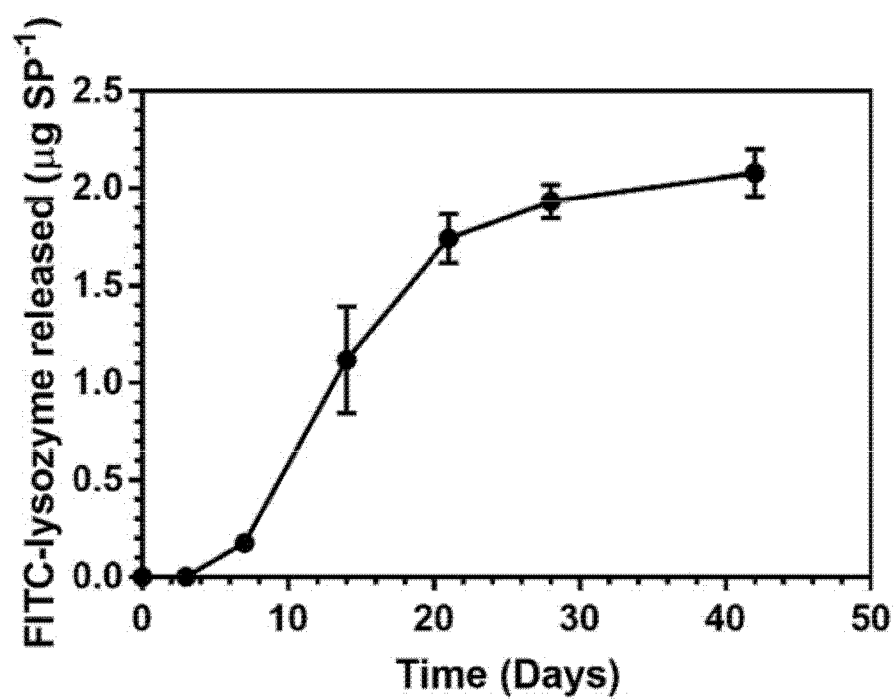

FIG. 37. In-vitro FITC-lysozyme release profile from $^{Chi}$Si—SPs (1 wt % of chitosan and alginate solution to coat Si—SPs, chitosan and alginate coating in 1 cycle).

DETAILED DESCRIPTION OF THE INVENTION

General Techniques and Selected Definitions

Unless specifically defined otherwise, all technical and scientific terms used herein shall be taken to have the same meaning as commonly understood by one of ordinary skill in the art (e.g., physiology, clinical studies, molecular biology, high surface area molecules, electrospraying and biochemistry).

Unless otherwise indicated, techniques utilized in the present disclosure are standard procedures, well known to those skilled in the art. Such techniques are described and explained throughout the literature in sources such as, J. Perbal, A Practical Guide to Molecular Cloning, John Wiley and Sons (1984), J. Sambrook et al., Molecular Cloning: A Laboratory Manual, Cold Spring Harbour Laboratory Press (1989), T. A. Brown (editor), Essential Molecular Biology: A Practical Approach, Volumes 1 and 2, IRL Press (1991), D. M. Glover and B. D. Hames (editors), and F. M. Ausubel et al. (editors), Current Protocols in Molecular Biology, Greene Pub. Associates and Wiley-Interscience (1988, including all updates until present), Ed Harlow and David Lane (editors) Antibodies: A Laboratory Manual, Cold Spring Harbour Laboratory, (1988), and J. E. Coligan et al. (editors) Current Protocols in Immunology, John Wiley & Sons (including all updates until present).

As used in this specification and the appended claims, terms in the singular and the singular forms "a," "an" and "the," for example, optionally include plural referents unless the content clearly dictates otherwise. Thus, for example, reference to "a supraparticle" optionally includes a plurality of supraparticles.

As used herein, the term "about", unless stated to the contrary, refers to +/−10%, more preferably +/−5%, more preferably +/−1%, of the designated value.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

As used herein, the term "treatment" refers to clinical intervention designed to alter the natural course of the individual or cell being treated during the course of clinical pathology. Exemplary desirable effects of treatment include reduction in symptoms associated with a disorder being treated. In the context of treating hearing loss, desirable effects of treatment include decreasing the rate of hearing loss and ameliorating or palliating hearing loss. An individual is successfully "treated", for example, if one or more symptoms associated with the disorder are mitigated or eliminated.

A "therapeutically effective amount" refers to at least the minimum amount required to effect a measurable improvement of a particular disorder. A therapeutically effective amount can also include at least the minimum amount required to effect a measurable improvement in a subject's disorder. A therapeutically effective amount can be provided in one or more administrations. The therapeutically effective amount may vary according to the severity of the disorder being treated and also according to the weight, age, racial background, sex, health and/or physical condition of a subject being treated. Typically, the effective amount will fall within a relatively broad range (e.g. a "dosage" range) that can be determined through routine trial and experimentation by a medical practitioner. The therapeutically effective amount can be administered in a single dose or in a dose repeated once or several times over a treatment period.

Payload

Supraparticles, according to the present disclosure, can comprise various payloads. The "payload" can be any agent useful for treating a disorder. Examples of agents include biological products such as polynucleotides, antibodies, monoclonal antibodies, antibody fragments, antibody drug conjugates, proteins, biologically active proteins, fusion proteins, recombinant proteins, peptides, polypeptides, synthesized polypeptides, vaccines, therapeutic serums, viruses, polynucleotides, cells such as stem cells or parts thereof as well as small molecules.

Exemplary viral payloads can comprise appropriately modified retrovirus, Adenovirus (AdV), Adeno-associated virus (AAV) or a recombinant form such as recombinant adeno-associated virus (rAAV) and derivatives thereof such as self-complementary AAV (scAAV) and non-integrating AV. Other exemplary viral therapeutic payloads can comprise herpes simplex virus (HSV), lentivirus, vaccina and vesicular stomatitis virus (VSV). For example, the viral therapeutic payload can comprise AAV. Various AAV serotypes are known and may be suitable viral payloads. In an example, the AAV is serotype 2. In another example, the AAV is serotype 1. In other examples, the AAV is serotype 3, 4, 7, 8, 9, 10, 11, 12 or 13.

In an example, the small molecule is a neurotransmitter. The term "neurotransmitter" is used in the context of the present disclosure to refer to a substance that transmits signal(s) across a chemical synapse from one cell to another. Generally, a neurotransmitter transmits signal(s) across a chemical synapse from one neuron to a target cell such as another neuron, muscle cell or gland cell. In another example, the small molecule is a receptor agonist. The term "agonist" is used in the context of the present disclosure to refer to a substance which initiates a physiological response when combined with a receptor. In another example, the small molecule is a receptor antagonist. The term "antagonist" is used in the context of the present disclosure to refer to a substance which interferes with or inhibits the physiological action of a receptor.

Exemplary polynucleotides include antisense polynucleotides, double stranded DNA (dsDNA) or double stranded RNA (dsRNA). In one example, the dsDNA or dsRNA is an aptamer. In another example, the dsRNA is a siRNA, miRNA or shRNA.

Exemplary antibodies and fragments thereof include human antibodies, humanized antibodies, chimeric antibodies, single chain antibodies, diabodies, triabodies, tetrabodies or single domain antibodies. In an example, the antibody can be bi-specific, an antibody-drug conjugate or a biosimilar antibody. Other exemplary polypeptides include cytokines, chemokines, hormones and blood coagulation factors. In an example the polypeptide is an enzyme. Exemplary enzymes include proteases, lipases, asparaginases, liprotamases, tissue plasminogen activators, collagenases, glutaminases, hyaluronidases, streptokinases, uricases, urokinases or nucleases, such as a programmable nuclease. In an example, the enzyme can be a DNA methyltransferase. In an example, the enzyme can be a programmable nuclease targeted to introduce a genetic modification into a gene or a regulator region thereof. For example, the programmable nuclease can be a RNA-guided engineered nuclease (RGEN). In an example, the RGEN is from an archaeal genome or may be a recombinant version thereof. In another example, the RGEN may be from a bacterial genome or is a recombinant version thereof. In another example, the RGEN is from a Type I (CRISPR)-cas (CRISPR-associated) system. In another example, the RGEN is from a Type II (CRISPR)-cas (CRISPR-associated) system. In another example, the RGEN is from a Type III (CRISPR)-cas (CRISPR-associated) system. In an example, the nuclease is from a class I RGEN or a class II RGEN.

In another example, the therapeutic payload is a DNA methylation inhibitor, a histone acetyl transferase inhibitor or a histone deacetylase inhibitor.

In another example, the therapeutic payload may be an antigen which stimulates an immune response in a subject. Exemplary antigens include proteins, peptides, polysaccharides or oligosaccharides (free or conjugated to a protein carrier) or mixtures thereof. Other exemplary antigens include cells or parts thereof or a viral particle or a part thereof.

In an example, the therapeutic payload is an antineoplastic agent.

Other exemplary therapeutic payloads include agonists or antagonists to membrane receptors in the inner ear. Such therapeutic payloads may modulate neurotransmission. In another example, the therapeutic payload is a neurological agent useful for treating one or more neurological disorders, such as Alzheimer's disease, Parkinson's disease, Epilepsy or multiple sclerosis.

In an example, the payload is a "neurotrophic factor". The term neurotrophic factor is used in the context of the present disclosure to refer to molecules that enhance the growth or survival potential of any cells including those from the auditory system. For example, neurotrophic factors encompassed by the present disclosure can enhance growth or survival of cells from the auditory system or their synaptic connections located in the inner ear, middle ear or vestibular system. Exemplary cells include spiral ganglion neurons (SGNs), hair cells, including inner and outer ear hair cells, cochlear glial cells and Schwann cells. Exemplary synaptic connections include connections between hair cells, hair cells and SGNs or other neurons discussed above. Other examples include neuronal cell bodies in Rosenthal's canal or their synaptic connections, neurons or synaptic connections in the upper middle cochlear regions and/or nerve fibres in the osseous spiral lamina.

Exemplary neurotrophic factors can include agents discussed above with known therapeutic efficacy for directly or indirectly enhancing survival of cells from the auditory system and/or their synaptic connections.

In an example, the neurotrophic factor is a neurotrophic peptide. Exemplary neurotrophic peptides include, brain derived neuroptrophic factor (BDNF), nerve growth factor, neurotrophin-3, neurotrophin-4, members of the ciliary neurotrophic factor (CNTF) family such as CNTF, Leukemia inhibitory factor (LIF), Interleukin-6 (IL-6), Glia maturation factor (GMF), insulin growth factor-1 (IGF-1), Neuregulin 1, Neuregulin 2, Neuregulin 3 and Neuregulin 4, vascular endothelial growth factor (VEGF), members of the Glial Cell Derived Neurotrophic Factor (GDNF) family such as GDNF, neurturin (NRTN), artemin (ARTN), and persephin (PSPN), ephrins such as A1, A2, A3, A4, A5, B1, B2 and B3, insulin growth factor-1 (IGF-1) and interleukins such as IL-11.

In an example, the neurotrophic factor is selected from the group consisting of brain derived neurotrophic factor (BDNF), nerve growth factor, neurotrophin-3, neurotrophin-4, ciliary neurotrophic factor (CNTF), Glial Cell Derived Neurotrophic Factor (GDNF) and IL-11.

One cause of spiral ganglion neuron degeneration is the loss of the endogenous supply of neurotrophins. Thus, in an example, the neurotrophic factor is a neurotrophin. The term "neurotrophin" is used in the context of the present disclosure to refer to proteins that induce the survival, development and/or function of neurons and/or their synaptic connections. Exemplary neurotrophins are discussed above and include BDNF, nerve growth factor, neurotrophin-3 and neurotrophin-4. Accordingly, in an example, the supraparticle comprises BDNF. In another example, the supraparticle comprises nerve growth factor. In another example, the supraparticle comprises neurotrophin-3. In another example, the supraparticle comprises neurotrophin-4. In an example, supraparticles can comprise at least two different neurotrophins. In other examples, supraparticles can comprise at least three or four different neurotrophins.

Therapeutic efficacy may be improved by administering supraparticles comprising multiple different therapeutic payloads. Thus, in an example, supraparticles can comprise at least two, at least three, at least four, at least five, at least six, at least seven, at least eight, at least nine, at least 10 different therapeutic payloads.

For example, supraparticles can comprise at least two different neurotrophic factors. In other examples, supraparticles can comprise at least three, at least four, at least five different neurotrophic factors. In these examples, various combinations of neurotrophic factors such as neurotrophins are contemplated. Exemplary combinations of neurotrophic factors include BDNF and nerve growth factor, BDNF and neurotrophin-3, BDNF and neurotrophin-4, BDNF and CNTF, BDNF and GDNF, BDNF and IL-11, neurotrophin-3 and neurotrophin-4, neurotrophin-3 and CNTF, neurotrophin-3 and CNTF, neurotrophin-3 and GDNF, neurotrophin-3 and IL-11, neurotrophin-4 and CNTF, neurotrophin-4 and GDNF, neurotrophin-4 and IL-11, CNTF and GDNF, CNTF and IL-11, GDNF and IL-11, BDNF, neurotrophin-3 and neurotrophin-4, BDNF, neurotrophin-3 and CNTF, BDNF, neurotrophin-3 and GDNF, BDNF, CNTF and GDNF, BDNF, CNTF and IL-11, neurotrophin-3, neurotrophin-4 and CNTF, neurotrophin-3, neurotrophin-4 and GDNF, neurotrophin-3, CDNF and GDNF, neurotrophin-3, neurotrophin-4 and IL-11, neurotrophin-4, CNTF and GDNF, neurotrophin-4, CNTF and IL-11, BDNF, neurotrophin-3, neurotrophin-4 and CNTF, BDNF, neurotrophin-3, neurotrophin-4 and GDNF, BDNF, neurotrophin-3, CNTF and GDNF, BDNF, neurotrophin-4, CNTF and GDNF, BDNF, BDNF, neurotrophin-3, neurotrophin-4 and IL-11, neurotrophin-3, neurotrophin-4, CNTF and GDNF, neurotrophin-3, neurotrophin-4, CNTF and IL-11.

Various otic interventions such as surgical procedures and implantation of hearing devices can result in side effects such as tissue damage, inflammation and/or infection in the middle and inner ear. Biological response(s) mounted against such side effects can indirectly affect the growth or survival potential of cells from the auditory system and/or their synaptic connections. Thus, in an example, neurotrophic factors assist in tissue repair, reducing inflammation and/or reducing infection. Accordingly, additional exemplary neurotrophic factors include steroids or antioxidants. Other exemplary neurotrophic factors include antibodies or other binding proteins such as anti-Tropomyosin receptor kinase (TrK) B, anti-TrK C or binding proteins that interact with p75 neurotrophin receptor. For example, p75 neurotrophin receptor antagonists. In another example, neurotrophic factors include nucleic acids. For example, the neurotrophic factor can comprise a gene therapy, silencing RNA such as a siRNA or miRNA, expression constructs such as DNA plasmids comprising a nucleic acid of interest. In an example, the neurotrophic factor is an expression construct comprising a nucleic acid encoding an opsin(s).

Additional exemplary combinations of neurotrophic factors include a steroid, an antioxidant, an antibody or a nucleic acid and at least one, at least two, at least three, at least four, at least five different neurotrophic factor(s). For example, a supraparticle can comprise a steroid such as dexamethasone or prednisolone and any one or more of BDNF, nerve growth factor, neurotrophin-3, neurotrophin-4 and GDNF. In another example, a supraparticle can comprise an expression vector comprising an opsin and any one or more of BDNF, nerve growth factor, neurotrophin-3, neurotrophin-4 and GDNF. In another example, a supraparticle can comprise an antibody such as anti-Tropomyosin receptor kinase (TrK) B or anti-TrK C and any one or more of BDNF, nerve growth factor, neurotrophin-3, neurotrophin-4, GDNF and IL-11.

In an example, supraparticles can comprise at least two, at least three, at least four, at least five different therapeutic payloads wherein at least one therapeutic payload is a neurotrophic factor. For example, supraparticles can comprise at least three different therapeutic payloads wherein two therapeutic payloads are neurotrophic factors. In another example, supraparticles can comprise at least four different therapeutic payloads wherein three therapeutic payloads are neurotrophic factors. In these examples, the therapeutic payload need not enhance the growth or survival potential of cells from the auditory system but rather can provide another therapeutic benefit. For example, the therapeutic payload may suppress a subject's immune system following administration of supraparticles. In another example, supraparticles may comprise a payload that reduces survival of cells from the auditory system or their synaptic connections and a neurotropic factor(s). In this example, the neurotrophic factor may alleviate the reduction in survival of cells from the auditory system or their synaptic connections caused by the therapeutic payload. In an example, supraparticles comprise antineoplastic agents including cisplatinum or related compounds, antibiotics including aminoglycosides such as tobrahmycin or related compounds, loop diuretics such as furosemide, antimetabolites such as methotrexate, salicylates such as aspirin or a radioactive moiety and a neurotrophic factor(s). For, a supraparticle can comprise an antibiotic and any one or more of BDNF, nerve growth factor, neurotrophin-3, neurotrophin-4, GDNF and IL-11.

Depending on the site of administration the payload may need to diffuse from the middle ear to the inner ear or vestibular system. This may occur via diffusion of the payload across the round or oval widows. Thus, in an example, supraparticles may comprise a molecule(s) that assist diffusion of the payload across the round and oval windows to the inner ear and/or vestibular system.

In an example, the payload has an isoelectric point greater than 7. In another example, the payload has an isoelectric point greater than 8. In another example, the payload has an isoelectric point greater than 9. In another example, the payload has an isoelectric point greater than 10. In another example, the payload has an isoelectric point between 7 and 10. In another example, the payload has an isoelectric point between 7 and 9. In another example, the payload has an isoelectric point between 8 and 10. In another example, the payload has an isoelectric point between 9 and 10.

Supraparticles comprising a payload may be referred to as loaded supraparticles in the context of the present disclosure. Methods of producing loaded supraparticles are not particularly limited so long as the resulting supraparticle can be loaded with at least 1.5 µg of payload. Preferably, the resulting supraparticle can deliver the payload to an ear of a subject. Exemplary methods of loading are reviewed in Wang et al. (2009) J. Mater. Chem. 19, 6451 and include payload encapsulation and entrapment. In one non-limiting example, supraparticles may be loaded by contacting the supraparticle with an aqueous solution of the payload followed by a period of incubation. The payload solution can contain an excess of the amount of payload to be loaded onto the supraparticle and incubation can occur at room temperature. Agitation of the solution containing the supraparticle and the payload may be used to enhance loading of the payload.

One of skill in the art will appreciate that the required level of payload will likely be influenced by the payload itself and the indication being treated according to the present disclosure.

Supraparticles

The term "supraparticle" ("SP") is used in the context of the present disclosure to refer to agglomerated particles comprising a network of pores. The network of pores provides supraparticles with a large pore volume and surface area for carrying a payload. A large pore volume and surface area is advantageous as it can enhance the amount of payload that can be carried by supraparticles. In an example, supraparticles according to the present disclosure are agglomerated nanoparticles.

In an example, supraparticles according to the present disclosure comprise at least 1.5 µg of payload. In another example, supraparticles comprise at least 2.0 µg of payload.

In another example, supraparticles according to the present disclosure comprise at least 2.5 µg of payload. In another example, supraparticles comprise at least 2.6 µg of payload. In another example, supraparticles comprise at least 2.7 µg of payload. In another example, supraparticles comprise at least 2.7 µg of payload. In another example, supraparticles comprise at least 2.8 µg of payload. In another example, supraparticles comprise at least 2.9 µg of payload. In another example, supraparticles comprise at least 3.0 µg of payload. In another example, supraparticles comprise at least 3.1 µg of payload. In another example, supraparticles comprise at least 3.2 µg of payload. In another example, supraparticles comprise at least 3.3 µg of payload. In another example, supraparticles comprise at least 3.4 µg of payload. In another example, supraparticles comprise at least 3.5 µg of payload. In another example, supraparticles comprise at least 3.6 µg of payload. In another example, supraparticles comprise at least 3.7 µg of payload. In another example, supraparticles comprise at least 3.8 µg of payload. In another example, supraparticles comprise at least 3.9 µg of payload. In another example, supraparticles comprise at least 4.0 µg of payload. In another example, supraparticles comprise at least 4.5 µg of payload. In another example, supraparticles comprise at least 5.0 µg of payload. In another example, supraparticles comprise at least 5.5 µg of payload. In another example, supraparticles comprise at least 6.0 µg of payload. In another example, supraparticles comprise at least 6.5 µg of payload. In another example, supraparticles comprise at least 7.0 µg of payload. In another example, supraparticles comprise at least 7.5 µg of payload. In another example, supraparticles comprise at least 8.0 µg of payload. In another example, supraparticles comprise at least 8.5 µg of payload. In another example, supraparticles comprise at least 9.0 µg of payload. In another example, supraparticles comprise at least 9.5 µg of payload. In another example, supraparticles comprise at least 10 µg of payload. In another example, supraparticles comprise at least 10.5 µg of payload. In another example, supraparticles comprise at least 11 µg of payload. In another example, supraparticles comprise at least 11.5 µg of payload.

In another example, suprapariticles comprise at least 12 µg of payload. In another example, suprapariticles comprise at least 15 µg of payload. In another example, suprapariticles comprise at least 20 µg of payload.

For example, suprapariticles can comprise at least 6 µg of payload.

In another example, suprapariticles can comprise between about 2.5 and 10 µg of payload. In another example, suprapariticles can comprise between about 3 and 10 µg of payload. In another example, suprapariticles can comprise between about 4 and 10 µg of payload. In another example, suprapariticles can comprise between about 5 and 10 µg of payload. In another example, suprapariticles can comprise between about 6 and 10 µg of payload. In another example, suprapariticles can comprise between about 5 and 15 µg of payload. In another example, suprapariticles can comprise between about 5 and 20 µg of payload. In another example, suprapariticles can comprise between about 8 and 20 µg of payload. In another example, suprapariticles can comprise between about 8 and 15 µg of payload.

For example, suprapariticles can comprise between about 6 and 8 µg of payload.

In an example, suprapariticles according to the present disclosure comprise at least 1.5 µg of neurotrophic factor. In another example, suprapariticles comprise at least 2.0 µg of neurotrophic factor.

In another example, suprapariticles comprise at least 2.5 µg of neurotrophic factor. In another example, suprapariticles comprise at least 3.0 µg of neurotrophic factor. In another example, suprapariticles comprise at least 3.5 µg of neurotrophic factor. In another example, suprapariticles comprise at least 4.0 µg of neurotrophic factor. In another example, suprapariticles comprise at least 5.0 µg of neurotrophic factor. In another example, suprapariticles comprise at least 6.0 µg of neurotrophic factor. In another example, suprapariticles comprise at least 7.0 µg of neurotrophic factor. In another example, suprapariticles comprise at least 8.0 µg of neurotrophic factor. In another example, suprapariticles comprise at least 9.0 µg of neurotrophic factor. In another example, suprapariticles comprise at least 10 µg of neurotrophic factor. In another example, suprapariticles comprise at least 10.5 µg of neurotrophic factor. In another example, suprapariticles comprise at least 11 µg of neurotrophic factor. In another example, suprapariticles comprise at least 11.5 µg of neurotrophic factor. In another example, suprapariticles comprise at least 12 µg of neurotrophic factor. In another example, suprapariticles comprise at least 15 µg of neurotrophic factor. In another example, suprapariticles comprise at least 20 µg of neurotrophic factor.

For example, suprapariticles can comprise at least 6 µg of neurotrophic factor. In another example, suprapariticles can comprise between about 2.5 and 10 µg of neurotrophic factor. In another example, suprapariticles can comprise between about 5 and 10 µg of neurotrophic factor. In another example, suprapariticles can comprise between about 6 and 10 µg of neurotrophic factor. For example, suprapariticles can comprise between about 6 and 8 µg of neurotrophic factor. In another example, suprapariticles can comprise between about 5 and 15 µg of neurotrophic factor. In another example, suprapariticles can comprise between about 5 and 20 µg of neurotrophic factor. In another example, suprapariticles can comprise between about 8 and 20 µg of neurotrophic factor. In another example, suprapariticles can comprise between about 8 and 15 µg of neurotrophic factor.

In an example, suprapariticles according to the present disclosure comprise at least 1.5 µg of neurotrophin. In another example, suprapariticles comprise at least 2.0 µg of neurotrophin.

In another example, suprapariticles comprise at least 2.5 µg of neurotrophin. In another example, suprapariticles comprise at least 3.0 µg of neurotrophin. In another example, suprapariticles comprise at least 3.5 µg of neurotrophin. In another example, suprapariticles comprise at least 4.0 µg of neurotrophin. In another example, suprapariticles comprise at least 5.0 µg of neurotrophin. In another example, suprapariticles comprise at least 6.0 µg of neurotrophin. In another example, suprapariticles comprise at least 7.0 µg of neurotrophin. In another example, suprapariticles comprise at least 8.0 µg of neurotrophin. In another example, suprapariticles comprise at least 9.0 µg of neurotrophin. In another example, suprapariticles comprise at least 10 µg of neurotrophin. In another example, suprapariticles comprise at least 10.5 µg of neurotrophin. In another example, suprapariticles comprise at least 11 µg of neurotrophin. In another example, suprapariticles comprise at least 11.5 µg of neurotrophin. In another example, suprapariticles comprise at least 12 µg of neurotrophin. In another example, suprapariticles comprise at least 15 µg of neurotrophin. In another example, suprapariticles comprise at least 20 µg of neurotrophin.

For example, suprapariticles can comprise at least 6 µg of neurotrophin.

In another example, suprapariticles can comprise between about 2.5 and 10 µg of neurotrophin. In another example, suprapariticles can comprise between about 5 and 10 µg of neurotrophin. In another example, suprapariticles can comprise between about 6 and 10 µg of neurotrophin. For example, suprapariticles can comprise between about 6 and 8 µg of neurotrophin. In another example, suprapariticles can comprise between about 5 and 15 µg of neurotrophin. In another example, suprapariticles can comprise between about 5 and 20 µg of neurotrophin. In another example, suprapariticles can comprise between about 8 and 20 µg of neurotrophin. In another example, suprapariticles can comprise between about 8 and 15 µg of neurotrophin.

In an example, suprapariticles according to the present disclosure comprise at least 1.5 µg of payload, wherein the payload has an isoelectric point between 9 and 10. In another example, suprapariticles comprise at least 2.0 µg of payload, wherein the payload has an isoelectric point between 9 and 10.

In another example, suprapariticles comprise at least 2.5 µg of payload, wherein the payload has an isoelectric point between 9 and 10. In another example, suprapariticles comprise at least 3.0 µg of payload, wherein the payload has an isoelectric point between 9 and 10. In another example, suprapariticles comprise at least 3.5 µg of payload, wherein the payload has an isoelectric point between 9 and 10. In another example, suprapariticles comprise at least 4.0 µg of payload, wherein the payload has an isoelectric point between 9 and 10. In another example, suprapariticles comprise at least 5.0 µg of payload, wherein the payload has an isoelectric point between 9 and 10. In another example, suprapariticles comprise at least 6.0 µg of payload, wherein the payload has an isoelectric point between 9 and 10. In another example, suprapariticles comprise at least 7.0 µg of payload, wherein the payload has an isoelectric point between 9 and 10. In another example, suprapariticles comprise at least 8.0 µg of payload, wherein the payload has an isoelectric point between 9 and 10. In another example, suprapariticles comprise at least 9.0 µg of payload, wherein the payload has an isoelectric point between 9 and 10. In another example, supraparticles comprise at least 10 µg of payload, wherein the payload has an isoelectric point between 9 and 10. In another example, supraparticles comprise at least 10.5 µg of payload, wherein the payload has an isoelectric point between 9 and 10. In another example, supraparticles comprise at least 11 µg of payload, wherein the payload has an isoelectric point between 9 and 10. In another example, supraparticles comprise at least 11.5 µg of payload, wherein the payload has an isoelectric point between 9 and 10. In another example, supraparticles comprise at least 12 µg of payload, wherein the payload has an isoelectric point between 9 and 10. In another example, supraparticles comprise at least 15 µg of payload, wherein the payload has an isoelectric point between 9 and 10. In another example, supraparticles comprise at least 20 µg of payload, wherein the payload has an isoelectric point between 9 and 10.

For example, supraparticles can comprise at least 6 µg of payload, wherein the payload has an isoelectric point between 9 and 10.

In another example, supraparticles can comprise between about 2.5 and 10 µg of payload, wherein the payload has an isoelectric point between 9 and 10. In another example, supraparticles can comprise between about 5 and 10 µg of payload, wherein the payload has an isoelectric point between 9 and 10. In another example, supraparticles can comprise between about 6 and 10 µg of payload, wherein the payload has an isoelectric point between 9 and 10. For example, supraparticles can comprise between about 6 and 8 µg of payload, wherein the payload has an isoelectric point between 9 and 10. In another example, supraparticles can comprise between about 5 and 20 µg of payload, wherein the payload has an isoelectric point between 9 and 10. In another example, supraparticles can comprise between about 5 and 15 µg of payload, wherein the payload has an isoelectric point between 9 and 10. In another example, supraparticles can comprise between about 8 and 20 µg of payload, wherein the payload has an isoelectric point between 9 and 10. In another example, supraparticles can comprise between about 8 and 15 µg of payload, wherein the payload has an isoelectric point between 9 and 10. For example, the payload can be a neurotrophin which has an isoelectric point between 9 and 10.

In an example, supraparticles having an above referenced payload can be provided in an alginate hydrogel. For example, the alginate hydrogel can be alg-$CaCO_3$ hydrogel.

Supraparticles of the present disclosure can be loaded with an above exemplified payload and can have a pore size selected from the examples discussed below. In an example, supraparticles are microporous. The term "microporous" is used in the context of the present disclosure to refer to particles having a pore size of less than about 2 nm. For example, microporous supraparticles can have a pore size of about 0.5 nm to about 2 nm. In other examples, microporous supraparticles have a pore size of about 1 nm to about 2 nm, about 1.5 nm to about 2 nm. In another example, supraparticles are mesoporous. The term "mesoporous" is used in the context of the present disclosure to refer to particles having pores with diameters between about 2 nm and about 50 nm. For example, mesoporous supraparticles can have a pore size of about 2 nm to about 50 nm. In other examples, mesoporous supraparticles have a pore size of about 2 nm to about 40 nm, about 2 nm to about 30 nm. In another example, supraparticles are macroporous. The term "macroporous" is used in the context of the present disclosure to refer to particles having a pore size of greater than about 50 nm. For example, macroporous supraparticles can have a pore size of about 50 nm to about 500 nm. In other examples, macroporous supraparticles have a pore size of about 50 nm to about 250 nm, about 50 nm to about 150 nm, about 50 nm to about 100 nm.

In an example, supraparticles are comprised of microporous nanoparticles. In an example, supraparticles are comprised of nanoparticles having a pore size of about 0.5 nm to about 2 nm. In other examples, supraparticles are comprised of nanoparticles having a pore size of about 1 nm to about 2 nm, about 1.5 nm to about 2 nm. In another example, supraparticles are comprised of mesoporous nanoparticles. In an example, supraparticles are comprised of nanoparticles having a pore size of about 2 nm to about 50 nm. In other examples, supraparticles are comprised of nanoparticles having a pore size of about 2 nm to about 40 nm, about 2 nm to about 30 nm. In another example, supraparticles are comprised of macroporous nanoparticles. In an example, supraparticles are comprised of nanoparticles having a pore size of about 50 nm to about 95 nm. In other examples, supraparticles are comprised of nanoparticles having a pore size of about 50 nm to about 85 nm, about 50 nm to about 75 nm, about 50 nm to about 65 nm.

In another example, supraparticles are comprised of nanoparticles having a bimodal pore structure. The term "bimodal" is used in the context of the present disclosure to refer to particles comprising multiple pore sizes, generally a smaller pore size and a larger pore size. For example, supraparticles can comprise nanoparticles having mesopores and macropores. In an example, such supraparticles are comprised of nanoparticles having pores ranging from 2 nm to 95 nm. In another example, supraparticles are comprised of bimodal nanoparticles having pores ranging from 10 nm to 95 nm. In another example, supraparticles are comprised of bimodal nanoparticles having pores ranging from 15 nm to 95 nm.

In other examples, supraparticles can comprise pore sizes ranging from 1 nm to 200 nm. In other examples, supraparticles are comprised of bimodal nanoparticles having smaller pore sizes of about 1 nm to about 5 nm and larger pore sizes of about 10 nm to about 50 nm. In another example, supraparticles are comprised of bimodal nanoparticles having smaller pore sizes of about 2 nm to about 4 nm and larger pore sizes of about 15 nm to about 40 nm. In another example, supraparticles are comprised of bimodal nanoparticles having smaller pore sizes of about 2 nm to about 3 nm and larger pore sizes of about 4 nm to about 40 nm. In other examples, supraparticles are comprised of bimodal nanoparticles having smaller pore sizes of about 10 nm to about 50 nm and larger pore sizes of about 70 nm to about 95 nm. In another example, supraparticles are comprised of bimodal nanoparticles having smaller pore sizes of about 15 nm to about 40 nm and larger pore sizes of about 80 nm to about 95 nm.

In an example, supraparticles are comprised of microparticles. In another example, supraparticles are comprised of microporous microparticles. In an example, supraparticles are comprised of microparticles having a pore size of about 0.5 nm to about 2 nm. In other examples, supraparticles are comprised of microparticles having a pore size of about 1 nm to about 2 nm, about 1.5 nm to about 2 nm. In another example, supraparticles are comprised of mesoporous microparticles. In an example, supraparticles are comprised of microparticles having a pore size of about 2 nm to about 50 nm. In other examples, supraparticles are comprised of microparticles having a pore size of about 2 nm to about 40 nm, about 2 nm to about 30 nm. In another example, supraparticles are comprised of macroporous microparticles. In an example, supraparticles are comprised of microparticles having a pore size of about 50 nm to about 500 nm. In other examples, supraparticles are comprised of microparticles having a pore size of about 50 nm to about 250 nm, about 50 nm to about 150 nm, about 50 nm to about 100 nm.

In another example, supraparticles are comprised of microparticles having a bimodal pore structure. For example, supraparticles can comprise microparticles having mesopores and macropores. In an example, such supraparticles are comprised of microparticles having pores ranging from 2 nm to 500 nm. In another example, supraparticles are comprised of bimodal microparticles having pores ranging from 10 nm to 250 nm. In another example, supraparticles are comprised of bimodal microparticles having pores ranging from 15 nm to 150 nm.

In other examples, supraparticles are comprised of bimodal microparticles having smaller pore sizes of about 1 nm to about 5 nm and larger pore sizes of about 10 nm to about 50 nm. In another example, supraparticles are comprised of bimodal microparticles having smaller pore sizes of about 2 nm to about 4 nm and larger pore sizes of about 15 nm to about 70 nm. In another example, supraparticles are comprised of bimodal microparticles having smaller pore sizes of about 2 nm to about 3 nm and larger pore sizes of about 15 nm to about 65 nm. In other examples, supraparticles are comprised of bimodal microparticles having smaller pore sizes of about 10 nm to about 30 nm and larger pore sizes of about 15 nm to about 200 nm. In another example, supraparticles are comprised of bimodal microparticles having smaller pore sizes of about 15 nm to about 40 nm and larger pore sizes of about 15 nm to about 150 nm. In another example, supraparticles are comprised of bimodal microparticles having smaller pore sizes of about 20 nm to about 30 nm and larger pore sizes of about 100 nm to about 120 nm.

In another example, supraparticles are loaded with at least 3 μg of an above referenced payload and are comprised of bimodal nanoparticles having smaller pore sizes of about 2 nm to about 4 nm and larger pore sizes of about 15 nm to about 40 nm. In another example, supraparticles are loaded with at least 5 μg of an above referenced payload and are comprised of bimodal nanoparticles having smaller pore sizes of about 2 nm to about 4 nm and larger pore sizes of about 15 nm to about 40 nm.

In another example, supraparticles are loaded with at least 8 μg of an above referenced payload and are comprised of bimodal nanoparticles having smaller pore sizes of about 2 nm to about 4 nm and larger pore sizes of about 15 nm to about 40 nm. In another example, supraparticles are loaded with at least 10 μg of an above referenced payload and are comprised of bimodal nanoparticles having smaller pore sizes of about 2 nm to about 4 nm and larger pore sizes of about 15 nm to about 40 nm. In these examples, the supraparticles can be provided in an alginate hydrogel. For example, the alginate hydrogel can be alg-$CaCO_3$ hydrogel.

In another example, supraparticles are comprised of microparticles and nanoparticles. In this example, microparticles and nanoparticles can have an above referenced pore size(s). For example, supraparticles can be comprised of microparticles and nanoparticles having a bimodal pore structure.

In an example, supraparticles can have a substantially uniform pore size. In another example, supraparticles comprise variable pore sizes. In this example, pore size may be variable but fall within a particular size range. For example, supraparticles can be predominantly mesoporous. In another example, supraparticles can be predominantly macroporous. In another example, supraparticles are comprised of nanoparticles having a substantially uniform pore size. In another example, supraparticles are comprised of bimodal nanoparticles having substantially uniform small and large pore sizes. In another example, supraparticles are comprised of microparticles having a substantially uniform pore size. In another example, supraparticles are comprised of bimodal microparticles having substantially uniform small and large pore sizes.

In an example, above referenced supraparticles can have an ordered pore structure. These supraparticles have pores with a regular, three-dimensional spacing. In another example, above referenced supraparticles can have a disordered pore structure. These supraparticles have pores with an irregular, three-dimensional spacing. In another example, supraparticles have a combination of both ordered and disordered pore structures.

It will be appreciated by the person skilled in the art that supraparticle pore size can be measured by, for example, transmission electron microscopy (TEM), scanning electron microscopy (SEM) and X-Ray computed tomography. One of skill in the art can identify supraparticles having the above exemplified pore sizes by measuring the width across the widest point of their three dimensional structure. In an example, the widest point or a pore may be at the surface of the supraparticle.

Supraparticles of the present disclosure may be characterised by the distance between their particles. In an example, the average distance between particles can range from about 80 nm to about 400 nm. In another example, the average distance between colloidal particles ranges from about 90 nm to about 300 nm, about 100 nm to In an example, supraparticle pores are connected. For example, supraparticles can comprise a series of interconnected pores. In another example, supraparticle pores are not connected. In another example, supraparticles have a combination of both connected and unconnected pores.

Supraparticles of the present disclosure may be characterised by the volume of their pores. In an example, supraparticle pore volume ranges from about 0.5 $mLg^{-1}$ to about 10 $mLg^{-1}$. In another example, supraparticles have a pore volume of about 0.8 $mLg^{-1}$ to about 5 $mLg^{-1}$, about 1 $mLg^{-1}$ to about 2.5 $mLg^{-1}$, about 1.5 $mLg^{-1}$ to about 2 $mLg^{-1}$.

Supraparticles of the present disclosure may have a hollow core or a toroidal core. In an example, the internal volume of the supraparticle core is at least about 45%, at least about 55%, at least about 65%, at least about 70%, at least about 75%, at least about 80%, at least about 85%, at least about 90%, at least about 95% of the total volume of the supraparticle. Exemplary methods of producing hollow core supraparticles include acid core processes such as those described in U.S. Pat. No. 4,468,498 and ester core process such as those described in U.S. Pat. Nos. 5,157,084 and 5,521,253.

Supraparticles of the present disclosure may be characterised by the surface area of their structure. In an example, the surface area of supraparticles range from about 500 $m^2 g^{-1}$ to about 1500 $m^2 g^{-1}$. In another example, supraparticles have a surface area of between about 5500 $m^2 g^{-1}$ and about 1250 $m^2 g^{-1}$, about 600 $m^2 g^{-1}$ and 1000 $m^2 g^{-1}$, about 600 $m^2 g^{-1}$ and 700 $m^2 g^{-1}$. In an example, the surface area of supraparticles is about 600 $m^2 g^{-1}$. In an example, the surface area of supraparticles is about 620 $m^2 g^{-1}$.

Supraparticles according to the present disclosure may be characterised by a particular in-vitro release profile. In an example, supraparticles release payload for at least 50 days. In an example, supraparticles release payload for at least 100 days. In an example, supraparticles release payload for at least 150 days. In an example, coated supraparticles have a substantially linear release profile. One of skill in the art can measure the in-vitro release profile of supraparticles using various methods. Examples of such methods are discussed below in Example 7. For example, supraparticles disclosed herein can be loaded with a labelled payload such as FITC-lysozyme before being incubated in solution such as PBS. Intermittent measurements of fluorescence can be used to determine the level of payload (e.g. µg) released over time. Those of skill in the art will be able to easily identify burst release and/or determine whether a release profile is substantially linear by charting payload release over time and fitting a standard curve. In an example, a substantially linear release profile has a linear standard curve with an $R^2>0.9$. In another example, a substantially linear release profile has a linear standard curve with an $R^2>0.92$. In another example, a substantially linear release profile has a linear standard curve with an $R^2>0.95$. In another example, a substantially linear release profile has a linear standard curve with an $R^2>0.97$. In another example, a substantially linear release profile has a linear standard curve with an $R^2>0.98$. In another example, a substantially linear release profile has a linear standard curve with an $R^2>0.99$. In another example, a substantially linear release profile has a linear standard curve with an $R^2$ between 0.9 and 0.99. In another example, a substantially linear release profile has a linear standard curve with an $R^2$ between 0.92 and 0.99. In another example, a substantially linear release profile has a linear standard curve with an $R^2$ between 0.95 and 0.99.

In an example, burst release is identified by a marked increase in payload release followed by a more sustained release profile. Examples, of burst release are shown in the figures below. In an example, burst release is characterised by around 30-75% payload release over the first 7 days. In another example, burst release is characterised by around 30-70% payload release over the first 7 days. In another example, burst release is characterised by around 35-65% payload release over the first 7 days. In another example, burst release is characterised by around 40-60% payload release over the first 7 days. Of course, burst release percentages will be dictated by the type of payload. For example, burst release of lysozyme can be characterised by around 55-75% payload release over the first 7 days. In another example, burst release of BDNF can be characterised by around 35-70% payload release over the first 7 days.

In an example, sustained release profiles encompassed by the present disclosure are characterised by around 3-25% payload release over the first 7 days. In another example, sustained release profiles encompassed by the present disclosure are characterised by around 5-25% payload release over the first 7 days.

In another example, sustained release profiles encompassed by the present disclosure are characterised by around 5-15% payload release over the first 7 days. In another example, sustained release profiles encompassed by the present disclosure are characterised by around 5-10% payload release over the first 7 days. In these examples, the payload can be a neurotrophin.

Again, sustained release percentages will be dictated by the type of payload. For example, sustained release of lysozyme can be characterised by around 15-40% payload release over the first 7 days. In another example, sustained release of BDNF or NT3 can be characterised by around 5-10% payload release over the first 7 days.

In an example, above referenced sustained release profiles can also be associated with a payload release standard curve which is substantially linear.

In an example, delayed release of payload is observed for supraparticles encompassed by the present disclosure. For example, release of payload may be substantially or completely inhibited until the supraparticle coating biodegrades sufficiently. For example, release of payload from coated supraparticles may be substantially or completely inhibited for the first few days after administration. In an example, release of payload from coated supraparticles may be substantially or completely inhibited for at least two days. In another example, release of payload from coated supraparticles may be substantially or completely inhibited for at least three days. In another example, release of payload from coated supraparticles may be substantially or completely inhibited for at least four days. In another example, release of payload from coated supraparticles may be substantially or completely inhibited for at least five days. In another example, release of payload from coated supraparticles may be substantially or completely inhibited for three to 5 days.

In an example, supraparticles of the present disclosure are produced from nanoparticles having a diameter of between about 1 nm and 100 nm. In another example, supraparticles are produced from microparticles having a diameter of between about 0.1 µm and 100 µm. In another example, supraparticles are produced from nanoparticles and microparticles.

Exemplary particles forming the supraparticles of the present disclosure include organic particles, inorganic particles, metal particles or a combination thereof. Exemplary organic particles include polymeric particles such as polyglycolic acid (PGA), polylactic acid (PLA), poly(methacryclic acid), poly(ethacrylic acid), polyacrylic acid (PAA), poly(N-isopropylacrylamide), poly(N,N-dimethylacrylamide), polyamides, poly-2-hydroxy butyrate (PHB), gelatines, polycaprolactone (PCL), and poly (lactic-co-glycolic acid) (PLGA). Exemplary inorganic particles include mineral fillers such as heavy fillers or high density fillers, pigments, clays and other synthetic particles. Other exemplary inorganic particles include dense minerals such as barite, hematite, magnesium oxide, inorganic oxides including titanium dioxide, calcium oxide, zinc oxide, magnesium oxide, cerium oxide, zirconium dioxide, and silicon dioxide. In an example, the material is silicon dioxide (i.e. silica). Thus, in an example, the supraparticles can be referred to as silica supraparticles. Exemplary metal particles include gold, silver, and copper. In one example, supraparticles may comprise the same particles. For example, supraparticles can substantially consist of silica particles. In another example, supraparticles may comprise different particles; for example silica and clay particles. In other examples, supraparticles can comprise at least three, at least four, at least 5, at least 6, at least 7, at least 8, at least 9, at least 10 different particles.

In an example, supraparticles comprise polyelectrolytes or polyelectrolyte material. Examples of such supraparticles are disclosed in WO 2006/037160. In this example, the polyelectrolyte may be a positively charged polyelectrolyte (or have the ability to be positively charged) or a negatively charged polyelectrolyte (or have the ability to be negatively charged) or have a zero net charge.

Supraparticles of the present disclosure can have various shapes. For example, supraparticles can have a spherical shape. Exemplary spherical shapes include spheres and ovoids. In another example, supraparticles have a non-spherical shape. Exemplary non-spherical shapes include dumbbell, hemisphere, disc, tetrahedron, fibre, spherocylinder and irregular shapes. In an example, supraparticles can have an ordered structure. For example, supraparticles may comprise an ordered array.

Spherical supraparticles of the present disclosure may be characterised by their diameter. For example, supraparticles of the present disclosure have a diameter greater than 100 µm. For example, supraparticles of the present disclosure can have a diameter of at least about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, about 1000 µm. For example, supraparticles can have a diameter of about 550 µm. This diameter of supraparticle is advantageous as it allows for high drug loading while facilitating inner ear delivery via cannula. In other examples, supraparticles can have a diameter of between about 150 µm and about 1000 µm, about 200 µm and about 900 µm, about 300 µm and about 800 µm. In another example, supraparticles can have a diameter of between about 400 µm and about 600 µm. In another example, supraparticles can have a diameter of between about 450 µm and about 550 µm. In another example, supraparticles can have a diameter of between about 520 µm and about 580 µm. In another example, supraparticles can have a diameter of between about 460 µm and about 540 µm. In another example, supraparticles can have a diameter of between about 470 µm and about 530 µm. In another example, supraparticles can have a diameter of between about 480 µm and about 520 µm. In another example, supraparticles can have a diameter of between about 490 µm and about 510 µm. In other examples, supraparticles can be characterised by the width across the widest point of their three dimensional structure. For example, supraparticles can have a width consistent with the above exemplified diameters.

In another example, the supraparticle surface is modified by the addition of functional moieties to enhance the loading of a payload. Any number of functional moieties may be added to the surface of a supraparticle, with the choice of functional moiety being chosen to compliment the payload being loaded. In an example, a moiety such as 3-aminopropyltriethoxysilane (APTS), is grafted onto the surface of silica supraparticle. This introduces an amine functionality that can interact with any carboxyl groups present on a payload. In another example, the supraparticle is modified to bear an overall net charge that enhances loading of the payload (Tan et al. Adv. Mater. (2012) 24, 3362-3366). For example, the surface of the supraparticle can be modified to bear an overall net positive charge, such that loading of a payload bearing an overall net negative charge is enhanced. In another example, the surface of the supraparticle is modified to bear an overall net negative charge, such that loading of a payload bearing an overall net positive charge is enhanced.

The supraparticles of the present disclosure may also comprise cross linked functional moieties. For example, functional moieties may be crosslinked through a chemical reaction. In an example, polyglycolic acid (PGA) molecules are crosslinked by a chemical reaction of the PGA molecules with cystamine (Tan et al. Adv. Mater. (2012) 24, 3362-3366).

Biodegradable Coatings

In certain embodiments, biodegradable coatings may be used to reduce or eliminate the initial burst release of payload from supraparticles disclosed herein. Accordingly, in an example, the present disclosure encompasses supraparticles comprising a payload described herein that are coated with a biodegradable coating.

The term "biodegradable" is used in the context of the present disclosure to describe a coating that breaks down over time, in particular following administration to a subject. In this instance, breakdown of the coating coincides with release of payload from the supraparticle to the subject. For example, a biodegradable coating encompassed by the present disclosure can degrade following administration to the inner ear of a subject. In another example, a biodegradable coating encompassed by the present disclosure can degrade following administration to the cochlea of a subject.

The term "coating" is used in the context of the present disclosure to refer to at least one layer of a composition that is applied to the surface or encapsulates a supraparticle disclosed herein and its payload. In an example, at least part of the supraparticles are coated. In another example, supraparticles are substantially coated.

In an example, a coating is applied or formed to the surface of a supraparticle disclosed herein. The term "direct coating" may be used to describe such supraparticles as the coating is directly applied or formed to their surface. As an example, directly coated supraparticles can be coated in a precursor substance before being treated with a catalyst to direct formation of a coating to the surface of the supraparticle.

Other examples of coated supraparticles encompassed by the present disclosure include supraparticles provided in a formulation such as a gel formulation or a foam formulation. In these examples the formulation is biodegradable and, for example, can comprise a biodegradable gel or foam. For example, supraparticles provided as a solid emersion in formulation would be considered coated in the context of the present disclosure. In this example, the supraparticles can be dispersed throughout a biodegradable formulation.

Coatings encompassed by the present disclosure are not particularly limited so long as they are compatible with the supraparticles payload (e.g. do not degrade the payload), are biologically acceptable to a subject and slow the release of payload from supraparticles disclosed herein. Thus, various biodegradable organic and inorganic polymers may be employed as coatings in the context of the present disclosure, such as described in U.S. Pat. No. 4,434,153 which discloses various cellulosic materials, polyvinyl polymers and the like which will dissolve or biologically degrade and release their contents at times which may vary from minutes after initial administration to hours thereafter depending on the coating or encapsulation material and its thickness. Other exemplary coating materials include both natural and synthetic materials such as (a) structural proteins and hydrocolloids of animal origin; (b) polysaccharides and other hydrocolloids of plant origin; and (c) synthetic polymers. Some of these matrix materials are suitable as in their native form but others, particularly hydrocolloids, require insolubilization either by chemical modification, or physical modification, such as orientation, radiation cross-linking, etc. Exemplary of the first category are: native and modified collagens, muscle proteins, elastin, keratin, resilin and fibrin. Exemplary of polysaccharides and plant hydrocolloids are: algin, pectin, carrageenin, chitin (or chitosan), heparin, chondroitin sulfate, Agar, Guar, locust bean gum, gum arabic, gum Karaya, tragacanth, gum Ghatti, starch, oxystarch, starch phosphate, carboxymethyl starch, sulfaethyl starch, aminoethyl starch, amido ethyl starch, starch esters such as starch maleate, succinate, benzoate and acetate, and mixtures of starch and gelatin; cellulose and its derivatives such as modified cellulosics, such as partially hydroxyethylated cotton obtained by the treatment of cotton with ethylene oxide or partially carboxymethylated cotton obtained by the treatment of cotton with caustic and choroacetic acid. Examples of synthetic polymers include poly (vinyl alcohol), poly(ethylene oxide), poly(acrylamide), poly(vinyl pyrrolidone), poly(ethyleneimine), poly(vinyl imidazole), poly(phosphate), synthetic polypeptides, polyvinyl alkyl ether; polyalkyl aldehydes, water soluble hydrophilic polymers of uncross-linked hydroxyalkyl acrylates and methacrylates, polyalkylene carbonates, polyphenol coatings and the like.

In an example, the biodegradable coating comprises one or more of collagen, gelatin, agarose, chitosan-glycerophosphate hydrogel, Polyethylene glycol (PEG) hydrogel, Poly lactic acid (PLA) hydrogel, poly (vinyl alcohol) (PVA) hydrogel, alginate hydrogel, diblock copolypeptide hydrogel (DCH).

In an example, the biodegradable coating comprises fibrin or a derivative thereof. In another example, the biodegradable coating is fibrin or a derivative thereof. In an example, the fibrin is produced from fibrinogen. Fibrin is a natural material which has been reported for several biomedical applications. Fibrin gels have been used as sealants due to their ability to bind to many tissues and their natural role in wound healing. Those of skill in the art would appreciate that fibrin can be produced via the protease thrombin which causes fibrinogen to polymerise. In an example, the thrombin has an activity of at least 800 units/mg. In another example, the thrombin has an activity of at least 900 units/mg. In another example, the thrombin has an activity of at least 1,000 units/mg. In another example, the thrombin has an activity between 800 and 1200 units/mg.

In an example, the fibrin coating can be stabilised using factor XIII and $Ca^{2+}$.

Examples of fibrin derivatives include fibrin monomer, fibrin dimer, fibrin polymer or cross-linked fibrin polymer. In another example, the biodegradable coating comprises bi-domain peptide cross-linked to a fibrin matrix.

In another example, the biodegradable coating comprises chitin or a product produced from chitin such as chitosan. In an example, the coating is chitosan. In an example, the chitosan is produced from chitin. For example, those of skill in the art would appreciate that chitosan can be produced by deacetylation of chitin. In an example, chitosan is produced by treating chitin with an alkaline substance, like sodium hydroxide.

In an example, the coating is applied to the surface of a supraparticle disclosed herein. In an example, at least one coating (or layer) is applied to the surface of a supraparticle. In another example, at least two, at least three, at least 4 or at least 5 coatings (or layers) are applied to the surface of a supraparticle. Accordingly, in an example, supraparticles disclosed herein can comprise at least 2 coats. In another example, supraparticles disclosed herein can comprise at least 3 coats. In another example, supraparticles disclosed herein can comprise between 2 and 5 coats. In another example, supraparticles disclosed herein can comprise 2 or 3 coats. In other example, compositions encompassed by the present disclosure comprise supraparticles with varying numbers of coats. For example, some supraparticles in the composition may comprise one coat, while others comprise two coats. In an example, compositions comprise supraparticles with one coat and supraparticles with two coats. In other examples, a portion of the supraparticles in the composition are coated and the remaining supraparticles are not coated. In these examples, the supraparticles can be loaded with the same payload. For example, a supraparticle loaded with BDNF and coated with two coats can be provided with a supraparticle loaded with BDNF and coated with three coats. In another example, supraparticles coated with different numbers of coats are loaded with different payloads. For example, a supraparticle loaded with BDNF and coated with two coats can be provided with a supraparticle loaded with NT-3 and coated with three coats.

In an example, supraparticles disclosed herein have a coat thickness of around 5% of the supraparticle diameter. In another example, coat thickness is less than 5% of the supraparticle diameter. In another example, coat thickness is less than 4% of the supraparticle diameter. In another example, coat thickness is less than 3% of the supraparticle diameter. In another example, coat thickness is less than 2% of the supraparticle diameter. In another example, coat thickness is less than 1% of the supraparticle diameter. In another example, coat thickness is less than 0.5% of the supraparticle diameter. In another example, coat thickness is less than 0.2% of the supraparticle diameter. In another example, coat thickness is between 0.2% and 5% of the supraparticle diameter.

In other examples, supraparticles disclosed herein have a coat thickness of around 0.5% of the supraparticle diameter. In another example, coat thickness is around 0.15% of the supraparticle diameter. In another example, coat thickness is around 0.1% of the supraparticle diameter. In another example, coat thickness is between 0.5% and 0.1% of the supraparticle diameter. In another example, coat thickness is between 0.3% and 0.1% of the supraparticle diameter. In another example, coat thickness is between 0.2% and 0.1% of the supraparticle diameter. In these examples, the supraparticle diameter can be between 450 and 550 μM. In another example, the supraparticle diameter can be 500 μM. In an example, directly coated supraparticles may be defined by their coat thickness.

Various methods are suitable for "applying" a coating to the surface of a supraparticle and the most suitable method will generally be dictated by the coating being applied. In an example, a supraparticle can be incubated in a formulation comprising a coating material disclosed herein. In the context of fibrin coated supraparticles, supraparticles disclosed herein can be incubated with fibrinogen, followed by contact with a thrombin to facilitate conversion of fibrinogen into a fibrin coating of the supraparticle surface. In an example, this process can be repeated to apply multiple coats to the surface of a supraparticle. For example, supraparticles disclosed herein can be coated with at least two, three, four, five or more coats of fibrin with each coat being applied by incubating supraparticles with fibrinogen, followed by contact with a thrombin to facilitate conversion of fibrinogen into a fibrin coating of the supraparticle surface. In another example, supraparticles disclosed herein can be coated with at least two, three, four, five or more coats of chitosan with each coat being applied by incubating supraparticles with chitosan, followed by a setting period before repeating the process.

In other examples, supraparticles disclosed herein can be coated with at least two, three, four, five or more coats of a biodegradable coating. In an example, all coats are the same. In another example, different biodegradable coatings are used. For example, a supraparticle may be coated with one or more coats of fibrin and then one or more coats of chitosan or vice versa.

As referenced above in relation to solid emersion, in an example, supraparticles are provided in a formulation which acts as a coating disclosed herein. For example, supraparticles can be provided in a formulation which comprises an above referenced coating. In an example, supraparticles can be provided in a formulation which comprises and above referenced material such as fibrin or chitosan.

In another example, supraparticles can be provided in a formulation which comprises a fibrin precursor such as fibrinogen and a polymerisation catalyst. The process by which fibrinogen is polymerized into fibrin has been previously characterized. In short, a protease cleaves the dimeric fibrinogen molecule at the two symmetric sites. There are several possible protease catalysts than can cleave fibrinogen, including thrombin, peptidase, and protease III, and each one cleaves the protein at a different site. Once the fibrinogen is cleaved, a self-polymerization step occurs in which the fibrinogen monomers come together and form a non-covalently crosslinked polymer gel. This self-assembly happens because binding sites become exposed after protease cleavage occurs. Once they are exposed, these binding sites in the centre of the molecule can bind to other sites on the fibrinogen chains, which are present at the ends of the peptide chains. In this manner, a polymer network is formed.

Accordingly, in another example, supraparticles can be provided in a formulation which comprises fibrinogen. In this example, the fibrinogen can be contacted with an appropriate protease such as thrombin (EC 3.4.21.5) to facilitate conversion of fibrinogen to fibrin prior to administration to a subject. For example, a thrombin may be added to the formulation prior to administration to a subject.

As noted above, coating supraparticles in above referenced materials can slow burst release of payload from supraparticles. The present inventors have also found that the presence of hydrogel decreases the rate of release even further. Accordingly, coated supraparticles encompassed by the present disclosure can be provided in a hydrogel. In an example, the hydrogel is an alginate hydrogel. For example, the alginate hydrogel can be alg-$CaCO_3$ hydrogel Other examples include fibrin glue (e.g. commercially available as Tisseel; Baxter) and Titanium-polyphenol gels, such as those described in Rahim et al. (2016) Angew. Chem. Int. Ed. 55, 13803).

In an example, providing supraparticles according to the present disclosure in a hydrogel also makes them easier to handle. For example, the hydrogel can facilitate easy implantation of supraparticles and/or assist with localising the supraparticles on the target (e.g. the tympanic membrane, oval or round windows or cochlea). In other examples, providing supraparticles in a hydrogel also enhances diffusion across a membrane within the subject's ear such as the tympanic membrane, oval or round windows.

In another example, coated supraparticles can be incorporated into slow release or targeted delivery systems. Such slow release systems can include foams, gels, drops and sprays for topical administration or a depot for injection or injection cannula. Exemplary slow release systems include polymer matrices, liposomes, and microspheres. Polymer matrices include reservoir based systems where supraparticles are enclosed in porous polymer coatings (Yang and Pierstorff (2012) JALA. 17, 50-58) and monolithic matrix systems where supraparticles are embedded in polymer matrices (Langer R (1990) Science. 249, 1527-1533). Liposomes may be biodegradable and amphiphilic drug delivery systems, which may be formulated using phospholipids and cholesterol. Microspheres may be formulated using biodegradable and biocompatible polymers. In another example, the slow release system can be polysaccharide based. For example, a supraparticle formulation can comprise an anionic polysaccharide. In an example, the polysaccharide can be alginic acid or a derivative thereof. For example, the supraparticle can comprise an alginate hydrogel. Various alginic acid derivatives are known in the art. Examples include sodium alginate, potassium alginate and calcium alginate. Other examples include barium alginate and strontium alginate. In an example, the alginic acid is sodium alginate. Accordingly, in an example, the present disclosure encompasses a formulation comprising an above referenced supraparticle and sodium alginate. Alginate can be obtained from various sources (e.g. Sigma, FMC Health and Nutrition). In another example, the polysaccharide is an unbranched polysaccharide such as a glycosaminoglycan. For example, the polysaccharide can be hyaluronic acid.

Formulations

Supraparticles may be formulated as a pharmaceutical composition suitable for administration to a subject. Exemplary pharmaceutical compositions may provide supraparticles alone or in combination with a pharmaceutically acceptable carrier, diluent or excipient. In these compositions supraparticles are provided in an amount sufficient to deliver a therapeutically effective amount of payload to a subject. Depending upon the particular route of administration, a variety of acceptable carriers, known in the art may be used, as for example described in Remington's Pharmaceutical Sciences (Mack Publishing Co. N.J. USA, 1991).

Exemplary pharmaceutical compositions may also comprise pharmaceutically acceptable sterile aqueous or non-aqueous solutions, dispersions, suspensions, or emulsions, as well as sterile powders for reconstitution into sterile injectable solutions or dispersions just prior to use. Examples of suitable aqueous and nonaqueous carriers, diluents, solvents or vehicles include water, ethanol, polyols (such as glycerol, propylene glycol, polyethylene glycol, and the like), and suitable mixtures thereof, vegetable oils, and injectable organic esters such as ethyl oleate. Proper fluidity can be maintained, for example, by the use of coating materials such as lecithin, by maintenance of the required particle size in the case of dispersions, and by the use of surfactants. Such compositions may also contain adjuvants such as preservatives, wetting agents, emulsifying agents, and dispersing agents or antibacterial and antifungal agents.

In another example, supraparticles can be incorporated into slow release or targeted delivery systems. For example, the present inventors have identified that providing supraparticles disclosed herein with an alginate hydrogel slows the release of payload from the supraparticles. Such slow release systems can include foams, gels, drops and sprays for topical administration or a depot for injection or injection cannula. In an example, directly coated supraparticles disclosed herein are provided in a slow release system.

Exemplary slow release systems include polymer matrices, liposomes, and microspheres. Polymer matrices include reservoir based systems where supraparticles are enclosed in porous polymer coatings (Yang and Pierstorff (2012) JALA. 17, 50-58) and monolithic matrix systems where supraparticles are embedded in polymer matrices (Langer R (1990) Science. 249, 1527-1533). Liposomes may be biodegradable and amphiphilic drug delivery systems, which may be formulated using phospholipids and cholesterol. Microspheres may be formulated using biodegradable and biocompatible polymers. In another example, the slow release system can be polysaccharide based. For example, a supraparticle formulation can comprise an anionic polysaccharide. In an example, the polysaccharide can be alginic acid or a derivative thereof. For example, a coated supraparticle disclosed herein can be dispersed in an alginate hydrogel. Various alginic acid derivatives are known in the art.

Examples include sodium alginate, potassium alginate and calcium alginate. Other examples include barium alginate and strontium alginate. In an example, the alginic acid is sodium alginate. Accordingly, in an example, the present disclosure encompasses a formulation comprising an above referenced supraparticle and sodium alginate. Alginate can be obtained from various sources (e.g. Sigma, FMC Health and Nutrition). In another example, the polysaccharide is an unbranched polysaccharide such as a glycosaminoglycan. For example, the polysaccharide can be hyaluronic acid.

In an example, formulations comprising slow release system(s) referenced above can comprise directly coated and uncoated supraparticles. In this example, supraparticles can comprise the same or different payloads. An advantage of this example, is that the release profile for individual supraparticles can be tailored as required.

In another example, supraparticles are provided in a formulation that enhances diffusion across a membrane within the subjects ear such as the tympanic membrane, oval or round windows. For example, supraparticle formulations may comprise artificial perilymph. In another example, supraparticle formulations maximise contact time with the round window membrane. For example, contact time may be increased relative to uncoated supraparticles.

In another example, supraparticles are incorporated or embedded within scaffolds that are subject-compatible and which degrade into products that are not harmful to a subject. These scaffolds house the supraparticles that are to be transplanted into a subject.

A variety of different scaffolds may be used successfully in the practice of the disclosure. Exemplary scaffolds include, but are not limited to biological, degradable scaffolds. Natural biodegradable scaffolds include collagen, fibronectin, and laminin scaffolds. Suitable scaffolds include polyglycolic acid scaffolds or synthetic polymers such as polyanhydrides, polyorthoesters, and polylactic acid.

Treatment and Administration

The present disclosure encompasses a method of treating a disease or disorder comprising administering a supraparticle defined herein. Accordingly, in an example, compositions comprising supraparticles according to the present disclosure are administered to a subject in an amount effective to treat a disease or disorder in the subject. In an example, the disease or disorder is hearing loss. The term "hearing loss" is used in the context of the present disclosure to refer to any reduction in a subject's ability to detect or process sound. Thus, reference to hearing loss encompasses a partial hearing deficit or total inability to hear.

In an example, the hearing loss is characterised as sensorineural hearing loss (SNHL). SNHL is used in the context of the present disclosure to refer to hearing loss resulting from damage to the delicate sensory hair cells within the cochlea, or loss of their synaptic connections with spiral ganglion neurons (SGNs) or dysfunction of the cochlear Schwann cells. In an example, the hearing loss is characterised as presbycusis. In another example, the hearing loss is noise induced. In another example, the hearing loss is disease induced or genetic. In another example, the hearing loss is induced by exposure to ototoxins, for example aminoglycosides.

In an example, the subject is a mammal. In one example, the subject is a human. For example, the human subject can be an adult. In an example, the human subject is a child. Other exemplary mammalian subjects include companion animals such as dogs or cats, or livestock animals such as horses or cows. Terms such as "subject", "patient" or "individual" are terms that can, in context, be used interchangeably in the present disclosure.

In an example, supraparticles according to the present disclosure are administered intraperitoneally. The present disclosure also encompasses methods of delivering a payload to a cell, tissue or organ in a subject via the ear, the method comprising administering to the ear of a subject a supraparticle according to the present disclosure. In this example, the method may deliver a payload to a cell from a subjects inner ear, middle ear and/or vestibular system. In another example, the method delivers a therapeutic payload to a neural cell, neural tissue or the brain of a subject.

In an example, compositions are administered onto the tympanic membrane. In this example, compositions may be formulated for topical administration (e.g. drops, gels, foams, sprays).

In another example, compositions are administered to the "middle ear" cavity. The term "middle ear" in the context of the present disclosure is used to refer to the space between the tympanic membrane and the inner ear. Thus, the middle ear is external to all inner ear tissue. For example, compositions can be administered to the middle ear via injection through the tympanic membrane. In this example, supraparticles may be administered as a depot injection. In another example, an opening in the tympanic membrane can be produced by a treating clinician to facilitate access of compositions to the middle ear. When administering compositions to the middle ear, compositions can be administered onto the round and/or oval window.

In another example, supraparticles are administered into the inner ear. For example, supraparticles can be administered to the cochlea. In an example, supraparticles can be administered to the basal turn of the cochlea. Surgical techniques to gain access to the cochlea or other structures of the inner ear are known in the art. Exemplary techniques for surgically accessing the human cochlea are described in, for example, Clark G M, et al., "Surgery for an improved multiple-channel cochlear implant", Ann Otol Rhinol Laryngol 93:204-7, 1984, and in Clark G M, et al., "Surgical and safety considerations of multichannel cochlear implants in children", Ear and Hearing Suppl. 12:15S-24S, 1991.

Combination of supraparticles with otic intervention is discussed above. In these examples, otic intervention may occur simultaneously with administration of supraparticles. For example, a cochlear device can be implanted simultaneously with supraparticles. However, increased survival of spiral ganglion neurons can improve the utility of a cochlear implant. Thus, it may be desirable to implant a cochlear device after supraparticles have been administered. For example, a cochlear device can be implanted about one month, about two months, about three months, about six months after the supraparticles have been administered. In these examples, additional supraparticles can be administered with the cochlear device.

In an example, a first dose of supraparticles are administered to the subjects cochlea and at least a second dose of supraparticles are administered onto the subjects round and/or oval window(s).

In an example, a therapeutically effective amount is administered to an ear of the subject. In an example, multiple supraparticles are administered to an ear of the subject. For example, at least two, at least three, at least four, at least 5, at least 10, at least 20 supraparticles can be administered to an ear of the subject. In another example, about one to 10 supraparticles are administered. In other examples about two to 9, about three to 8, about four to 7, about 5 to 6 supraparticles are administered to an ear of the subject. In these examples, supraparticles can comprise the same payload. Alternatively, in another example, supraparticles are loaded with different payloads. For example, a supraparticle loaded with a neurotrophic factor and a supraparticle loaded with a steroid may be administered. In another example, a supraparticle loaded with a neurotrophic factor and a supraparticle loaded with an antibiotic may be administered. In another example, a supraparticle loaded with a neurotrophic factor can be administered with an antibiotic.

Compositions/Kits

Supraparticles according to the present disclosure can be provided in a kit or pack. For example, compositions disclosed herein may be packaged in a suitable container with written instructions for treating an inner ear disorder. In an example, compositions may be provided in a single dose container such as an ear dropper or pre-filled syringe.

In one example, the kit comprises a supraparticle according to the present disclosure for use in methods of treating an inner ear disorder. In another example, the kit comprises a supraparticle according to the present disclosure for use in methods of treating hearing loss. In an example, the hearing loss is SNHL. In another example, the hearing loss is noise induced hearing loss. In an example, a kit according to the present disclosure further comprises a hearing aid or an implant. Accordingly, in an example, the kit can comprise a supraparticle and a cochlear implant.

Manufacturing

Examples of manufacturing supraparticles according to the present disclosure follow and are also provided below in the EXAMPLES section. In an example, the supraparticles can be manufactured from a composition comprising nanoparticles and alginic acid or a polysaccharide derivative thereof. Various examples of nanoparticles are provided above. In an example, the nanoparticles have a bimodal pore structure. Nanoparticles can be produced using various methods. One such method is described in Cui et al. 2015, ACS Nano, 9, 1571-1580.

In another example, supraparticles according to the present disclosure are produced by electrospraying. Examples of electrospraying are reviewed in Jaworek A., 2007 Powder Technology 1, 18-35. An example of electrospraying is also exemplified below. In an example, the present disclosure encompasses a method of manufacturing supraparticles, the method comprising electrospraying a composition comprising nanoparticles and alginic acid or a polysaccharide derivative thereof into a di-cationic aqueous solution.

One of skill in the art will appreciate that electrospray parameters can be optimized based on the type of the solution used for electro spraying. For example, voltage and flow rates can be optimised to provide supraparticles of a desired size. In an example, the flow rate is about 6-10 mL $11^{-1}$. In another example, the flow rate is about 7-9 mL $11^{-1}$. In another example, the flow rate is about 8 mL $11^{-1}$. In an example, the voltage is between about 10 and 25 KV. In another example, the voltage is between about 11 and 20 KV. In another example, the voltage is between about 12 and 14 KV. In another example, the voltage is about 13 KV.

In an example, supraparticles are produced by electrospraying a nanoparticle solution. In an example, the concentration of nanoparticles in solution is about 20 mg/ml. In an example, the concentration of nanoparticles in solution is about 30 mg/ml. In an example, the concentration of nanoparticles in solution is about 40 mg/ml. In an example, the concentration of nanoparticles in solution is about 50 mg/ml. In an example, the concentration of nanoparticles in solution is about 60 mg/ml.

In another example, supraparticles are produced by electrospraying a nanoparticle solution comprising alginic acid or a derivative thereof. In an example, the nanoparticle solution is prepared from 5 mg $mL^{-1}$ alginic acid solution. In an example, the nanoparticle solution is prepared from 10 mg $mL^{-1}$ alginic acid solution. In an example, the nanoparticle solution is prepared from 20 mg $mL^{-1}$ alginic acid solution. In an example, the nanoparticle solution is prepared from 30 mg $mL^{-1}$ alginic acid solution. In another example, the nanoparticle solution is prepared from 5 mg $mL^{-1}$ to 30 mg $mL^{-1}$ alginic acid solution. In another example, the nanoparticle solution is prepared from 10 mg $mL^{-1}$ to 30 mg $mL^{-1}$ alginic acid solution. In another example, the nanoparticle solution is prepared from 20 mg $mL^{-1}$ to 30 mg $mL^{-1}$ alginic acid solution.

In an example, the nanoparticle solution is prepared from 5 mg $mL^{-1}$ alginic acid in water. In an example, the nanoparticle solution is prepared from 10 mg $mL^{-1}$ alginic acid in water. In an example, the nanoparticle solution is prepared from 20 mg $mL^{-1}$ alginic acid in water. In an example, the nanoparticle solution is prepared from 30 mg $mL^{-1}$ alginic acid in water. In another example, the nanoparticle solution is prepared from 5 mg $mL^{-1}$ to 30 mg $mL^{-1}$ alginic acid in water. In another example, the nanoparticle solution is prepared from 10 mg $mL^{-1}$ to 30 mg $mL^{-1}$ alginic acid in water. In another example, the nanoparticle solution is prepared from 20 mg $mL^{-1}$ to 30 mg $mL^{-1}$ alginic acid in water.

In another example, supraparticles are produced by electrospraying a nanoparticle solution comprising alginic acid.

Alginic acid derivatives are not particularly limited so long as they form a gel at a defined temperature. In an example, the alginic acid derivative is a polysaccharide derivative. Alginic acid derivatives include various alginic acid salt forms. Examples include sodium alginate, potassium alginate and calcium alginate. Other examples include barium alginate and strontium alginate. In an example, the alginic acid is sodium alginate. In another example, supraparticles are produced by electrospraying a nanoparticle solution comprising alginic acid.

Alginates of various viscosities may be used to produce supraparticles according to the present disclosure depending on the desired size and shape of supraparticle. For example, alginate having a viscosity of about 20 to 300 mPa*s can be used. In another example, the alginate has a viscosity of about 20 to 200 mPa*s. In an example, the alginate has a viscosity of 20 mPa*s. In another example, the alginate has a viscosity of 100 mPa*s. In another example, the alginate has a viscosity of 200 mPa*s.

In an example, supraparticles are produced by electrospraying a composition comprising nanoparticles into an aqueous solution. In an example, this is a di-cationic aqueous solution. Exemplary di-cationic components include Ca' and Ba'. For example, the aqueous solution can comprise calcium chloride. In another example, the aqueous solution comprises barium chloride.

In an example, supraparticles are produced by electrospraying a composition wherein the concentration of alginate in the composition is 5 mg $mL^{-1}$ to 30 mg $mL^{-1}$, the concentration of nanoparticles in the composition is 20 mg $mL^{-1}$ to 50 mg $mL^{-1}$ and the voltage is 10 kV to 25 kV. In another example, supraparticles are produced by electrospraying a composition wherein the concentration of alginate in the composition is 10 mg $mL^{-1}$ to 30 mg $mL^{-1}$, the concentration of nanoparticles in the composition is 30 mg $mL^{-1}$ to 50 mg $mL^{-1}$ and the voltage is 11 kV to 21 kV. In another example, supraparticles are produced by electrospraying a composition wherein the concentration of alginate in the composition is 20 mg mL$^{-1}$ to 30 mg mL$^{-1}$, the concentration of nanoparticles in the composition is 35 mg mL$^{-1}$ to 45 mg mL$^{-1}$ and the voltage is 12 kV to 14 kV. In these examples, the flow rate can be 8 mL h$^{-1}$.

In another example, supraparticles are produced by electrospraying a composition wherein the concentration of alginate in the composition is 30 mg mL$^{-1}$, the concentration of nanoparticles in the composition is 40 mg mL$^{-1}$, the voltage is 13 kV, and the flow rate is 8 mL h$^{-1}$.

In an example, supraparticles manufactured using methods defined herein are subjected to calcination to remove alginic acid or a derivative thereof. In an example, calcination is performed at around 500° C. In another example, calcination is performed at around 550° C. In another example, calcination is performed at around 600° C. In another example, calcination is performed at around 650° C. In another example, calcination is performed at around 700° C. In an example, calcination is performed for about 6 to about 30 hours. In another example, calcination is performed for about 10 hours. In another example, calcination is performed for about 20 hours. In another example, calcination is performed for about 30 hours.

EXAMPLES

Example 1—Nanoparticle Production

Mesoporous silica nanoparticles (MS-NP) ware produced using methods based on those described in Cui et al. 2015, ACS Nano, 9, 1571-1580. 1.1 g Cetyltrimethylammonium bromide (CTAB) was completely dissolved in 50 ml Milli-Q with stirring. 4.3 g of Poly(acrylic acid) solution (PAA, M$_w$=250 kDa, 35 wt % solution in water) was subsequently added with vigorous stirring for 20 mins at room temperature (25° C.) until a clear solution was obtained. 3.5 ml ammonium hydroxide solution (28-30%) was then added to the solution with vigorous stirring, resulting in a milky suspension. 4.46 ml of Tetraethyl orthosilicate (TEOS) was then added after stirring for 20 min. The solution was stirred for a further 15 min before transferring the mixture into a Teflon-sealed autoclave, which was left at 90° C. for 48 h.

The as-synthesized MS-NP were washed with ethanol once, water twice and ethanol twice and finally dried at 90° C. The organic templates were removed by calcination at 550° C. for 30 h.

Example 2—Starting Supraparticle Manufacturing Process—Process A

Mesoporous silica (MS) nanoparticles, were prepared according to Wang et al. (2010) Chem Mater. 22, 3829-3831. MS nanoparticles were dispersed in Milli-Q water with a particle concentration of 5 wt % and briefly sonicated to form a stable colloidal suspension. A 0.5 to 2.0 µL aliquot of the MS nanoparticle dispersion was then applied to a flat surface, which was pre-covered with a paraffin film. The droplets were dried under air flow to drive assembly of the MS nanoparticles into mesoporous silica supraparticles (capillary force MS—SPs) via capillary force action. The size of the capillary force MS—SPs was controlled by the volume of the nanoparticle dispersion applied in the droplet.

Under capillary force, the MS colloids self-assembled into a compact structure to form MS—SPs. The capillary force MS—SPs were then removed from the paraffin film and transferred into a ceramic container, and annealed at 923 K to enhance mechanical stability of the capillary force MS—SPs. Capillary force MS—SPs were then loaded with payload. About 1.33 µg protein was loaded per particle. The capillary force MS—SPs were shown to have a bimodal pore structure (2-3 nm and 15-30 nm) and the macropores within the capillary force MS—SP, the space between the densely packed nanoparticles, was 100-200 nm.

Example 3—Modified Manufacturing Process—Process B 80 mg of MS-NPs powder was added into 2 ml of alginic acid sodium salt solution (30 mg mL$^{-1}$ in water). The resulting solution was sonicated for 1 hour until the MS-NPs distributed uniformly in alginic acid sodium salt solution.

To form large pore MS—SPs ($^L$MS—SPs), the sonicated solution was added into a 3 mL plastic syringe and positioned in a syringe pump, with liquid being electrosprayed into a bath of calcium chloride solution (1 wt % prepared in water) using flow rates around 8 mL h$^{-1}$ (electrospray setup shown in FIG. 1). Droplet size was controlled by applying an electric field between the end of the tubing and the calcium chloride solution. The alginate beads MS—SPs ($^L$MS—SPs$^{alg}$) were collected from the calcium chloride bath and loaded with payload. Significantly enhanced drug-loading loading performance was observed for these particles ($^L$MS—SPs) compared to those produced by process A: about 7.8 µg protein per particle, with improved mechanical stability.

Example 4—Modified Manufacturing Process—Process C

MS—SPs ($^L$MS—SP$^{alg}$) were produced using the method described in Example 3. Alginic acid sodium salt was removed by calcination at 650° C. for 30 h. This step removed all organic components and left behind only the mesoporous silica nanoparticles (MS—SP) and trace amounts of calcium and sodium chloride. MS—SPs were then loaded with payload. Significantly enhanced drug-loading performance was observed for these particles compared to those produced by process A: about 7.8 µg protein per particle.

Supraparticles were also made from nanoparticles without pores (non porous $^N$MS—SPs$^{alg}$; $^N$MS—SPs$^{alg}$) and nanoparticles having pore sizes <2 nm (small pore MS-$^S$SPs$^{alg}$; $^S$MS—SPs$^{alg}$). When alginate was removed from these supraparticles drug-loading performance was significantly reduced (Table 1).

Maximal drug loading of MS—SP produced by process B and process C is summarized in Table 1.

TABLE 1

| Loading of MS-SP produced by process B and process C | |
|---|---|
| Particle type | $q_{max}$ (ug/particle) |
| non porous $^N$MS-SPs$^{alg}$ | $q_{max}$ = 8.215 |
| non porous $^N$MS-SPs | $q_{max}$ = 2.009 |
| small pore $^S$MS-SPs$^{alg}$ | $q_{max}$ = 10.06 |
| small pore $^S$MS-SPs | $q_{max}$ = 2.802 |
| large pores $^L$MS-SPs$^{alg}$ | $q_{max}$ = 9.245 |
| large pores $^L$MS-SPs | $q_{max}$ = 7.843 |

Example 5—Supraparticle Release Properties

Lysozyme

FITC-lysozyme-loaded SPs were prepared for in-vitro release studies by incubating sterilized SPs with 100 μL of FITC-lysozyme solution (0.2 mg mL$^{-1}$ in Milli-Q water). Lysozyme is a good model protein to mimic the neurotrophin BDNF (as lysozyme is cheap and readily available while BDNF is expensive) because it shares similar physicochemical properties (lysozyme, $M_w$=14.3±0.5 KDa, $R_H$=18.9±0.25 Å and pI=11; BDNF, $M_w$=13 KDa, $R_H$=24.0±3.2 Å and pI=10).

In-vitro release profile of lysozyme loaded MS—SPs are shown in FIG. 4 parts a) and b) and FIG. 7 part a). Release profiles of MS—SP produced by process A and C are similar. Although MS—SP produced by process C are loaded with significantly higher levels of labelled lysozyme. Payload release is significantly reduced for MS—SP produced by process B compared to MS—SP produced by processes A and C.

Zeta Potential

MS—SPs were then loaded with fluorescein-labelled lysozyme (FITC-lysozyme). As shown in FIG. 2, MS—SPs exhibited negative zeta potentials ranging from ~−7.6 mV to ~−33.9 mV as the pH value increased from 4 to 10. Positively charged lysozyme and BDNF can therefore be loaded into MS—SPs with the help of electrostatic driving forces. Confocal microscopy images (FIG. 3a, b) showed FITC-lysozyme loaded onto the surface of MS—SPs. However, as the size of the MS—SPs is quite large (hundreds of micrometers in diameter) standard laser scanning confocal microscopy is not suitable for imaging the internal structure of the SPs. However, upon fracturing the MS—SPs with a scalpel, the inside could be imaged and it was found that FITC-lysozyme was also observed in the porous internal structures of the MS—SPs (FIG. 3c).

Additional Assessment of Loading Capacity

The loading capacity for different types of SPs was then investigated using FITC-lysozyme at different loading concentrations with 3 days incubation time (FIG. 4). In general, as the concentration of FITC-lysozyme increased, the amount of drug loading increased. The results show that the alginate-containing $^N$MS—SPs$^{alg}$, $^S$MS—SPs$^{alg}$ and $^L$MS—SPs$^{alg}$ had higher loading capacities than the alginate-removed $^N$MS—SPs, $^S$MS—SPs and $^L$MS—SPs (at comparable concentrations). This may be due to increased electrostatic interactions between positively charged FITC-lysozyme and negatively charged alginate around neutral pH value. Additionally, at low FITC-lysozyme loading concentration (<0.4 mg mL$^{-1}$), $^L$MS—SPs$^{alg}$ had a similar drug loading capacity as non porous MS—SPs$^{alg}$ and $^S$MS—SPs$^{alg}$, but when the concentration was higher (>0.4 mg mL$^{-1}$), more FITC-lysozyme could be loaded into $^L$MS—SPs$^{alg}$ compared to $^N$MS—SPs$^{alg}$ and $^S$MS—SPs$^{alg}$. For alginate-removed MS—SPs a similar trend was observed: $^L$MS—SPs could load more FITC-lysozyme than $^N$MS—SPs and $^S$MS—SPs. These results show that large porous structures (in $^L$MS—SPs and $^L$MS—SPs$^{alg}$) are key factors to improve drug loading, likely by providing additional surfaces and hence loading and capacity when outer particle surfaces and intra-particle areas (in the SP structures) have been fully saturated by the drug. Additionally, the loading capacity also depends on the diameter of MS—SPs where the bigger MS—SPs (1000 μm) had larger loading capacity than the smaller MS—SPs (200 μm) (FIG. 5).

The experimentally determined maximum loading amount of FITC-lysozyme into $^N$MS—SPs and $^S$MS—SPs$^{alg}$ were about 3 μg per SP and 2 μg per SP respectively, which were significantly lower than $^L$MS—SPs with approximately 15 μg per SP (FITC-lysozyme concentration was 1.5 mg mL$^{-1}$, and loading time was 3 days). Besides, the experimentally determined maximum loading amount of FITC-lysozyme into $^N$MS—SPs and $^S$MS—SPs were about 2 μg per SP and 1 μg per SP respectively, which were also dramatically less than $^L$MS—SPs with approximately 10 μg per SP (FITC-lysozyme concentration was 5.0 mg mL$^{-1}$, and loading time was 3 days).

The drug loading efficiency of six different SPs is shown in FIGS. 4c and 4d. As the loading concentration of FITC-lysozyme increased, more FITC-lysozyme could be loaded into SPs.

BDNF

MS—SPs were sterilized by soaking them in 100 μl of ethanol (80 vol/vol %) for 4 hours prior to rinsing with 100 μl of Milli-Q water six times. MS—SPs were loaded by placing them in an Eppendorf tube containing 15 μl of BDNF (Geneway, BDNF Human Protein, Cat. #10-663-45078) solution (1 mg/ml of BDNF) and incubating them at ambient room temperature for three days with occasional hand shaking. Remarkably, loading of about 10 μg BDNF was achieved.

Example 6—Pharmacokinetics

In-vivo studies were carried out to determine the drug payload and clearance of neurotrophin delivered in a supraparticle implanted into the ear after 4 hr, 3 day and 7 days of implantation. The objective was to determine the amount of neurotrophin remaining in the cochlea over time.

1 SP containing radiolabelled neurotrophin-3 was implanted into each cochlea. Cochleae were harvested following 4 hrs (n=5), 3 d (n=7) or 7 d (n=4). Whole cochlear gamma counts were measured to determine the clearance of neurotrophin-3 over time. The remaining amount of neurotrophin-3 (% of loaded) and the total in μg is shown in FIG. 15. After 1 week of implantation each SP contained ~2 μg of neurotrophin-3 (~40%) of initial loaded amount.

Further experiments (n=2) were carried out to examine clearance of neurotrophin-3 following round window delivery. 3 days after implantation whole cochlear measurements were again used to determine the clearance of neurotrophin-3 from the round window membrane. A similar level of clearance was observed using the round window compared to the intracochlear delivery site (47.4% of neurotrophin-3 remaining following round window delivery compared to 56% for intracochlear delivery).

These data show that extended release of neurotrophin-3 can be achieved with high levels of neurotrophin-3 still available even after 1 week of treatment.

Example 7—Methods

Supraparticle Assembly

Fibrin-coated silica supraparticles ($^F$Si—SPs) were prepared from Si—SPs assembled as described above. Si—SPs were sterilized with 100 μL of 80% (v/v) ethanol at room temperature (~22° C.) for 4 h. The Si—SPs were then washed with sterile Milli-Q water six times. Then 50 μL of 20 mg mL$^{-1}$ fibrinogen dissolved in 50 mM Tris-buffered saline (TBS; 50 mM Tris, 150 mM NaCl with pH adjusted to 7.2) was added to Si—SPs and incubated at 4° C. overnight (~16 h). The following day, the supernatant was aspirated and the Si—SPs were incubated with 50 μL of 1.72 mg mL$^{-1}$ thrombin in 50 mM TBS, containing 40 mM CaCl$_2$ at room temperature (~22° C.) for 1 h. Finally, the supernatant was aspirated and the Si—SPs were washed with Milli-Q water 3 times.

Fibrin Degradation

The degradation of fibrin from $^F$Si—SPs was assessed by the incubation of $^F$Si—SPs with 100 µL of PBS (pH 7.4) at 37° C. (10 $^F$Si—SPs in each sample). At specific time intervals (up to 42 days), 95 µL of supernatant was collected and stored at 20° C. for further analysis, and then replaced with 95 µL of fresh PBS. The concentration of degraded fibrin in the supernatant was quantified using a MicroBCA protein assay kit based on the manufacturer's protocol. The degradation percentage of fibrin was calculated by:

$$\text{Percent of fibrin remaining (\%)} = \frac{m_0 - m_n}{m_0} \times 100\%$$

where $m_0$ is the original amount (total amount) of fibrin on the SPs, $m_n$ is the amount of fibrin in the supernatant at time point n.

Methods of Synthesis of Hydrogel System.

To prepare the CaCO$_3$ particles, first, 5 g PSS (Mw 70 kDa) was completely dissolved in 500 mL Milli-Q water to form 10 mg mL$^{-1}$ PSS solution. Then, a "precursor solution" consisting of 1 mL of 1 M Na$_2$CO$_3$, 0.5 mL of 10 mg mL$^{-1}$ PSS, and 3.5 mL of Milli-Q water was prepared. In a separate flask, 20 mL of 10 mg mL$^{-1}$ PSS solution was added to 175 mL Milli-Q water with vigorous stirring. After stirring for 1 min, 5 mL of 1 M Ca(NO$_3$)$_2$ solution was added with vigorous stirring for 2 min. The precursor solution (5 mL) was then added and the resulting mixture was stirred vigorously for 1 min, after which the stirrer was turned off and the mixture was allowed to stand for 3 min, followed by another vigorous stirring for 1 min. The as-synthesized CaCO$_3$ particles were dried overnight in an oven at 80° C., and ground using a mortar and pestle to break up any large particulates in the dried powder. The fine CaCO$_3$ powder was then calcined with air flow at 723 K for 2 h to remove any organic materials.

To prepare the hydrogel, 1 mL of 20 mg mL$^{-1}$ alginate solution in Milli-Q water was mixed with 15 µL of 100 mg mL$^{-1}$ CaCO$_3$ particles (particle diameter 1.8 µm, see FIG. 17). To this, 53.4 µL of 100 mg mL$^{-1}$ D-glucono-δ-lactone (GDL) was added creating a molar ratio of CaCO$_3$ particles to GDL of 1:2, resulting in a neutral pH value of the formed hydrogel. The gelation time and the properties of the hydrogel can be tuned by adjusting the concentration of the alginate solution and the amount of CaCO$_3$ particles used.

To study the degradability of the alg-CaCO$_3$ hydrogel, the mass (dry weight) of the hydrogel was monitored over time. PBS (500 µL, pH 7.4) was added to the hydrogel (500 µL of 20 mg mL$^{-1}$ alg-CaCO$_3$ hydrogel) and incubated at 37° C. At various time points (0d, 3 d 1 w, 2 w, 3 w, 4 w, 6 w), the PBS was removed, and the remaining hydrogel samples were washed with Milli-Q (5 times) and then frozen and stored at 20° C. until analysis. For the longer time points, the PBS was replaced with 500 µL of fresh PBS and returned to the 37° C. incubator until the next time point. All remaining samples were lyophilized, and the dry weight of the hydrogel was measured. The weight loss percentage was calculated by:

$$\text{Weight loss (\%)} = \frac{m_0 - m_n}{m_0} \times 100\%$$

where $m_0$ is the total weight of hydrogel at time point 0 and $m_n$ is the weight of hydrogel at time point n.

Scanning electron microscopy (SEM) images of Si—SPs, $^F$Si—SPs and CaCO$_3$ particles were taken using a Philips XL30 field-emission scanning electron microscope (Philips, Netherlands) at an operating voltage of 5 kV. SEM samples of the SPs were made by depositing them onto conductive carbon tape followed by sputter coating to coat them with 20 nm of gold. The SEM-EDX mapping of $^F$Si—SP was taken by a Philips XL30 field-emission scanning electron microscope (Philips, Netherlands) with energy dispersive X-ray spectroscopy (EDX). For the preparation of SEM samples of the alg-CaCO$_3$ hydrogel, the hydrogel was first synthesized using the method above, and then lyophilized overnight. The lyophilized sample was placed directly onto conductive carbon tape followed by gold coating (via sputtering) for imaging. Fourier-transform infrared spectroscopy (FTIR) spectra of Si—SPs and $^F$Si—SPs were determined using a FTIR spectrophotometer (Bruker, Australia).

In-Vitro Release Studies

In-vitro release studies were conducted using either the model drug FITC-lysozyme or neurotrophin (BDNF or NT-3). Following sterilization, 10 Si—SPs or 10 $^F$Si—SPs were incubated with 100 µL of FITC-lysozyme solution (1 mg mL$^{-1}$ in Milli-Q water). After 3 days incubation, the supernatant was aspirated. At defined time intervals (over 150 days), 95 µL of the supernatant was collected (and stored at 20° C. until analysis) and replaced with 95 µL of fresh PBS. The fluorescence of the collected samples was measured using an Infinite M200 microplate reader (Tecan, Switzerland), and the concentration of FITC-lysozyme in the supernatant was calculated using a FITC-lysozyme standard curve (FIG. 18). FITC-lysozyme release from loaded $^F$Si—SPs was also assessed as a function of fibrinogen concentration (2 mg mL$^{-1}$, 20 mg mL$^{-1}$ and 40 mg mL$^{-1}$ fibrinogen at a constant 1.72 mg mL$^{-1}$ of thrombin, and denoted as $^{2F1.72}$Si—SPs, $^{20F1.72}$Si—SPs and $^{40F1.72}$Si—SPs, respectively) and as a function of thrombin concentration (0.1 mg mL$^{-1}$, 0.5 mg mL$^{-1}$, 1.72 mg mL$^{-1}$ and 5 mg mL$^{-1}$ thrombin at a constant 20 mg mL$^{-1}$ of fibrinogen, and denoted as $^{20F0.1}$Si—SPs, $^{20F0.5}$Si—SPs, $^{20F1.72}$Si—SPs and $^{20F5}$Si—SPs).

For neurotrophin (BDNF or NT-3) loading, 4 sterilized SPs (Si—SPs or $^F$Si—SPs) were incubated with 30 µL of BDNF or NT-3 solution (1.0 mg mL$^{-1}$ in Milli-Q water). After 3 days of incubation, the supernatant was removed, and each individual SP was placed in a fresh 1.7 mL microcentrifuge tube (one SP per tube). Then 100 µL of PBS (pH 7.4) was added to each tube and incubated at 37° C. At defined time points (over 40 days), 95 µL of the supernatant was collected (and stored at 20° C. until analysis) and replaced with fresh 95 µL PBS. This sampling method was repeated at each time point over the course of the release studies. The amount of BDNF or NT-3 released from Si—SPs and $^F$Si—SPs was determined using a BDNF- or NT-3-specific enzyme-linked immunosorbent assay (ELISA) using a standard curve of BDNF or NT-3 as per the manufacturer's protocol (e.g. FIG. 19).

The release of FITC-lysozyme from $^F$Si—SPs embedded in hydrogel was determined as follows. Alginate solution was mixed with CaCO$_3$ particles as described above. Prior to gelation, 10 $^F$Si—SPs (pre-loaded with FITC-lysozyme for 3 days) were added to the alg-CaCO$_3$ mixture. To induce gelation, GDL was added at the same concentration and volume as described above. After 2 min, the hydrogel formed. To study the release in PBS, 100 µL of PBS (pH 7.4) was added and the sample was incubated at 37° C. At defined time points (over 110 days), 95 µL of supernatant was collected (and stored at 20° C. until analysis) and replaced with fresh PBS. The fluorescence of the collected samples was measured with an Infinite M200 microplate and the corresponding FITC-lysozyme concentration was determined using a standard curve (FIG. 20).

In-Vitro Degradation Studies

Si—SPs were first sterilized with 100 µL of ethanol (80% v/v) at room temperature (~22° C.) for 4 h, and then washed with sterile Milli-Q water four times. Subsequently, $^F$Si—SPs were prepared as described above. Supraparticle degradation was studied by immersing Si—SPs or $^F$Si—SPs (with 20 SPs in each sample) in 1 mL of 10 mM PBS (pH 7.4) at 37° C. At defined time points (over 70 days), 1 mL of the supernatant was collected and replaced with fresh 1 mL PBS. The presence of silica degradation product in the supernatant was measured using inductively coupled plasma-optical emission spectrometer (ICPOES). Sodium hydroxide (8 M, 500 µL) was added to 500 µL of each collected supernatant to dissolve any silica fragments. The samples were incubated at 95° C. for 30 mins, followed by 30 mins of sonication. The samples were then incubated overnight at 37° C. One mL of the dissolved sample was mixed with 4 mL of Milli-Q water, resulting in a ten-fold sample dilution from the original collected supernatant. The amount of silicon in each sample (corresponding to the released silicon from the SPs) was measured by ICPOES using a silicon standard curve. In addition to these measurements, the morphology of Si—SPs and $^F$Si—SPs after long-term incubation in PBS was observed by SEM imaging.

In-Vitro Cytotoxicity Studies

First, Si—SPs were sterilized with 100 µL of ethanol (80% v/v) at room temperature (~22° C.) for 4 h, followed by washing with sterile Milli-Q water (3 times) and then cell culture medium (3 times). To determine the cytotoxicity of the degradation products of the SPs, 1 mL of cell culture media (DMEM medium supplemented with 10% fetal bovine serum, 100 units mL$^{-1}$ penicillin, 100 mg mL$^{-1}$ streptomycin) was added to increasing numbers of Si—SPs and $^F$Si—SPs. At defined time intervals, all cell media was aspirated (and stored at 20° C. for future cell analysis) and replaced with fresh cell media.

Brain-derived U87MG glioblastoma cells were maintained in DMEM supplemented with 10% fetal bovine serum in a humidified incubator (37° C., 5% $CO_2$). U87MG cells were seeded in a 96-well plate at $2 \times 10^4$ cells per well in 100 µL of medium and incubated overnight. Subsequently, 100 µL of sample (degradation products from Si—SPs and $^F$Si—SPs incubated in cell culture media and collected at different time points as described above) was added to each well and incubated (37° C., 5% $CO_2$). After 48 h incubation, cell culture medium was aspirated completely and 100 µL of XTT/PMS solution was added to each well to measure cell viability. After 4 h of incubation, the absorbance of the solution was measured using an Infinite M200 microplate reader at a wavelength of 475 nm and a reference wavelength of 675 nm. Differential absorbance was calculated by subtracting absorbance at 675 nm from absorbance at 475 nm. XTT/PMS solution was prepared by mixing 135 µL of 2 mM PMS in DPBS solution with 10.8 mg XTT in 54 mL DMEM supplemented with 10% fetal bovine serum. Sample wells containing only medium (i.e., no cells) were used as background controls for the absorbance measurements. Cells exposed only to DMEM medium were termed untreated controls and used for the normalization of cell toxicity.

Example 8—Synthesis of Fibrin-Coated Silica Supraparticles

FITC-lysozyme-loaded Si—SPs synthesized by gel-mediated electrospray assembly have a high loading capacity and can achieve sustained drug release for over 110 days. However, ~60% of FITC-lysozyme from these supraparticles was released over the first 3 days. Fibrin-coated silica supraparticles ($^F$Si—SPs) slow this burst release. Incubation of Si—SPs with fibrinogen, followed by the enzyme thrombin, results in the enzymatic conversion of fibrinogen into a mesh of fibrin on the Si—SP surface. Fibrin is a fibrous non-globular protein that is involved in the process of blood clotting. Scanning electron microscopy (SEM) was used to examine the surface ultrastructure of the supraparticles following fibrin coating. At low resolution, there is little observable difference in morphology between Si—SP and $^F$Si—SP, but at high resolution, the surface morphology of $^F$Si—SP (FIG. 16d) compared to that of Si—SP (FIG. 16b) clearly shows the coating with fibrin successfully covers the supraparticles and the pores surface structure. SEM-EDX elemental mapping showed that $^F$Si—SPs contained silicon (Si), oxygen (O), calcium (Ca) and nitrogen (N) elements uniformly distributed on the surface of $^F$Si—SPs (FIG. 16), as expected. FTIR spectroscopy of Si—SPs confirmed the presence of Si—O—Si bonds with stretching vibrations of Si—O—Si at 1071 cm$^{-1}$, bending vibration of O—Si—O at 793 cm$^{-1}$ and rocking vibrations of Si—O—Si at 455 cm$^{-1}$ (FIG. 16f) indicating that Si—SPs consist mainly of silica. The peak at 962 cm$^{-1}$ might further be attributed to the Si—O—Ca vibration mode, and may be due to the synthesis procedure of Si—SPs using gel-mediated electrospray assembly with calcium-alginate as the scaffold. These data indicate the successful preparation of Si—SPs and that fibrin coating has been formed.

Example 9—In-Vitro Drug Release

Pre-loading a model protein therapeutic (FITC-lysozyme) into Si—SPs, and then coating with a compact layer of fibrin was hypothesised to slow drug release from $^F$Si—SPs. To determine FITC-lysozyme release profiles from $^F$Si—SPs, FITC-lysozyme-loaded $^F$Si—SPs were incubated in PBS (pH 7.4) at 37° C. and the supernatant was collected for analysis of protein content at various time points. A range of parameters for $^F$Si—SPs synthesis were tested, including $^F$Si—SPs prepared using different concentrations of fibrinogen (2 mg mL$^{-1}$, 20 mg mL$^{-1}$ and 40 mg mL$^{-1}$ fibrinogen at constant concentration of thrombin (1.72 mg mL$^{-1}$), denoted as $^{2F1.72}$Si—SPs, $^{20F1.72}$Si—SPs and $^{40F1.72}$Si—SPs, respectively) and different concentrations of thrombin (0.1 mg mL$^{-1}$, 0.5 mg mL$^{-1}$, 1.72 mg mL$^{-1}$ and 5 mg mL$^{-1}$ thrombin at constant concentration of fibrinogen (20 mg mL$^{-1}$) of fibrinogen and denoted as $^{20F0.1}$Si—SPs, $^{20F0.5}$Si—SPs, $^{20F1.72}$Si—SPs and $^{20F5}$Si—SPs, respectively). FITC-lysozyme was loaded in Si—SPs (3 days incubation at room temperature), resulting in an average loading amount of 7 µg per SP. The FITC-lysozyme loading for all individual tubes of Si—SPs prior to fibrin coating under different fibrinogen and thrombin concentrations are shown in FIG. 21. The percentage of FITC-lysozyme released from the SPs at each time point is shown in FIGS. 22 and 23. As shown in FIG. 24a and FIG. 24b, sustained FITC-lysozyme release was detected from Si—SPs and $^F$Si—SPs over 110 days. However, fibrin coating used in the $^F$Si—SPs slowed the initial release. For uncoated supraparticles >60% protein release was observed within 3 days. In comparison, for supraparticles coated using 2 mg mL$^{-1}$ of fibrinogen and 1.72 mg mL$^{-1}$ thrombin, the release rate was much slower taking >20 days to achieve the same of amount of release. For Si—SPs coated using higher concentration of fibrinogen (20 mg mL$^{-1}$ and 40 mg mL$^{-1}$), the time to achieve >60% protein release was further extended to 28 days (FIG. 24a). Applying different concentrations of thrombin, the release of FITC-lysozyme from $^F$Si—SPs can also be slowed down: 60% protein release was observed after 3 days for uncoated particles which takes ~28 days for coated particles, without much differences within different concentrations (FIG. 24b).

In FIGS. 24a and 24b, the cumulative drug release amount is lower than 100% likely due to the photobleaching of FITC over long periods of time, although the presence of firmly adsorbed protein on Si—SPs cannot be ruled out. Nevertheless, there is clear evidence that fibrin coatings can substantially reduce the initial burst release of the model cargo FITC-lysozyme from Si—SPs, providing a more evenly distributed release profile.

This study was extended to clinically relevant neurotrophins, BDNF and NT-3, to assess the potential application of Si—SPs for inner ear neurotrophin delivery. BDNF or NT-3 was loaded in Si—SPs (3 days incubation at room temperature), resulting in an average loading of 7.3 μg SP$^{-1}$. Coating the BDNF and NT-3-loaded Si—SPs with fibrin was performed using 20 mg mL$^{-1}$ of fibrinogen and 1.72 mg mL$^{-1}$ of thrombin. These parameters were chosen as they provided the optimal slowing of burst release in the FITC-lysozyme studies. FIGS. 24c and d shows the release profile of BDNF and NT-3 from Si—SPs and $^F$Si—SPs in PBS (pH 7.4) at 37° C. The release of BDNF and NT-3 from $^F$Si—SPs appears to follow a near linear release profile compared to release from uncoated Si—SPs. At day 21, 60% of the loaded BDNF or NT-3 had been released from uncoated Si—SPs, compared to 10% from $^F$Si—SPs, indicating that the fibrin coating strategy also slows neurotrophin release. The percentage of BDNF and NT-3 released from Si—SPs and $^F$Si—SPs at each time point is shown in FIGS. 25 and 26. Increased fibrin gelation time was also associated with reduction in drug release over time (10 min gelation time [soft] compared with 2-hour gelation time [hard]).

Example 10—Degradation of Fibrin-Coated Silica Supraparticles

In-vitro degradation studies were conducted by incubating Si—SPs and $^F$Si—SPs in PBS (pH 7.4, 37° C.). From SEM analysis, there was a progressive decrease in the size of Si—SPs (FIG. 27) and $^F$Si—SPs (FIG. 28a-e) over time and there was clear evidence of degradation as seen from the morphology of the supraparticles, which appeared cracked and collapsed after 6 weeks incubation. After 10 weeks of incubation in PBS at 37° C., the diameter of $^F$Si—SPs had decreased by ~40% and substantial changes in supraparticle morphology are apparent when comparing $^F$Si—SPs at day 3 and $^F$Si—SPs at week 10. Higher magnification imaging of the surface of $^F$Si—SPs after 10 weeks, showed the appearance of the underlying silica microparticles, which also appear fragmented, confirming the degradability of the fibrin coating. This was confirmed by measuring the amount of fibrin remaining on the $^F$Si—SPs (FIG. 29), which showed near-complete degradation of fibrin after 6 weeks incubation. At 28 days, which was the time needed to release 60% of the loaded FITC-lysozyme, only about 5% of the fibrin remains on the $^F$Si—SPs, after which the release profile between Si—SPs and $^F$Si—SPs become similar.

To quantify the release of Si from the supraparticles, ICP-OES was performed using samples collected at different time points (3 d, 7 d, 14 d, 21 d, 28 d, 42 d and 70 d) of the release studies (FIG. 28f) to measure the Si concentration. After 70 days of incubation in PBS at 37° C., approximately 30% of Si had been released from both the Si—SPs and $^F$Si—SPs. The degradation of Si during the first week was slower for $^F$Si—SPs than for Si—SPs (FIG. 30). After 14 days, the degradation rates for $^F$Si—SPs and Si—SPs follow the same profile, and this is expected as only around 25% of fibrin remain on the $^F$Si—SPs after 14 days and most of the silica microparticles are therefore directly exposed in the PBS (i.e. uncoated).

These data indicate that biodegradable coatings such as fibrin can be used to facilitate sustained release of therapeutic from Si—SPs.

Example 11—In-Vitro Cytotoxicity

Cytotoxicity experiments were undertaken to measure any toxic components released from Si—SPs and $^F$Si—SPs over long time scales. The in-vitro cytotoxicity of the degradation products of $^F$Si—SPs was examined using U87MG cells. Supernatant collected over 11 weeks and containing fragmented Si and fibrin coating from 2, 5, 10 or 15 $^F$Si—SPs was added directly to cells and the viability of the cells was measured after 2 days incubation (FIG. 31). The results show no cytotoxicity arising from the degradation products of $^F$Si—SPs, even as the number of $^F$Si—SPs was increased from 2 up to 15. Similar results were observed for Si—SPs. This supports the biocompatibility of Si and fibrin, and their corresponding breakdown products.

Example 12—In-Vitro Drug Release of $^F$Si—SPs Encapsulated in Alg-CaCO$_3$ Hydrogel A hydrogel formed by the crosslinking of alginate and Ca$^{2+}$ ions was investigated as an approach to achieve additional control of the release of protein therapeutics from Si—SPs. Alginate is a highly biocompatible, natural polysaccharide that is investigated widely for diverse biomedical applications and has been shown to be biocompatible in the inner ear over long durations of implantation. CaCO$_3$ particles (1.6 μm diameter), which release calcium ions upon addition of D-glucono-δ-lactone (GDL, a common food additive) were used to provide Ca$^{2+}$ ions to cross-link alginate into a hydrogel. Combined, these components form the delayed/triggered alg-CaCO$_3$ hydrogel platform, whereby drug-loaded Si—SPs can be administered in a mixture with alginate and CaCO$_3$ particles in liquid form, followed closely by the addition GDL to solidify the hydrogel into place. Due to the high surface area of the porous CaCO$_3$ particles and the mild hydrolysis conditions associated with GDL, gelation occurs within 2 min following addition of GDL.

FITC-lysozyme-loaded $^F$Si—SPs were encapsulated within the alg-CaCO$_3$ hydrogel and the release of FITC-lysozyme when incubated in PBS (pH 7.4) at 37° C. was determined (FIG. 32e). Biodegradable fibrin coating was already shown above to slow burst release and FIG. 32e shows that the presence of hydrogel decreases the rate of release even further, with 60% of FITC-lysozyme released over 40 days. In addition to these results using $^F$Si—SPs, the in-vitro release profiles of Si—SPs in alg-CaCO$_3$ hydrogels were also investigated using different amounts of CaCO$_3$ particles and different concentrations of alginate solution (FIG. 33). No large differences in the FITC-lysozyme release profile from Si—SPs were observed for the various CaCO$_3$ particle amount and alginate concentration tested. Taken together, these results show triggered gelation (upon addition of GDL) of the alg-CaCO$_3$ hydrogel system which can encapsulate drug-loaded supraparticles with robust release profiles. An example use is as a simple two-component, 'mix-and-inject' system where a clinician or surgeon can place the drug delivery system at the intended location, such as in the middle ear or inner ear.

Example 13—Chitosan Coated Supraparticles

Si—SPs were synthesized by gel-mediated electrospray assembly as described above and loaded with lysozyme, BDNF or NT-3. Loaded Si—SPs were then coated with 1, 2, or three layers of chitosan and alginate (0.1 wt % of chitosan and alginate solution). In-vitro drug release was then tracked over time (FIGS. 34, 35 and 36). Si—SP loaded with lysozyme were then coated with one layer of 1 wt % of chitosan and alginate solution before lysozyme was tracked over time (FIG. 37).

It will be appreciated by persons skilled in the art that numerous variations and/or modifications may be made to the disclosure as shown in the specific embodiments without departing from the spirit or scope of the disclosure as broadly described. The present embodiments are, therefore, to be considered in all respects as illustrative and not restrictive.

The present application claims priority from AU 2019900910 filed 19 Mar. 2019, the disclosures of which are incorporated herein by reference.

All publications discussed above are incorporated herein in their entirety. Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim of this application.

REFERENCES

Clark G M, et al. (1984) Ann Otol Rhinol Laryngol 93:204-207
Clark G M, et al. (1991) Ear and Hearing Suppl. 12:15S-24S
Cui et al. (2015) ACS Nano 9:1571-1580
Jaworek (2007) Powder Technology 176(1), 18-35
Langer R (1990) Science. 249, 1527-1533
Remington's Pharmaceutical Sciences (Mack Publishing Co. N.J. USA, 1991)
Tan et al. (2012) Adv. Mater. 24: 3362-3366
Wang et al. (2009) J. Mater. Chem. 19: 6451-6464
Wang et al. (2010) Chem Mater. 22: 3829-3831
Yang and Pierstorff (2012) JALA. 17, 50-58

The invention claimed is:

1. A composition comprising a mesoporous-silica supraparticle (MS-SP), wherein the MS-SP comprises:
   at least 1.5 µg of a neurotrophic factor payload; and
   a biodegradable coating;
   wherein the biodegradable coating is applied as one, two, or three layers on the MS-SP pre-loaded with the neurotrophic factor payload; and
   wherein the biodegradable coating reduces the initial burst release of the neurotrophic factor payload from the supraparticle to less than about 30% at three days in phosphate buffered saline (PBS) at 37° C., compared to a MS-SP without the biodegradable coating.

2. The composition of claim 1, wherein the supraparticle comprises pores having a diameter of at least 60 nm.

3. The composition of claim 1, wherein the supraparticle has a disordered pore structure.

4. The composition of claim 1, wherein the supraparticle is comprised of nanoparticles having a bimodal pore structure.

5. The composition according to claim 1, wherein the biodegradable coating comprises a proteinaceous fluid.

6. The composition of claim 5, wherein the proteinaceous fluid comprises fibrin or fibrinogen.

7. The composition according to claim 1, wherein the neurotrophic factor is BDNF or NT-3.

8. The composition of claim 7, wherein the supraparticle comprises a further payload.

9. The composition according to claim 1, which comprises at least two, at least three, at least four, at least five, at least six, at least seven, at least eight, at least nine, or at least 10 supraparticles.

10. The composition according to claim 1, wherein the supraparticle is characterised by a sustained release profile.

11. The composition according to claim 1, wherein the supraparticle is dispersed in a biodegradable formulation as a solid emersion.

12. The composition of claim 1, wherein the supraparticle is coated with fibrin or chitosan.

13. The composition according to claim 1, wherein the supraparticle is manufactured by electrospraying a composition comprising nanoparticles and Alginic acid or a polysaccharide derivative thereof into a di-cationic aqueous solution.

14. The composition according to claim 1, comprising a slow release system in the form of an alginate hydrogel.

15. The composition according to claim 14, wherein the alginate hydrogel is alg-CaCO$_3$ hydrogel.

16. The composition according to claim 1, comprising a slow release system comprising titanium-polyphenol gel or fibrin glue.

17. A method of treating hearing loss in a subject comprising administering the composition of claim 1 to a patient in need thereof.

18. The method of claim 17, wherein the hearing loss is characterised as sensorineural hearing loss (SNHL), presbycusis, or noise induced.

19. A kit comprising the composition according to claim 1 and optionally a cochlear implant, when used for treating hearing loss.

20. A composition comprising a mesoporous-silica supraparticle (MS-SP), wherein the MS-SP comprises:
   at least 1.5 ug of a neurotrophic factor payload; and
   a biodegradable coating;
   wherein the biodegradable coating is applied as one, two, or three layers on the MS-SP pre-loaded with the neurotrophic factor payload; and
   wherein the MS-SP with the biodegradable coating is characterized by around 3-25% neurotrophic factor payload release over the first 7 days in phosphate buffered saline (PBS) at 37° C.

* * * * *